(12) United States Patent
Konson et al.

(10) Patent No.: US 11,823,277 B1
(45) Date of Patent: *Nov. 21, 2023

(54) USER INTERFACE WITH MOVEABLE, ARRANGEABLE, MULTI-SIDED COLOR-CODED TILES

(71) Applicant: MeridianLink, Inc., Cosa Mesa, CA (US)

(72) Inventors: Michael M. Konson, Oakton, VA (US); Madhur Grover, Vienna, VA (US); Robert H. Chase, Herndon, VA (US); Christopher McPeek, Herndon, VA (US)

(73) Assignee: MeridianLink, Inc., Costa Mesa, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/406,580

(22) Filed: Aug. 19, 2021

Related U.S. Application Data

(63) Continuation of application No. 16/047,421, filed on Jul. 27, 2018, now Pat. No. 11,132,749.

(Continued)

(51) Int. Cl.
  *G06F 3/048* (2013.01)
  *G06Q 40/08* (2012.01)
  (Continued)

(52) U.S. Cl.
  CPC ............. *G06Q 40/08* (2013.01); *G06F 3/048* (2013.01); *G06F 3/0482* (2013.01); *G06F 3/04817* (2013.01); *G06F 3/04845* (2013.01)

(58) Field of Classification Search
  None
  See application file for complete search history.

(56) References Cited

U.S. PATENT DOCUMENTS 5,675,753 A  10/1997  Hansen
7,925,579 B1  4/2011  Flaxman
(Continued)

OTHER PUBLICATIONS

U.S. Appl. No. 16/047,441—Jun. 26, 2020 PTO Office Action.
(Continued)

*Primary Examiner* — Xuyang Xia
(74) *Attorney, Agent, or Firm* — Aldo Noto, Davidson Berquist Jackson & Gowdey, LLP

(57) ABSTRACT

A user interface with visual presentation of data, real time risk adjustment, and underwriter approval processes is described. The system provides computer control for performing cashflow analysis, assessing risk, optimizing loan offers, generating dashboards with status information and tile displays of loan application data, and displaying of optimized loan offers. The dashboard includes a progress indicator of an electronic loan request to a complete loan application and finally to an approval or rejection. The dashboard also includes visual indications, including color and signals, directing the underwriter's attention to important or necessary action steps to reject or advance the loan. The dashboard interface can be customized. The dashboard interface includes a moveable, arrangeable, multi-sided color-coded tile system. Risk may be modified by the underwriter through the user interface through scale sliders, causing loan scoring and optimizing to occur in real time and presenting new loan offers to the underwriter for approval.

20 Claims, 56 Drawing Sheets

Related U.S. Application Data

(60) Provisional application No. 62/537,823, filed on Jul. 27, 2017.

(51) Int. Cl.
  *G06F 3/0482* (2013.01)
  *G06F 3/04845* (2022.01)
  *G06F 3/04817* (2022.01)

(56) References Cited

U.S. PATENT DOCUMENTS

| | | |
|---|---|---|
| 8,046,298 B1 | 10/2011 | Voth |
| 8,095,396 B1 | 1/2012 | Zublin, Jr. |
| 8,108,302 B1 | 1/2012 | Bradley |
| 8,145,556 B2 | 3/2012 | Tealdi |
| 8,527,401 B2 | 9/2013 | DeRoy |
| 8,606,695 B1* | 12/2013 | Arora .............. G06Q 40/02 |
| | | 705/38 |
| 10,032,218 B1 | 7/2018 | Denbo |
| 10,685,398 B1* | 6/2020 | Olson ............. G06Q 20/209 |
| 2001/0047307 A1 | 11/2001 | Bennett |
| 2003/0149659 A1 | 8/2003 | Danaher |
| 2004/0153384 A1 | 8/2004 | Whipple |
| 2004/0215552 A1 | 10/2004 | Horn |
| 2006/0136330 A1 | 6/2006 | DeRoy |
| 2010/0017300 A1* | 1/2010 | Bramlage ........... G06Q 40/03 |
| | | 705/26.1 |
| 2011/0137788 A1 | 6/2011 | Merkle |
| 2011/0178902 A1 | 7/2011 | Imrey |
| 2012/0136756 A1 | 5/2012 | Jitkoff |
| 2012/0317016 A1 | 12/2012 | Hughes |
| 2013/0113822 A1* | 5/2013 | Putrevu .............. H04W 4/50 |
| | | 345/619 |
| 2013/0290167 A1 | 10/2013 | Laky |
| 2014/0279389 A1 | 9/2014 | Monaco |
| 2015/0278941 A1 | 10/2015 | Hegarty |
| 2015/0348186 A1 | 12/2015 | Samteladze |
| 2016/0048312 A1* | 2/2016 | Holaso .............. G05B 15/02 |
| | | 715/771 |
| 2016/0306965 A1 | 10/2016 | Lyer |
| 2016/0314529 A1 | 10/2016 | Dolle |
| 2017/0206365 A1 | 7/2017 | Garcia |
| 2017/0235901 A1* | 8/2017 | Johnson ............ G06Q 10/06 |
| | | 705/2 |
| 2019/0213645 A1* | 7/2019 | Webb ............... G06Q 40/02 |
| 2019/0347733 A1 | 11/2019 | Sasaki |

OTHER PUBLICATIONS

U.S. Appl. No. 16/047,487—Jun. 26, 2020 PTO Office Action.
U.S. Appl. No. 16/047,514—Dec. 12, 2019 PTO Office Action.
U.S. Appl. No. 16/047,467—Jun. 10, 2020 PTO Office Action.
U.S. Appl. No. 16/047,467—Jan. 8, 2021 PTO Office Action.
U.S. Appl. No. 16/047,386—Sep. 17, 2020 PTO Office Action.
U.S. Appl. No. 16/047,441—Mar. 26, 2021 PTO Office Action.
U.S. Appl. No. 16/047,487—Mar. 26, 2021 PTO Office Action.
U.S. Appl. No. 16/047,421—Mar. 25, 2020 PTO Office Action.
U.S. Appl. No. 16/047,421—Nov. 17, 2020 PTO Office Action.

* cited by examiner

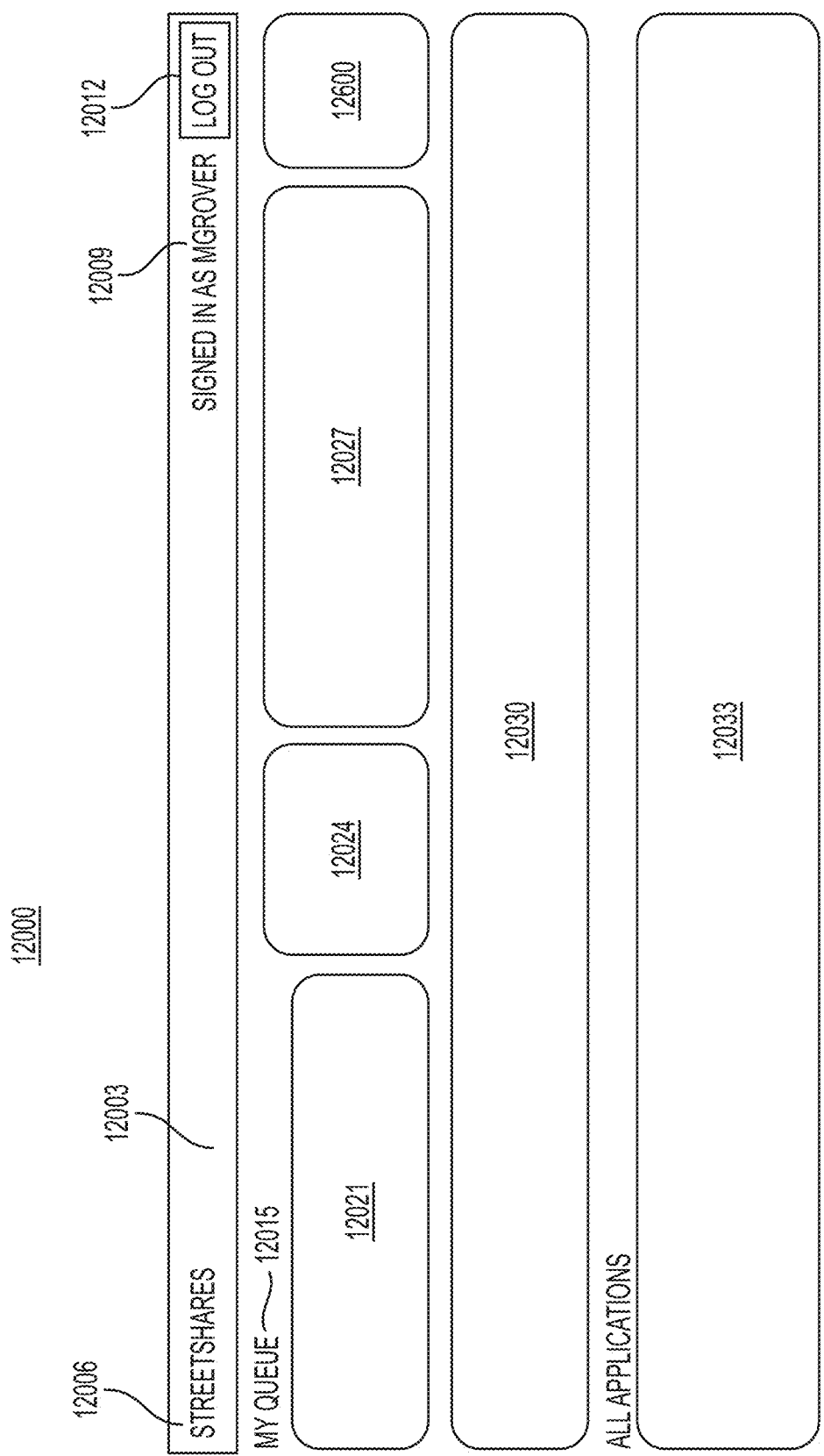

| MY TEAM'S QUEUE — 12303 | | | |
|---|---|---|---|
| UNDERWRITER — 12306 | FILES ON TIME — 12309 | BOUNCE RATE — 12312 | EXCEPTIONS — 12315 |
| JOHN — 12318 | 75% — 12327 | 30% — 12336 | 15% — 12345 |
| LYNDA — 12321 | 90% — 12330 | 20% — 12339 | 2% — 12348 |
| BRENDON — 12324 | 50% — 12333 | 5% — 12342 | 5% — 12351 |

*FIG. 12D*

| 12403 | 12406 | 12409 | 12412 | 12415 | 12418 | 12421 | 12424 | 12427 | 12430 |
|---|---|---|---|---|---|---|---|---|---|
| REQUEST ID | BUSINESS NAME | GUARANTOR | SUBMITTED | LAST ACTION | PRODUCT | STATUS | STATUS TIME | SALES OWNER | SCORE |
| 24636 | TRAIN A INC | DANIEL JACKSON | 4:51 PM, JAN 13, 2017 | 5H | NEW | MODEL2 (IMMEDIATE ACTION BY SALES) | | EMPLOYEE 1 | B |
| 24999 | REC INC | EA LER | 1:55 PM, JAN 19, 2017 | 1D | DRAW | DECLINED LETTER SENT (READY FOR FINAL REVIEW) | | EMPLOYEE 1 | B |
| 25635 | WHOLE PROD CORP. INC | MICH ALEX | 7:49 PM, JAN 31, 2017 | 5D | NEW | MODEL2 (READY FOR FINAL REVIEW) | | EMPLOYEE 2 | B |
| 25926 | COPEN AU GAR | AAR RUN | 2:18 PM, FEB 6, 2017 | 1D | RENEWAL | MODEL2 (READY FOR FINAL REVIEW) | | EMPLOYEE 2 | B |

| REQUEST ID | BUSINESS NAME | GUARANTOR | SUBMITTED | LAST ACTION | PRODUCT | STATUS | STATUS TIME | SALES OWNER | SCORE | UNDERWRITER |
|---|---|---|---|---|---|---|---|---|---|---|
| 24636 | TRAIN A INC | DANIEL JACKSON | 4:51 PM, JAN 13, 2017 | 5H | NEW | MODEL2 (IMMEDIATE ACTION BY SALES) | | EMPLOYEE 1 | B | EMPLOYEE 1 |
| 24999 | REC INC | EA LER | 1:55 PM, JAN 19, 2017 | 1D | DRAW | DECLINED LETTER SENT (READY FOR FINAL REVIEW) | | EMPLOYEE 1 | B | EMPLOYEE 1 |
| 25635 | WHOLE PROD CORP. INC | MICH ALEX | 7:49 PM, JAN 31, 2017 | 5D | NEW | MODEL2 (READY FOR FINAL REVIEW) | | EMPLOYEE 2 | B | EMPLOYEE 2 |
| 25926 | COPEN AU GAR | AAR RUN | 2:18 PM, FEB 6, 2017 | 1D | RENEWAL | MODEL2 (READY FOR FINAL REVIEW) | | EMPLOYEE 2 | B | EMPLOYEE 2 |
| 27001 | BAD WOLF CO. | | 1:23 PM, FEB 7, 2017 | | NEW | AWAITING UNDERWRITING | | | D | |

*FIG. 12F*

```
                    FRAUD CHECK ——— 2905                    ✕ ——— 2960

2910 ——— FRAUD CHECK:      PASS ——— 2935
    2915 ——— PERFORMER:        MGROVER ——— 2940
2964
    2920 ——— NUMBER:           (210) 622-9460 ——— 2945
    2925 ——— COMMENTS:         TALKED WITH THE BORROWER ——— 2950
    2930 ——— DATE:             2017-03-29T18:21:19 ——— 2955

```
2960 ——— FRAUD CHECK: PASS    ▽
                                    2962

2964 ——— PERFORMER: MGROVER
                              2966

2968 ——— NUMBER: (210) 622-9460 |              ✕
                                    2970
                                                      2980

2972 ——— DATE: 2017-03-29T18:21:19
                                    2974
                                                    SAVE
                                            1305C
                                                      2976
```

FIG. 18O

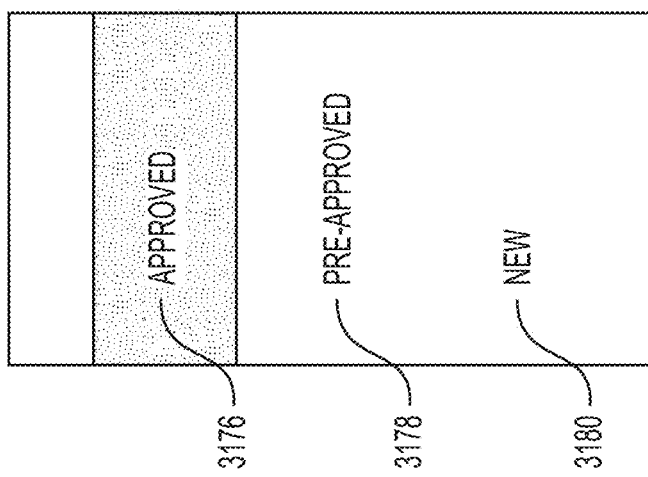

27000

27004

27020 27008 RISK MODIFIERS DETAILS 27012 27016

| EQUIFAX | VALUE | DEC. | RANK |
|---|---|---|---|
| FICO | 677 | 5 | 2 |
| INQUIRIES | 0 | 1 | 6 |
| LTI | 18.26% | 4 | 4 |
| REVOLVING BALANCE | $66,895 | 1 | 5 |
| OLDEST TRADE | 8/17/2001 | 4 | 1 |
| AVERAGE NET INFLOW | -$5,978 | 1 | 7 |
| INFLOW TREND | 54.97% | 10 | 3 |

27028 — MODIFIER 100.00%
SCORE 18.02%
TT 12
MAX LINE 35,000

27024

| TRANSUNION | VALUE | DEC. | RANK |
|---|---|---|---|
| FICO | 685 | 5 | 1 |
| INQUIRIES | 1 | 5 | 6 |
| LTI | 21.91% | 3 | 4 |
| REVOLVING BALANCE | $66,895 | 1 | 5 |
| OLDEST TRADE | 8/17/2001 | 5 | 3 |
| AVERAGE NET INFLOW | -$5,978 | 1 | 7 |
| INFLOW TREND | 54.97% | 10 | 2 |

MODIFIER 100.00%
SCORE 15.19%
27500 TT 10
27504 MAX LINE 42,000
27508

FINAL TT                12

CREDIT DETAILS

TRADES MP=6007, MPWOM=739, R=3507/88505

| | | | |
|---|---|---|---|
| 2014-05-30 | 0 | 0 R 1 | DISCOVER BANK |
| 2014-03-08 | 1407 | 704 I 1 | AMERICAN HONDA FINAN -0.89% |
| 2013-05-24 | 147231 | 1632 M 1 | CENTRAL MORTGAGE CO |
| 2012-02-22 | 304071 | 3636 M 1 | CAPITAL ONE NA |
| 2011-07-28 | 0 | 2893 M 1 | CAPITAL ONE NA |
| 2010-09-17 | 3507 | 35 R 1 | CAPITAL ONE BANK USA |
| 2008-04-02 | 0 | 0 R 1 | CHASE CARD |
| 2007-12-29 | 0 | 0 R 1 | MACY'S/DSNB |
| 2006-10-00 | 0 | 0 R 1 | CAPITAL ONE |
| 2004-11-29 | 0 | 0 R 1 | BANK OF AMERICA |
| 2004-02-23 | 0 | 0 R 1 | AMERICAN EXPRESS |
| 2004-01-02 | 0 | 0 R 1 | AMERICAN EXPRESS |
| 2003-12-00 | 0 | 0 R 1 | BANK OF AMERICA |
| 2003-06-00 | 0 | 0 R 1 | BANK OF AMERICA |
| x 2013-05-24 | 0 | 1369 M 1 | PULTE MORTGAGE LLC |
| x 2007-12-29 | 0 | 0 R 1 | AMEX/DSNB |
| x 2006-10-00 | 0 | 0 R 1 | CHASE CARD |
| x 2006-10-00 | 0 | 651 I 1 | BMW FINANCIAL SERVIC - 9.3% |
| x 2005-12-07 | 0 | 0 R 1 | CITICARDS CBNA |
| x 2003-07-11 | 0 | 0 R 1 | SYNCB/JC PENNYS |

[ HIDE EQF ]   [ TU RAW ]

FIG. 21C

Hard Cut Details

| | |
|---|---|
| Bankruptcy | 0 |
| # current DQ | 0 |
| FICO | 850 |
| Inquiries | 0 |
| DTI | 6007 /23333 (25%) |
| # collections | Not Present |
| # judgment | 0 |
| # lien | 0 |
| History | |
| DTR | N/A |
| Revenue | $1000K |
| Income | $280K |
| US Person | Pass |
| State | CA |
| Country | N/A |
| Age of business | 2 |
| Valid industry | Pass |
| No business DQ | N/A |
| < 5 new fin trades | N/A |
| < 6 bus fin in | 0 |
| Business tax liens | N/A |
| Cash flows | Pass |
| Not a criminal | Pass |

Cashflow Details

| | |
|---|---|
| # Accts conn | 2 |
| # Accts checked | 1 |
| | |
| Avg. In | $0 |
| Avg. Out | $287 |
| Avg. Net | -$287 |
| | |
| Current Bal. | $910 |
| Starting Bal. | $2,633 |
| | |
| Avg. # of Credit | 2 |
| Avg. # of Debits | 2 |
| | |
| Avg. 6mth NSFs | 0 |
| Avg. 3mth NSFs | 0 |
| | |
| Online loans | 0 |
| | |
| CF Test Range | 1.7- 3.2 |

- 3 Mths 1.7
- 4 Mths 2.3
- 5 Mths 2.8
- 6 Mths 3.2

UW Decision  FAIL  1370

Fig. 21E

| | | More Amount | | Less Rate |
|---|---|---|---|---|
| Amount | $ 50000 | $ 37000 | $ 25000 |
| Term | 1.5 | 1.5 | 1.5 |
| Bir | % 2.08 | % 2.08 | % 0.91 |
| Rate | % 15.75 | % 14 | % 10.5 |
| Success Fee | % 3.95 | % 3.95 | % 3.95 |
| Service Fee | % 1 | % 1 | % 1 |
| APR | % 21.35 | % 19.57 | % 16.02 |
| CM Eligible? | | | |

Fig. 21F

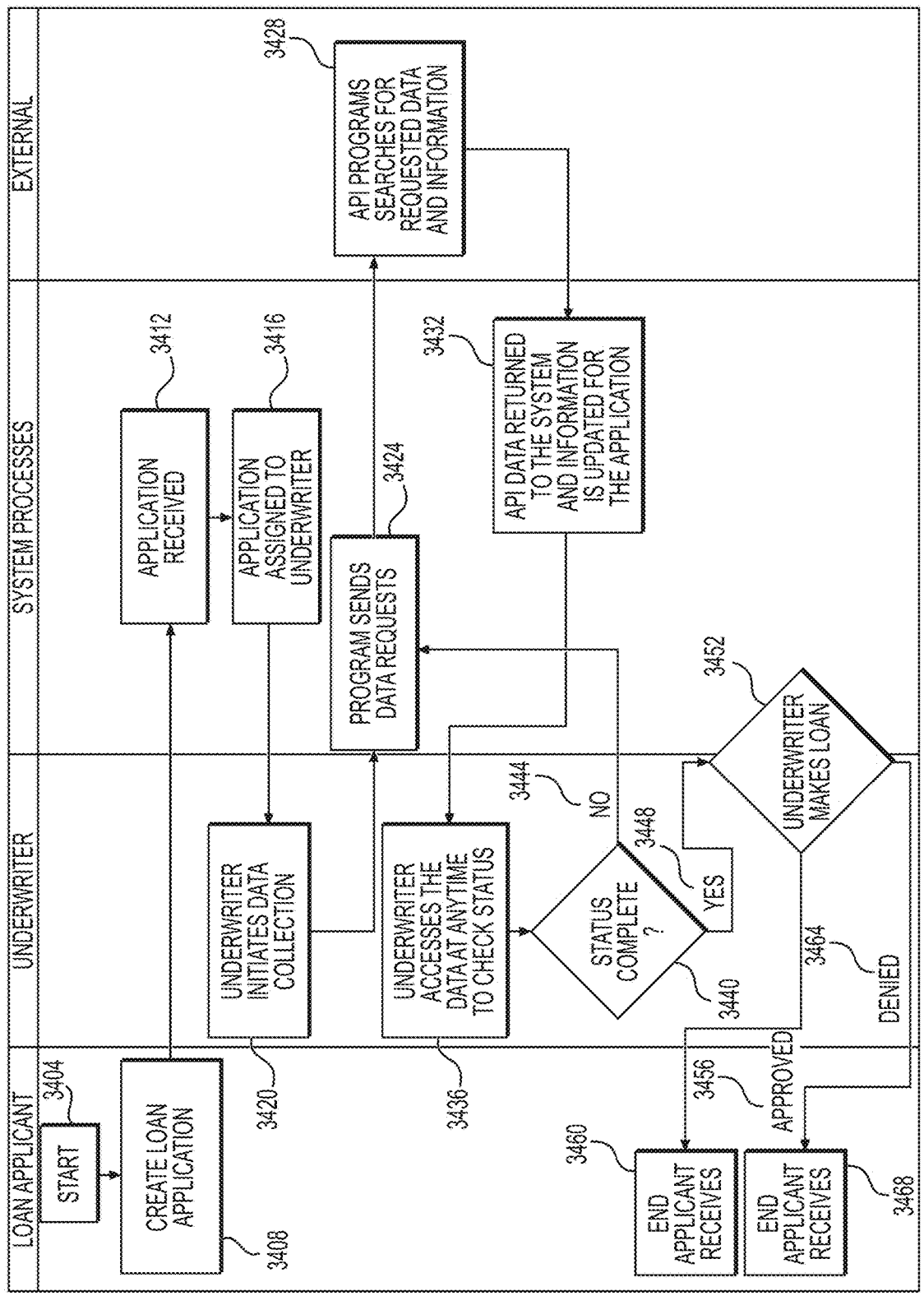

Identify Banks Code

Fig. 24A

```
BankIdentifier_Dic = {\
        "P.O. Box 15284.*":"BAC", \
        ".*\(800\)\s*BANK-BBT.*":"BBT", \
        ".*JPMorgan\s*Chase\s*Bank,\s*N\.A.*":"JPM", \
        ".*Capital\s*One,\s*N\.A\.,\s*Member\s*FDIC.*":"COF", \
        "Wells\s*Fargo.*Business.*Checking":"WFC", \
        "Wells\s*Fargo\s*Combined\s*Statement\s*of\s*Accounts":"WFC", \
        ".*Wells\s*Fargo\s*Bank,\s*N\.A\..*":"WFC", \
        "Analyzed\s*Business\s*Checking":"WFC2", \
        ".*pnc\.com.*":"PNC", \
        "TD\s*Business.*":"TD", \
        "\s*SUNTRUST\s*BANK .*":"STI", \
        ".*navyfederal.org.*":"NVF", \
        "\s*www\.huntington\.com/":"HBAN",
        }
```

Identify Transfers and Loans

Fig. 24C

```
Keyword_Dic = { \
        "transfer":("transfer", "xfer", "trf", "Venmo", "Zelle",
"Overdraft.*Protection", "Insufficient.*Protection",), \
        "transfer_exceptions":("Wire", "Square", "Stripe", "Shopify", "Bankcard",
"Transfer Payment", "Transfer Fee", \
                "Advance.*From",), \
        "overdraft":("overdraft", "over draft", "ovdr", "insufficient", "not
sufficient", "returned item.*fee",), \
        "return":("return", "retn", "reversal", "refund", "reverse",), \
        "loan":("loan", "kabbage", "on deck", "ondeck", "bluevine", "fundbox",
"accion", "accioneast", "lending club", "fox capital", \
                "yellowstone", "swift capital", "swift financial", "eincap", "ein cap",
"funding circle", "wise funding group", "wisefundinggroup", \
                "prosper", "shopify capital", "opportunity", "power up lending",
"powerup lending", "LENDR ONLINE", "SATURN FUNDING", "WORLD GLOBAL
CAP",)
        }
```

Fig. 24B

BANK OF AMERICA DETAILS->
BAC_Dic = {
    "Name":"BAC",

"Header":("Date\s*Description\s*Amount.*", "Date\s*Transaction\s*description\s*Amount"), "Summary_Begin":("Account\s*summary",),
    "Summary_End":(".*Ending\s*balance\s*on .*",),
    "Credit_Begin":("Deposits\s*and\s*other\s*\w*",),
    "Credit_End":("Total\s*deposits\s*and\s*other.*",),
    "Debit_Begin":("Withdrawals\s*and\s*other\s*\w*", "Other\s*subtractions", "Service\s*fees",),
    "Debit_End":("Total\s*withdrawals\s*and\s*other.*", "Total.*subtractions.*", "Total\s*service\s*fees.*", "Daily\s*ledger\s*balances",),
    "Checks_Begin":("Checks",),
    "Checks_End":("\s*Total\s*checks.*",), "Continue":(".*    continued.*",), "Begin_Balance":("Beginning\s*balance\s*on.*",),
    "End_Balance":(".*Ending\s*balance\s*on .*",),
    "Total_Credits":("Deposits\s*and\s*other .*",), "Account_Number":(".*Account\s*number: .*",),
    "Date_Start":(".*Beginning\s*balance\s*on .*",),
    "Date_End":(".*Ending\s*balance\s*on .*",)
}

```
def generate_lead_score(preapproved_amount, age, income, revenue,
is_veteran):
    score = 0 if preapproved_amount >= 36000:
        score += 21
    elif preapproved_amount >= 25000:
        score += 18 if age >= 4:
        score += 11
    elif age >= 3:
        score += 10 if income >= 150000:
        score += 18
    elif income >= 80000:
        score += 12 if revenue >= 1000000:
        score += 21
    elif revenue >= 500000:
        score += 13
    elif revenue >= 100000:
        score += 12 if is_veteran:
        score += 3 return score
```

Fig. 25A

```
def get_lead_grade(score):
    if score >= 69:
        return 'A+'
    if score >= 64:
        return 'A'
    if score >= 52:
        return 'B'
    if score >= 36:
        return 'C'
    if score >= 21:
        return 'D'
    return 'D-'
```

Fig. 25B

| | 1 Year | | | | | | 1.5 Years | | | | | | Max Credit Limits | | |
|---|---|---|---|---|---|---|---|---|---|---|---|---|---|---|---|
| TT | Loss | Rate | Threshold | Modifier 1 | Fee | Modifier 2 | TT | Loss | Rate | Threshold | Modifier 1 | Fee | Modifier 2 | A | B | C |
| 1 | 0.87% | 7.52% | 40,002 | 4.5% | 3.95% | 0.87% | 1 | 0.91% | 7.59% | 40,002 | 4.5% | 3.95% | 0.91% | 50,000 | 75,000 | 100,000 |
| 2 | 1.98% | 9.47% | 40,002 | 3.8% | 3.95% | 1.98% | 2 | 2.08% | 9.69% | 35,002 | 3.8% | 3.95% | 2.08% | 50,000 | 75,000 | 100,000 |
| 3 | 3.00% | 11.31% | 35,002 | 3.5% | 3.95% | 3.00% | 3 | 3.15% | 11.65% | 30,002 | 3.5% | 3.95% | 3.15% | 50,000 | 70,000 | 90,000 |
| 4 | 3.90% | 12.99% | 30,002 | 3.5% | 3.95% | 3.90% | 4 | 4.11% | 13.46% | 25,002 | 4.0% | 3.95% | 4.11% | 45,000 | 60,000 | 75,000 |
| 5 | 4.70% | 14.52% | 25,002 | 4.0% | 3.95% | 4.70% | 5 | 4.74% | 14.59% | 25,002 | 3.8% | 3.95% | 4.74% | 40,000 | 55,000 | 65,000 |
| 6 | 5.40% | 15.90% | 25,002 | 4.3% | 4.95% | 5.40% | 6 | 5.45% | 16.24% | 25,002 | 3.4% | 4.95% | 5.45% | 35,000 | 50,000 | 60,000 |
| 7 | 6.01% | 17.15% | 15,002 | 4.1% | 4.95% | 6.01% | 7 | 6.07% | 17.26% | 15,002 | 3.1% | 4.95% | 6.07% | 32,500 | 45,000 | 50,000 |
| 8 | 6.55% | 18.15% | 15,002 | 3.6% | 4.95% | 6.55% | 8 | 6.62% | 18.28% | 15,002 | 2.5% | 4.95% | 6.62% | 30,000 | 40,000 | 45,000 |
| 9 | 7.04% | 19.20% | 15,002 | 3.3% | 4.95% | 6.75% | 9 | 7.12% | 19.36% | 15,002 | 2.2% | 4.95% | 7.12% | 27,500 | 35,000 | 42,500 |
| 10 | 7.41% | 19.90% | 15,002 | 3.1% | 4.95% | 6.25% | 10 | 7.53% | 20.11% | 15,002 | 1.8% | 4.95% | 7.53% | 25,000 | 32,500 | 40,000 |
| 11 | 7.88% | 20.77% | 15,002 | 2.7% | 4.95% | 5.75% | 11 | 8.00% | 21.17% | 15,002 | 1.3% | 4.95% | 8.00% | 25,000 | 30,000 | 37,500 |
| 12 | 8.38% | 21.89% | 15,002 | 2.1% | 4.95% | 5.25% | 12 | 8.53% | 22.17% | 15,002 | 0.6% | 4.95% | 8.53% | 22,500 | 27,500 | 35,000 |
| 13 | 8.97% | 23.00% | 15,002 | 1.7% | 4.95% | 4.50% | 13 | 9.13% | 23.51% | 10,002 | 0.0% | 4.95% | 8.35% | 22,500 | 27,500 | 32,500 |
| 14 | 9.69% | 24.56% | 10,002 | 1.2% | 4.95% | 3.50% | 14 | 9.88% | 24.93% | 10,002 | 0.0% | 4.95% | 7.57% | 20,000 | 25,000 | 30,000 |
| 15 | 10.58% | 26.50% | 10,002 | 0.2% | 4.95% | 2.50% | 15 | 10.81% | 26.94% | 10,002 | 0.0% | 4.95% | 5.56% | 20,000 | 22,500 | 25,000 |
| 16 | 12.75% | 29.25% | 6,002 | 0.0% | 4.95% | 0.00% | 16 | 13.08% | 32.16% | 6,002 | 0.0% | 4.95% | 0.34% | 10,000 | 15,000 | 20,000 |
| 17 | 14.50% | 29.25% | 6,002 | 0.0% | 4.95% | 0.00% | 17 | 15.21% | 32.50% | 6,002 | 0.0% | 4.95% | 0.00% | 6,000 | 10,000 | 12,500 |
| 18 | 16.27% | 29.25% | 6,002 | 0.0% | 4.95% | 0.00% | 18 | 17.12% | 32.50% | 6,002 | 0.0% | 4.95% | 0.00% | 4,000 | 8,500 | 10,000 |
| 19 | 18.94% | 29.25% | 6,002 | 0.0% | 4.95% | 0.00% | 19 | 20.04% | 32.50% | 6,002 | 0.0% | 4.95% | 0.00% | 4,000 | 6,500 | 10,000 |
| 20 | 23.45% | 29.25% | 6,002 | 0.0% | 4.95% | 0.00% | 20 | 25.06% | 32.50% | 6,002 | 0.0% | 4.95% | 0.00% | 2,000 | 4,500 | 7,000 |

Fig. 26

Doc_Identifier = [("1040", ("For the year Jan. 1 -Dec. 31, 2017, or other tax year beginning, 2017, ending, 20 See separate instructions.", "U.S. Individual Income Tax Return   OMB No. 1545-0074   IRS Use Only - -Do not write or staple in this space."), "", ""), ("Schedule C", ("SCHEDULE C   Profit or Loss From Business   OMB No. 1545-0074",), "", ""), ("1120", ("Form 1120   U.S. Corporation Income Tax Return   OMB No. 1545-0123", "Internal Revenue Service   Go to www.irs.gov/Form1120 for instructions and the latest information."), "1120", "1120S"), ("1120S", ("Form 1120S   U.S. Income Tax Return for an S Corporation   OMB No. 1545-0123", "Internal Revenue Service   Go to www.irs.gov/Form1120S for instructions and the latest information."), "1120S", ""), ("1065", ("Form 1065   U.S. Return of Partnership Income   OMB No. 1545-0123", "Internal Revenue Service   Go to www.irs.gov/Form1065 for instructions and the latest information."), "1065", "")

];

"Schedule C" = [("", "Name of proprietor   Social security number (SSN)", "V"), ("", "A  Principal business or profession, including product or service (see instructions)   B  Enter code from instructions", "V"), ("", "C  Business name. If no separate business name, leave blank.   D  Employer ID number (EIN), (see instr.)", "V"), ("", "E  Business address (including suite or room no.)", "HS")

]

1065 = [ ("", "A  Principal business activity   Name of partnership   D  Employer identification number", "V") ];

1120 = [("", "A   Check if:   Name   B  Employer identification number", "V")];

1120S = [("", "A  Selection effective date   Name   D  Employer identification number", "V") ];

FIG 27A

Legend_1040 = [("Name", "Your first name and initial   Last name   Your social security number", "Your", "Name"), ("SSN", "Your first name and initial   Last name   Your social security number", "Your", "SSN"), ("Spouse Name", "If a joint return, spouse's first name and initial   Last name   Spouse's social security number", "spouse", "Spouse Name"), ("Spouse SSN", "If a joint return, spouse's first name and initial   Last name   Spouse's social security number", "spouse", "Spouse SSN"), ("Address", "Home address (number and street). If you have a P.O. box, see instructions.   Apt. no.   Make sure the SSN(s) above", "Home", "Address"), ("City State ZIP", "City, town or post office, state, and ZIP code. If you have a foreign address, also complete spaces below (see instructions).   Presidential Election Campaign", "Presidential", "City State ZIP"), ("Wages", "Wages, salaries, tips, etc. Attach Form(s) W-2", "Wages", "H"), ("Schedule C", "Business income or (loss). Attach Schedule C or C-EZ", "Business", "H"), ("IRA Distributions", "IRA distributions Taxable amount", "distributions", "H"), ("Pensions Annuities", "Pensions and annuities Taxable amount", "annuities", "H"), ("Schedule E", "Rental real estate, royalties, partnerships, S corporations, trusts, etc. Attach Schedule E", "royalties", "H"), ("Social Security", "Social security benefits Taxable amount", "benefits", "H"), ("Other Personal Income", "Other income. List type and amount", "List", "H"),

Legend_ScheduleC = [("Revenues", "on Form W-2 and the 'Statutory employee' box on that form was checked", "Statutory", "H"), ("COGS", "Cost of goods sold (from line 42)", "goods", "H"), ("Gross Profit", "Gross profit. Subtract line 4 from line 3", "Gross profit", "H"), ("Total Income", "Gross income. Add lines 5 and 6", "income", "H"), ("Total Expenses", "Total expenses before expenses for business use of home. Add lines 8 through 27a", "Total", "H"), ("Profit", "Tentative profit or (loss). Subtract line 28 from line 7", "Tentative", "H"),

];

Legend_1065 = [("Revenues", "Gross receipts or sales", "receipts", "H"), ("COGS", "Cost of goods sold (attach Form 1125-A)", "goods", "H"), ("Gross Profit", "Gross profit. Subtract line 2 from line 1c", "Gross profit", "H"), ("Total Income", "Total income (loss). Combine lines 3 through 7", "income", "H"), ("Compensation of Officers", "Guaranteed payments to partners", "Guaranteed", "H"), ("Total Expenses", "Total deductions. Add the amounts shown in the far right column for lines 9 through 20", "shown", "H"), ("Profit", "Ordinary business income (loss). Subtract line 21 from line 8", "Ordinary", "H"),

];

Legend_1120 = [("Revenues", "Gross receipts or sales", "receipts", "H"), ("COGS", "Cost of goods sold (attach Form 1125-A)", "goods", "H"), ("Gross Profit", "Gross profit. Subtract line 2 from line 1c", "Gross profit", "H"), ("Total Income", "Total income. Add lines 3 through 10", "income", "H"), ("Compensation of Officers", "Compensation of officers (see instructions--attach Form 1125-E)", "officers", "H"), ("Total Expenses", "Total deductions. Add lines 12 through 26", "Total deductions", "H"), ("Profit", "Taxable income before net operating loss deduction and special deductions. Subtract line 27 from line 11", "special", "H"),

Legend_1120S = [("Revenues", "Gross receipts or sales", "receipts", "H"), ("COGS", "Cost of goods sold (attach Form 1125-A)", "goods", "H"), ("Gross Profit", "Gross profit. Subtract line 2 from line 1c", "Gross profit", "H"), ("Total Income", "Total income (loss). Add lines 3 through 5", "income", "H"), ("Compensation of Officers", "Compensation of officers (see instructions--attach Form 1125-E)", "officers", "H"), ("Total Expenses", "Total deductions. Add lines 7 through 19", "Total deductions", "H"), ("Profit", "Ordinary business income (loss). Subtract line 20 from line 6", "Ordinary", "H"),

];

Master_Legend = {"1040" : Legend_1040,

"Schedule C" : Legend_ScheduleC,

"1065" : Legend_1065,

"1120" : Legend_1120,

"1120S" : Legend_1120S  }

FIG 27D

… # USER INTERFACE WITH MOVEABLE, ARRANGEABLE, MULTI-SIDED COLOR-CODED TILES

RELATED APPLICATIONS

This application claims priority to provisional patent application 62/537,823, filed Jul. 27, 2017, and to co-pending U.S. application Ser. No. 16/047,421 filed Jul. 27, 2018 entitled "User Interface with Moveable, Arrangeable, Multi-Sided Color Coded Tiles." This application is related to U.S. application Ser. No. 15/369,096 entitled "A User Interface and System For Using a Non-Payment Dependent Note Retail Investor Securities Structure To Conduct Investor-Directed Or Affinity-Based Online Marketplace Lending", filed on Dec. 5, 2016 which claims priority to two provisional patent applications U.S. Patent Application Ser. No. 62/296,964, filed Feb. 18, 2016 and U.S. Patent Application Ser. No. 62/263,331, filed Dec. 4, 2015.

This application is also related to the following co-filed 5 applications, naming the same inventors and claiming priority to the same provisional patent application:

U.S. patent application Ser. No. 16/047,386, entitled "Automated Processing of Loan Documentation Including Cashflow Analysis"; U.S. patent application Ser. No. 16/047,441, entitled "Dynamic Dashboard User Interface With Status Indication and Risk Adjustment for Loan Underwriter"; U.S. patent application Ser. No. 16/047,467, entitled "Automated Processing and Scoring of Electronic Loan Applications for Underwriter Approval"; U.S. patent application Ser. No. 16/047,487, entitled "User Interface with Real Time Risk Adjustment And Approval for Underwriter Processing Of Electronic Loans"; and U.S. patent application Ser. No. 16/047,514, entitled "System for Automated Processing and Approving of Electronic Loans".

This patent application hereby incorporates by reference in its entirety each of the above patent applications.

TECHNICAL FIELD

Inventions in this specification relate to user interfaces, dashboards and user interactions with an automated loan underwriting system, and, in at least one embodiment, relate to a user interface for use in an automated system of collecting, categorizing, displaying, and monitoring information needed in the underwriting of loan applications.

BACKGROUND

Underwriting of loans traditionally was performed by collecting information manually and compiling the information into a paper file for review by an underwriter. Traditional underwriting can be improved by providing an automated method that allows an underwriter to efficiently view, update, and evaluate a borrower's file and to efficiently collect, display, and evaluate the borrower's loan data to make underwriting decisions.

This need is especially strong in loans of less than $500,000. Because of the manually intense task of collecting data for and evaluating a loan application, underwriting costs (particularly as a percentage of the loan value) for these smaller loans make it impractical to perform an in-depth analysis of the data to make the most accurate lending decisions.

In today's complex lending environment, sifting through paper files and spreadsheets created for each individual application is time consuming, inaccurate, and inefficient. Known systems provide no visual cues for an underwriter to utilize in performing their tasks—let alone performing their tasks more quickly.

SUMMARY OF THE INVENTION

An automated loan underwriting processing system and a user interface for interacting with the automated loan underwriting processing system are disclosed herein.

By providing an intuitive interface that allows underwriters to rapidly understand a borrower's files, almost at a glance, loan underwriting can be made less laborious, swift and more accurate. User interfaces described herein provide helpful cues and present information that can be easily visually processed by an underwriter. By providing user interfaces that quickly and easily communicate information to underwriters as part of automated loan processes, the invention provides a system that allows an underwriter to expeditiously, consistently, and accurately make underwriting decisions. This reduces the risk to the lending institution and increases the amount of small loans that can be made to clients in need and worthy of such loans.

BRIEF DESCRIPTION OF DRAWINGS

FIG. 12A is a screenshot of an exemplary underwriter dashboard.

FIG. 12D is an expanded view of the "My Team's Queue" area of the exemplary underwriter dashboard.

FIG. 12E is an expanded view of the "Applications" area of the exemplary underwriter dashboard.

FIG. 12F is an expanded view of the additional information shown in the "All Applications" area of the exemplary underwriter dashboard.

FIGS. 18C and 18O are screenshots of an exemplary fraud check tile where FIG. 18O shows a "Save" button that appears on the fraud check tile to enable any changes to the information regarding the fraud check of FIG. 18C to be saved.

FIG. 18N is a screenshot of the front or back of an exemplary cashflow tile that is turnable or flippable.

FIG. 19C is a screenshot of a pull-down menu for displaying and selecting the status that corresponds to the underwriter control panel and that is displayed in response to a user selecting the "Status" button on the UCP of FIG. 19A.

FIGS. 21A and 21B-21C are screenshots of exemplary additional information panes that correspond to an accompanying tile (e.g., the Risk Modifier tile of FIG. 18J and the Credit tile of FIG. 18B, respectively).

FIG. 21D is a screenshot of an exemplary detailed information pane showing Hard Cuts Details.

FIG. 21E is a screenshot of an exemplary detailed information pane showing Cashflows Details.

FIG. 21F is a screenshot of an exemplary detailed information pane showing Offers Details;

FIG. 22 is an overall flow diagram of an exemplary loan application submission and underwriting process as described herein.

FIGS. 24A-24C are exemplary portions of a grammar used to automatically process bank monthly statement or other banking records related to the underwriting process of a loan.

FIGS. 25A and 25B are exemplary functions used to grade a potential loan to be processed by an underwriter.

FIG. 26 is a lookup table of interest rates to be charged to potential borrowers based on a set of risk factors and other risk information.

FIGS. 27A-27D are an exemplary partial grammar for defining how a series of tax documents should be automatically processed to obtain relevant information for underwriting.

DETAILED DESCRIPTION

Definitions

Figure 1:
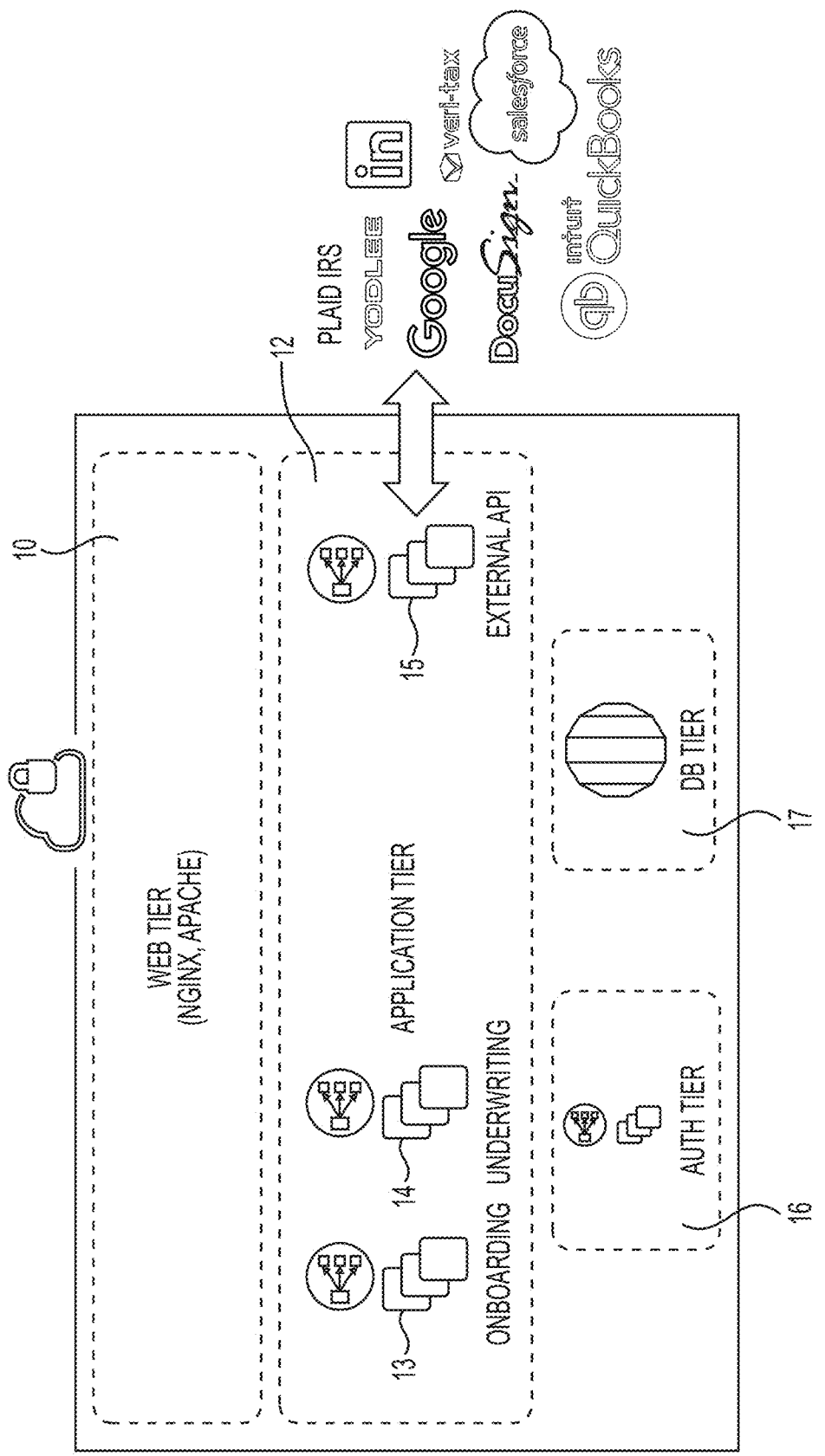
FIG. 1 is a reference architecture diagram of a cloud-based lending system including underwriting functions for the lending system.

"Individual loan applications" are loan applications initiated by a potential borrower, and examined by an underwriter. These may also be referred to as deals, because the underwriter is making a decision on whether or not to offer a deal to the loan applicant.

"Loan applicants" may be individual persons, businesses, or any other legally recognized entity. Such loan applicants may be referred to throughout as borrower, prospective borrower, customer, client, or requestor.

An "underwriter" is an individual with responsibilities for decision-making on whether or not to approve a loan application made by a loan applicant. An underwriter is the primary user of the user interface and automated underwriting system described herein, and may be referred to throughout as the user. There may be different levels of underwriters (e.g., "junior" underwriters may only be allowed to underwrite loans up to a smaller maximum value that "senior" underwriters, and junior underwriters may not be allowed to grant the same level of "exemptions" as a senior underwriter without supervisor approval).

A "tile" is a geometric shape that is superimposed on the underwriter dashboard described herein to display data and information that is collected by the underwriting process. Such tiles may be any geometric shape, and the tiles may be of any size. The tiles contain any number of features on them, including icons that allow the user to select (e.g., click using a mouse or other selecting device attached to the computer or activate using a keyboard hotkey) the icons, such that when an icon is selected, any number of dynamic processes occur, such as displaying additional information, turning the tile to display additional graphical or textual information, or taking the user to another screen.

"Turning a tile" describes the function of a user selecting an icon (or specified location) on the tile that rotates the tile in its current location to display additional information, graphs, charts, or any other graphic or textual display that the system or the user has programmed the tile to display. This function may also be referred to throughout as "flipping" or "rotating." For tiles that support turning or rotating, reference will be made herein to the "front side" and the "back side" of the tile if the tile supports only two sides/faces. However, tiles may support more than two faces, such as would be visible when rotating a cube. In such a configuration, the tile preferably includes controls for selecting which way the tile is to be rotated (e.g., left, right, up down).

Tiles may also be rotated by using "swiping gestures" which cause the tile to rotate in the direction of the swiping gesture.

A "Request ID" or "Request ID" is a system generated or user generated identification for an individual loan application. This may be either numerical, alpha-numerical, or any type of identification that the system is programmed to accept. This may be referred to throughout as an identification number, loan identification number, or application number for which an underwriting decision is made or is to be made.

A "hard cut" is a pre-determined parameter that an underwriter or company sets as a maximum or minimum (depending on the type of data) required for consideration for a potential loan offer. For example, a company may determine that a minimum FICO score of 600 is required for an applicant to qualify for a loan from the company. If the applicant's FICO score is determined to be 599 or less, the applicant fails the hard cut (of 600), and therefore is ineligible for a loan. Hard cuts may be determined by the underwriter or company based on experience from previous loan repayment performance, through industry standards, or any number of other methods. Hard cuts may also be based on an amount of a loan as opposed to being a universal requirement. For example, a company may determine that a minimum FICO score of 600 is required for an applicant to qualify for a loan above $10,000 from the company. If the applicant's FICO score is determined to be lower than 600 (e.g. 590), the applicant fails the hard cut (of 600) for a loan of above $10,000, and therefore is ineligible for a loan above $10,000. However, the applicant might still be eligible for a loan of a smaller amount (e.g., $5,000).

A "FICO score" is a credit score developed by FICO, a company that specializes in what's known as "predictive analytics," which means they take information and analyze it to predict what's likely to happen. In the case of credit scores, FICO looks at a range of credit information and uses that to create scores that help lenders predict consumer behavior, such as how likely (or not) someone is to pay their bills on time, or whether or not they are able to handle a larger credit line. Scores developed by FICO can also be used to forecast which accounts are most likely to end up included in bankruptcy, or which ones will be most profitable. Generally, the FICO score range is 300 to 850, with the higher number representing less risk to the lender or insurer. Consumers with excellent FICO scores (usually around 760 or higher, though every lender has different standards) are likely to get the best rates when they borrow.

High Level View of Reference Architecture

Referring to FIG. 1, a reference architecture diagram is provided that depicts an exemplary architecture for implementing portions of the inventions disclosed herein. The architecture may be run on an underwriter's local machine, but preferably the architecture is implemented as a cloud-based system. The architecture preferably performs automatic scaling to the number of processors necessary to provide low latency interactions with the users of the system (based on the number of simultaneous requests being made of the system). Exemplary cloud-based services upon which the underwriting service can be implemented include, but are not limited to, Amazon Web Services (AWS), Amazon Aurora, and Microsoft Azure.

At a high level there are four primary tiers in the exemplary Marketplace/P2P reference architecture as depicted in FIG. 1.

1. Web Tier 10—This tier receives all external requests and redirects those requests to the appropriate application tier service. The example uses the NGINX web-server which is an HTTP/HTTPS server and reverse proxy. NGINX is known for its high performance, stability, rich feature set, simple configuration, and low resource consumption. Other web servers (e.g., Apache) may be used.

2. Application Tier 12—In this example, this tier consists of three services:
   a. Onboarding Service 13—This example service handles all borrower onboarding data. A REST API handler receives data from clients to save to the database. Calls are made to the underwriting platform for automated pre-approval decisioning. Calls are also made through the External API Service 15 to handle external information transfers (as described in greater detail below).
   b. Underwriting/Decision Service 14—This example service receives calls from onboarding service to initiate the pre-approval process. It displays the status of each application to underwriting and sales teams, and has a built in workflow checklist and notes repository. This service makes API calls to the External API service to retrieve necessary data for underwriting. It also makes API calls to Equifax and TransUnion.
   c. External API Service 15—This example service interacts with external APIs such as Google Places, LinkedIn, Yodlee, Docusign, Veritax, Salesforce.com, Equifax, TransUnion and QuickBooks to help a prospective borrower quickly move through the application and provide all the data digitally to underwriting.

3. Authorization Tier 16—This example tier manages user accounts, login calls and permissions.

4. Database Tier 17—This example tier uses a clod-based database (e.g., an Amazon Aurora database with MySQL tools). The Onboarding Services API and S3 storage services are used for large files.

Basic Process Flows and Steps

Referring to FIGS. 2 through 25B, basic steps and flows of the lending system are described. The following section depicts examples of different process flows for each service.

Figure 2:
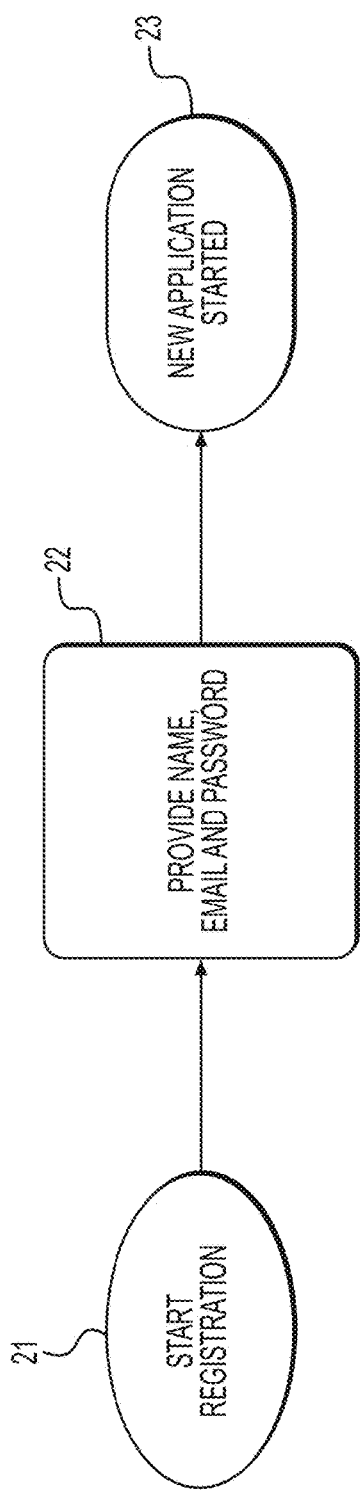
FIG. 2 is a flow diagram showing step 1 of an exemplary Onboarding Service for a lending system.

Borrower Onboarding and Application Submission Process:

In the example shown in FIG. 2, the first portion 20 of the borrower onboarding and application submission process is for the borrower to register an account with the system (starting at step 21). In step 22, the user can either a username/password combination or request the system to authenticate a user based on an existing third-party account (which requires the user to provide his/her identity to the third-party). For example, a user can be authenticated by using an existing LinkedIn account to use the Marketplace/P2P service. Following registration, a new borrower application can be started in step 23. The following example assumes that the user successfully registered an account with a username/password combination (e.g., that the user selected an unused username or email address and provided a password that meets a minimum security standard). The borrower can also elect to use a time-varying, token-based authentication or two-factor authentication for greater security.

Figure 3:
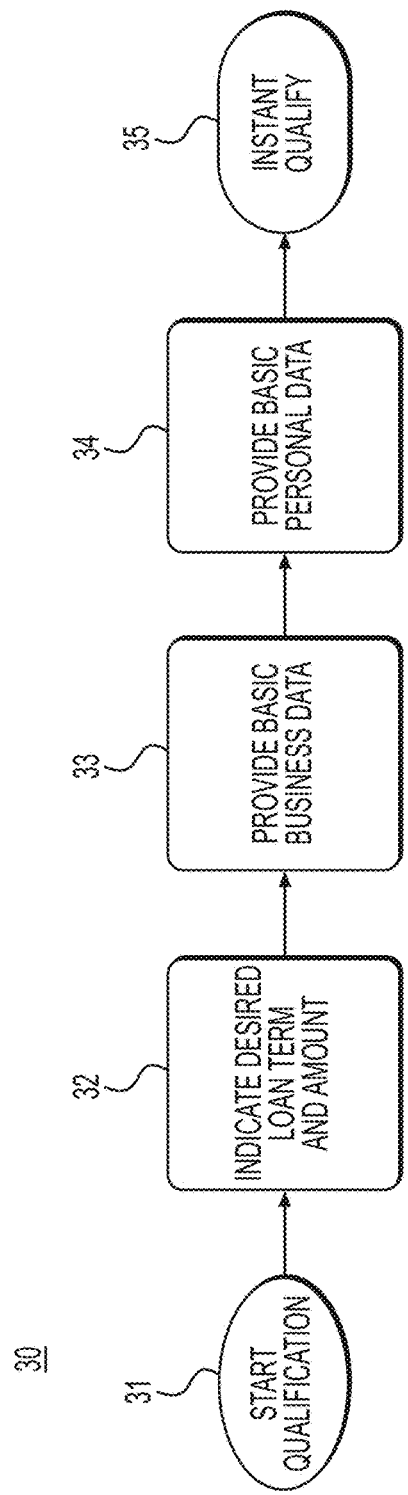
FIG. 3 is a flow diagram showing step 2 of an exemplary Onboarding Service for a lending system.

Referring to FIG. 3, the second portion 30 of the borrower onboarding and application submission process is to provide information to prequalify for a loan (starting in step 31). This requires the borrower to submit information (e.g., received in steps 32, 33, and 34) which the Onboarding Service saves directly and in real time to the database so if the borrower loses connectivity, all fields are already saved. If a borrower leaves, they can pick up where they left off once they return to the application. After submission by the customer, the Onboarding Service will call the Underwriting/Decision Service in order to establish if the customer has prequalified/preapproved in step 35. Such a prequalification/preapproval step 35 may be performed in real time or during a specified decision time (e.g., 48 hours).

Figure 4:
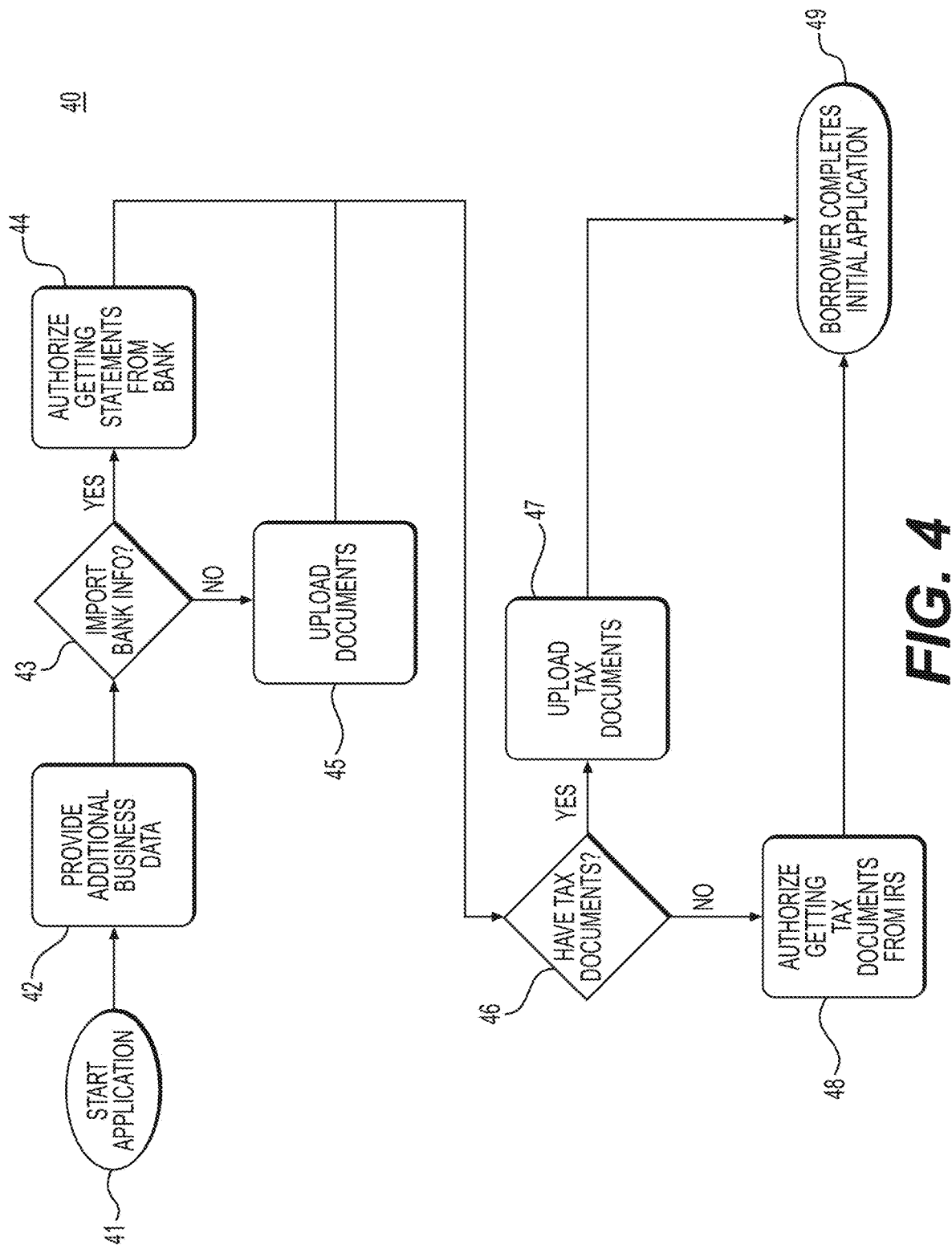
FIG. 4 is a flow diagram showing step 3 of an exemplary Onboarding Service for a lending system.

Referring to FIG. 4, the final portion 40 in the borrower onboarding and application submission process starts with step 41 which begins the process of adding additional documentation to support a loan request (by either manually uploading or electronically transferring documents as shown in steps 43, 44, 45, 46, 47, and 48). In some embodiments, electronic transfer of supporting documentation occurs by connecting to: the borrower's bank (in step 44) (e.g., via Yodlee), the IRS for tax transcripts (in step 48), and a financial statements repository (in step 42) (e.g., through QuickBooks). The result of the process flow of steps 41-48 is applying for a loan in step 49 through submission of documentation for final underwriting.

Figure 5:
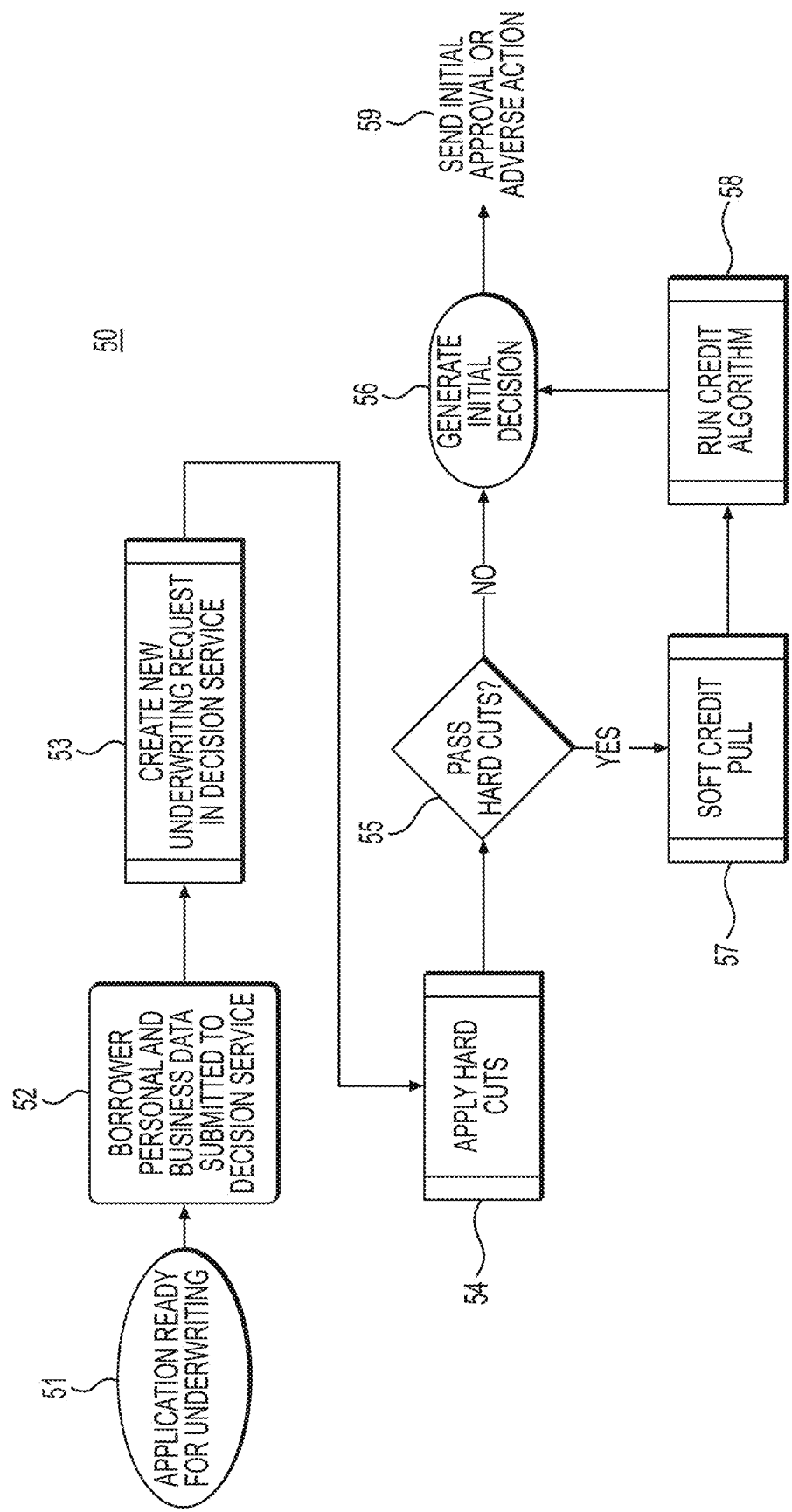
FIG. 5 is a flow diagram showing step 1 of an exemplary Underwriting/Decision Service for a lending system.
Figure 6:
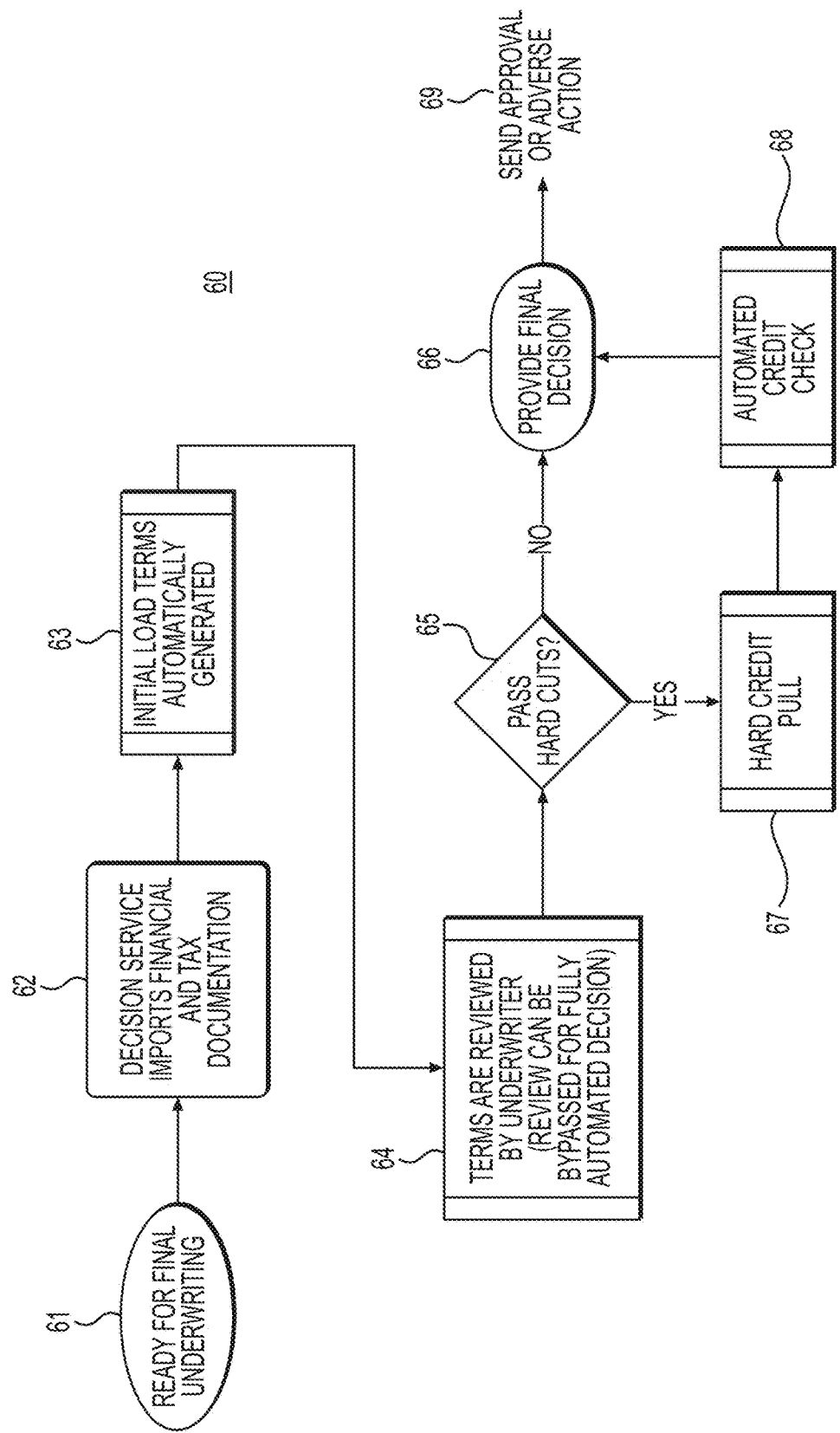
FIG. 6 is a flow diagram showing step 2 of an exemplary Underwriting/Decision Service for a lending system.

Underwriting/Decision Service:

Referring to FIGS. 5 and 6, exemplary underwriting and decision services are described. The Decision Service will follow the example process flows 50 and 60 in FIGS. 5 and 6 to make a pre-approval decision and return the decision back to the Onboarding Service for (real time) communication with the borrower. The first step 51 in the Underwriting/Decision Service 50 is to receive an indication that an application from the Onboarding Service (e.g., prepared using the processes of FIGS. 3 and 4) is ready for processing (e.g., the system indicates that all documents authorized to be obtained were obtained).

The second step 52 in the Decision Service is to confirm the sufficiency/correctness of all relevant documentation that was either manually uploaded or directly pulled from external services. A new underwriting request is created by the decision system in step 53. The collected data (from step 52) is combined and run through decisioning algorithms for consideration by an underwriter or an automated decisioning framework (e.g., run credit algorithm in step 58). Hard cuts may be applied in steps 54 and 55, credit scores may be pulled in step 57, and credit algorithms can be run in step 58. Once the review has been completed, a initial decision by the automated decision system is generated in step 56 and returned to the borrower in step 59.

Referring to FIG. 6, a final underwriting is performed 60. In one embodiment, the steps are performed as described and flow as shown in FIG. 6 (61, 62, 63, 64, 65, 66, 67, 68, 69). If the borrower doesn't pass the underwriting criteria, an Adverse Action letter containing all the relevant adverse action reasons and requisite scores is automatically generated and sent to the borrower 69. In one embodiment, adverse action notifications 69 are held for 24 hours to allow time to manage sensitive customers, if necessary.

Figure 7:
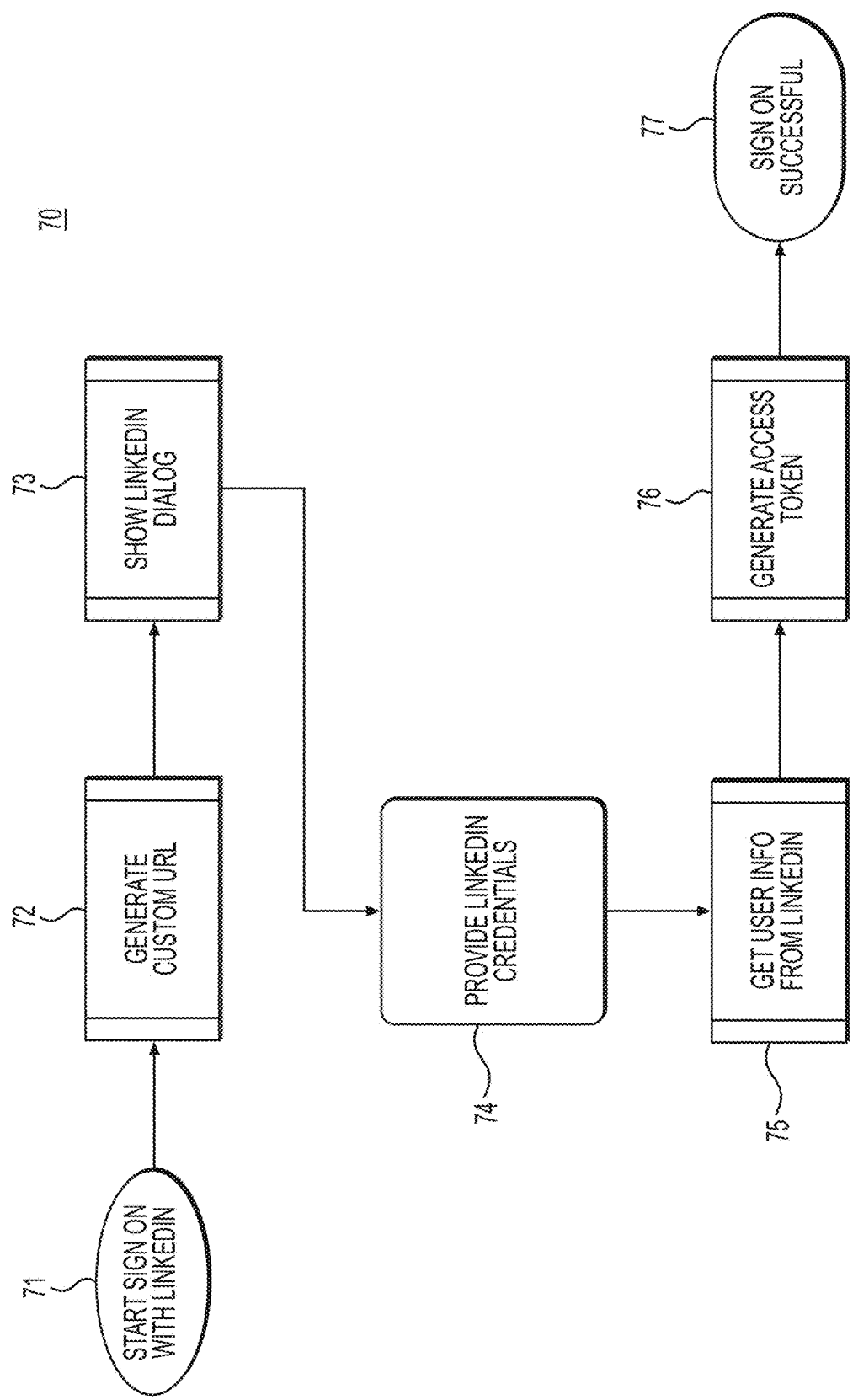
FIG. 7 is a flow diagram of using an exemplary External API Service to access to a lending system.

External API Service:

Referring to FIG. 7, an External API Service (e.g., a Marketplace/P2P service) may provide connectivity to various external systems such as LinkedIn, Plaid, Yodlee, Docusign, Veritax, Google, QuickBooks, each with its own API. The sign on process 70 begins with step 71 in which an external system (e.g., LinkedIn) is selected as a third-party system to authenticate through or with. Authentication to third-party systems allows for sharing of information and credentials and tokens to be used from external systems. FIG. 7 shows a basic process flow for integration with the LinkedIn API as an example process having steps 71, 72, 73, 74, 75, and 76. A successful sign on is indicated as having been achieved through the external service in step 77.

The external API service is initiated through a series of commands for each of the associated APIs. Example code for connecting to a Google maps API (e.g., to verify that a business property exists where the borrower says it does) is as follows:

```
function loadStreetView( ) {
    var js = document.createElement("script");
    js.type = "text/javascript";
    js.src =
        "https://maps.googleapis.com/maps/api/js?libraries=geometry&key=12345ABCDE";
    js.onload = function( ) {
        getGeocodingBusiness( );
        getGeocodingPersonal( );
    }
    document.body.appendChild(js);
}
```

The system contains programming to initiate any number of API services to populate the database fields and tiles described herein.

Figure 8:
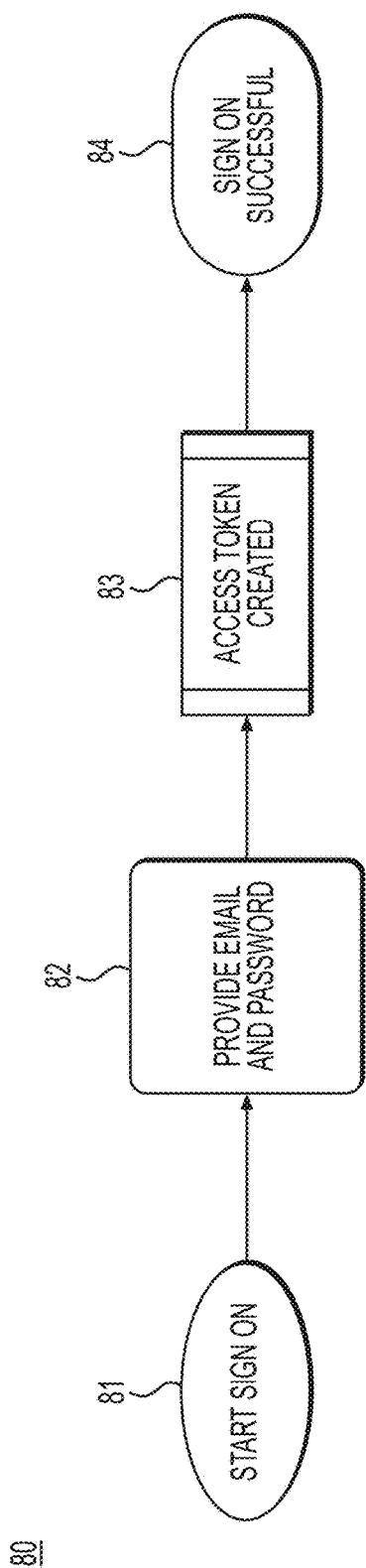
FIG. 8 is a flow diagram for a sign on step of an Authorization Tier of API service.

Authorization Tier:

Referring to FIG. 8, a borrower sign on process 80 to an authorization tier is shown. In many embodiments, the authorization service of the Marketplace/P2P service architecture provides borrower authentication and permission checks for each call made to the other services. In other embodiments, authentication and permission checks may be performed on only certain calls to other services. FIG. 8 shows a first process flow 80 illustrating the act of signing on to the system by selecting "Sign on" in step 81 and providing a registered username and password (or other authentication information) in step 82. An access token is created in step 83. Following, the system is notified of a successful sign on in step 84.

Figure 9:
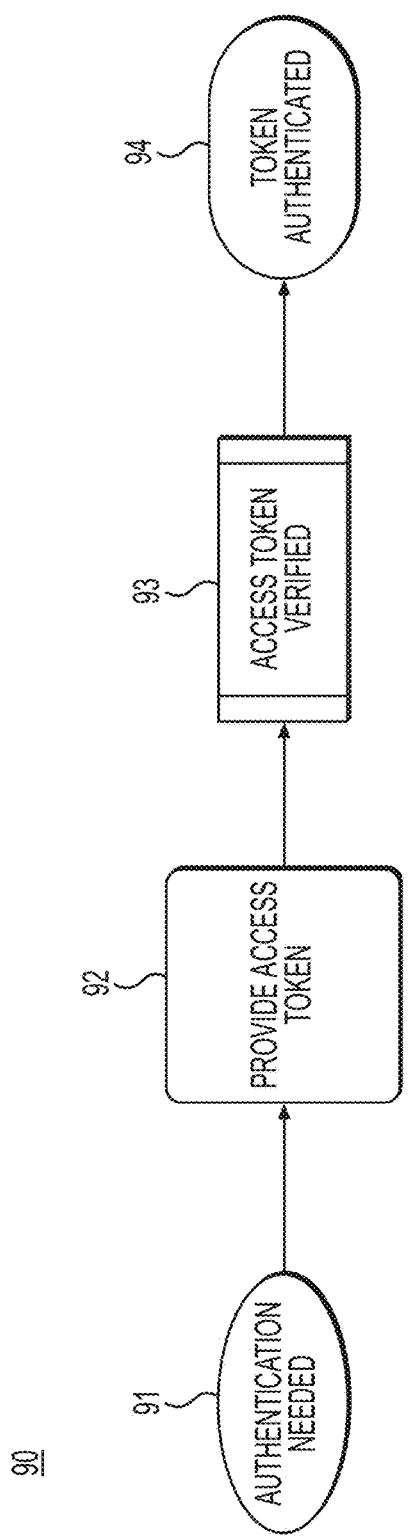
FIG. 9 is a flow diagram for authenticating one or more actions in an Authorization Tier API Service.

Referring to FIG. 9, the next example is a basic process flow 90 for authenticating borrower actions in the system. As a borrower steps through the system processes, various actions may need to be authenticated with a token to be sure the borrower has the permission to take the requested action and is the owner of that specific application. When an action needs to be authenticated, the system follows the authentication steps beginning with step 91, which include providing an access token in step 92, verifying the access token in step 93 and authenticating the token in step 94.

Figure 10:
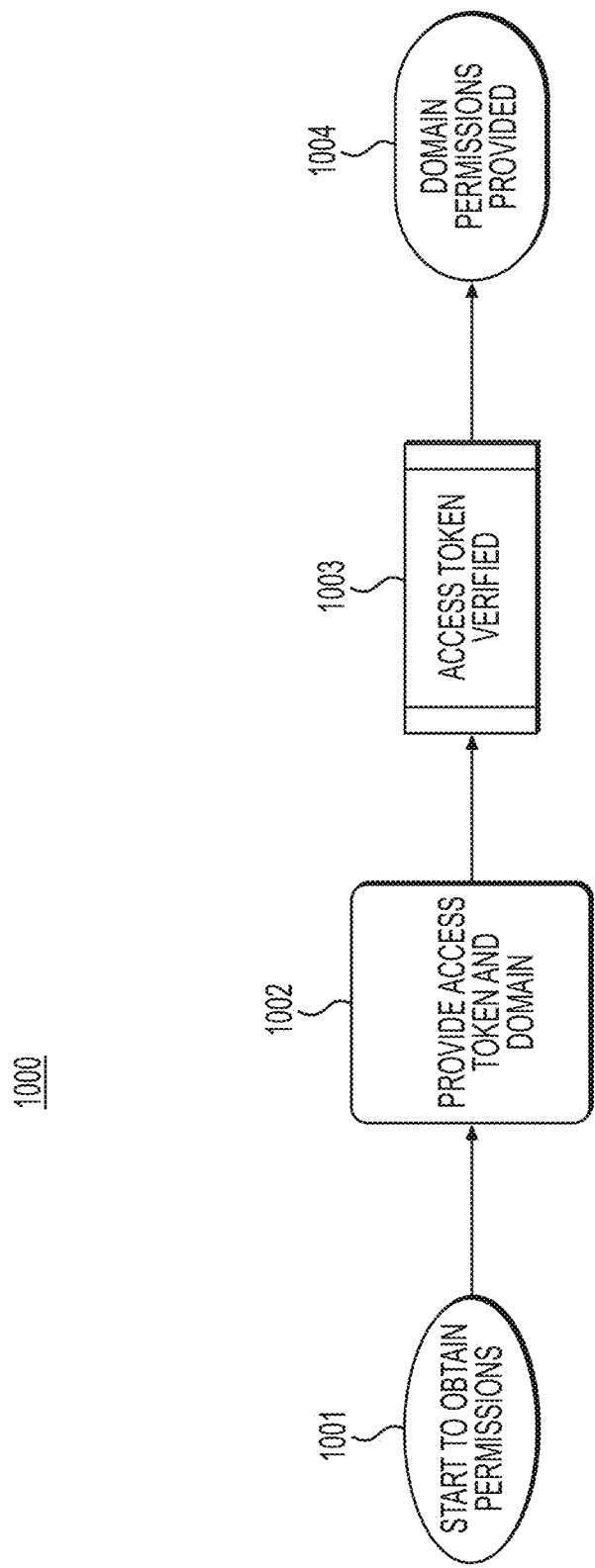
FIG. 10 is a flow diagram for checking permission to access a specific domain in an Authorization Tier API Service.

Referring to FIG. 10, in this example a basic process flow 1000 for checking permissions to access a specific domain within the system is depicted. This particular checking permission process requires both a token and the domain that the user is trying to access in order to provide permission. The process includes getting determining which permissions are to be obtained in step 1001, providing an access token and specifying a domain in which to take an action in step 1002, verifying the access token in step 1003 and finally providing domain permissions in step 1004.

Underwriting System

Underwriting systems are used by credit groups in organizations, and an exemplary underwriting system is described herein for a credit group for underwriting on-line lending, with portions being discussed with respect to the figures herein. Exemplary embodiments of a system as described herein give the underwriter a holistic view of the borrower including cashflows, taxes and financial ratios, etc. This helps the underwriter in making a fully digital holistic lending decision. The underwriter also has the ability to send the loan back to other personnel or the borrower if more information is required from the borrower.

In summary, the exemplary underwriting system collects and provides the following information to the underwriter:

Business and Personal Data: Information on the applicant including amount requested and the business including secretary of state incorporation data.

Credit Data: Summarized and detailed personal and business credit information including the automated system decision about credit.

Cash Flow Data: Business cashflows analysis that shows cash inflows, cash outflows, net cashflows, NSFs, balances etc.

Financial Statements Data: Financial statements (Balance Sheet, P&L, Cashflows) and key financial ratios.

Tax Data: Summary of personal and businesses taxes.

Social Data: Social media data including Facebook, LinkedIn, Google maps etc.

Adverse Action Reason: Adverse action reasons if declined.

The exemplary underwriting system also has an administration module to manage the system access and privileges with the following features:

Ability to assign deals to underwriters in round robin way or manually by the system administrator.

Ability to add underwriters.

Ability to manage the permissions e.g. who can approve, decline, edit or see.

Workflow Management System

The work flow management systems for underwriting approval described herein may be accomplished through manual underwriter data entry, through an automated system, or through a combination of manual and automated systems.

As an automated system, the exemplary program runs a series of coded scripts to collect data. As an example, the program may run a series of coded scripts in the following order:

Pull Equifax Bureau
Pull Transunion Bureau
Pull SBFE Bureau
Pull Legal Documents (e.g., from Lexis/Nexis)
  a) Business Judgments and Liens
  b) Criminal records
  c) SOS filings
  d) UCC liens
  e) Business phone numbers
  f) Personal phone numbers
  g) Business Bankruptcies
  h) Business foreclosures
  i) Sexual offenders list
Perform Cashflow Analysis
Perform Social Scan
Perform Fraud analysis
Create multiple offers
Approve The scripts to perform the actions described above are designed to be run in the order described above to reduce the cost of underwriting as there is a cost associated with each system pull of the data. That is, there is no need to check bankruptcies if the borrower fails based on the downloaded Equifax/TransUnion data. The automated system is designed to stop anytime an issue is encountered with the data from one of the steps, alert the appropriate underwriter for either correction, override, or application denial. If the underwriter corrects the issue or overrides (and re-initiates the automated process), the system continues collecting data. The display system described herein is the user interface between the underwriter (or other user) and the process, which allows the underwriter or user to monitor the automated process and make corrections or application denials as necessary.

Once the automated process is completed, the system may be programmed, based on the lending company's parameters, to issue rejection and acceptance letters. By doing so, the lending company reduces significant costs and based on their inputs, can manage the risk tolerances to more than compensate for the inefficiencies that would occur by manually processing the underwriting.

An exemplary work flow management module is integrated with the underwriting system. It is used by the underwriter/loan processor to ensure that all the necessary steps have been followed before funds are released. It also has the capability to send the loan back if more information is required. Additional capabilities of the exemplary system include, but are not limited to:

Tracking and displaying the primary workflow states of the loan in active underwriting review (e.g., a) Pending review, b) In actual review, and c) Additional details needed for prioritization).

Providing a comprehensive checklist to ensure all steps are being followed.

Providing a running log of changes that are being made by credit/sales.

Notifying (in real-time) sales if more information is required.

Notifying (in real-time) underwriting if incremental information has been received.

Alternate embodiments also are possible including additional workflow states (e.g., on hold, supervisory review, waiting for borrower, etc.)

A loan application may be assigned either manually or automatically (based on pre-set parameters) to an underwriter who is responsible for the account. The underwriter begins the collection of data process described above by initiating the system functions on the loan application they wish to proceed with.

Figure 11:
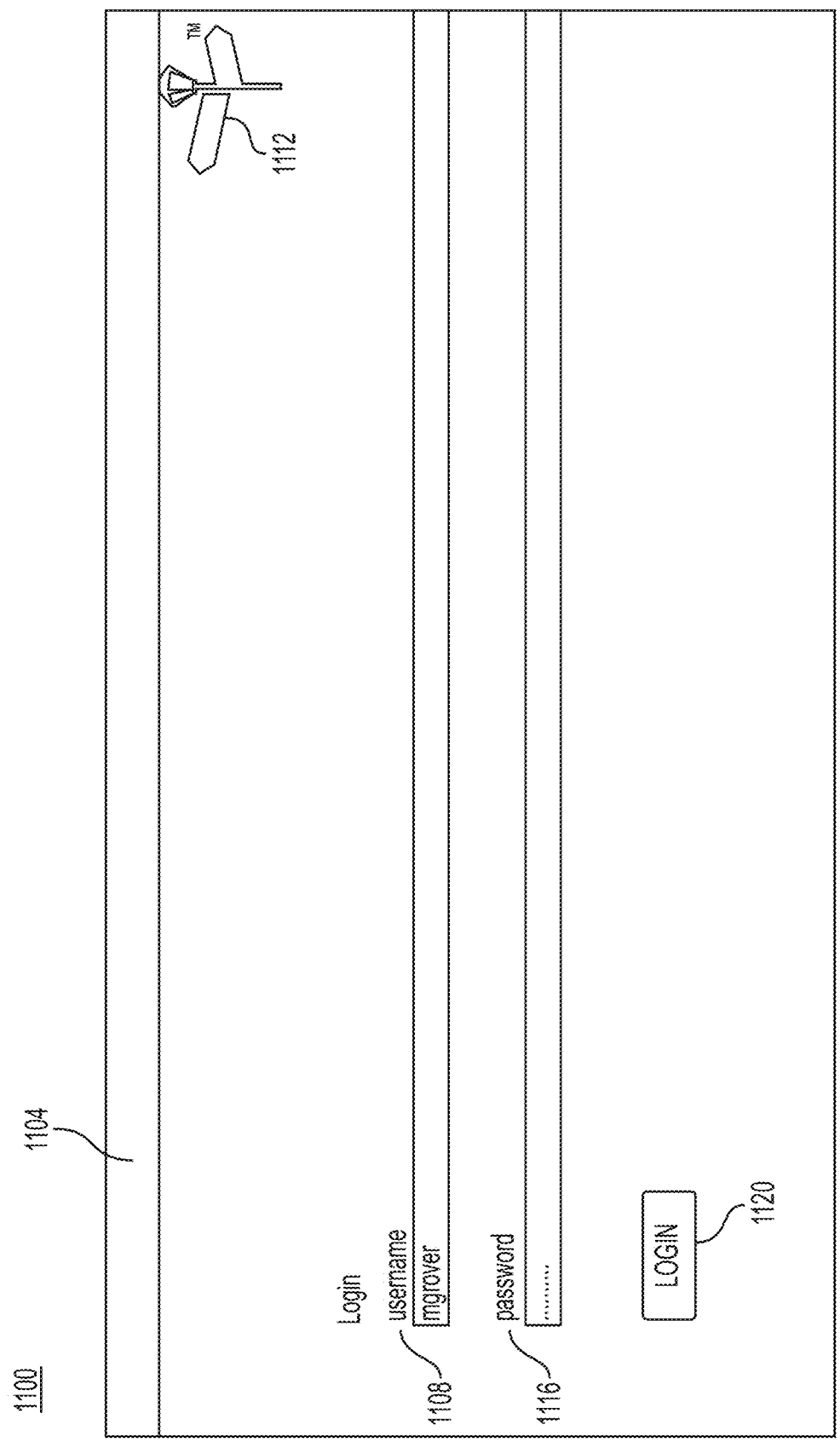
FIG. 11 is a screenshot of an exemplary log in screen.

FIG. 11 is an exemplary login screen 1100 where an underwriter authenticates himself/herself to the system to gain access to the system (e.g., using a username and password (as shown) or a time-varying token (not shown)). This graphical user interface screen 1100 is shown on the display of the computer system on which the underwriter/user logs in. The exemplary login screen shown in FIG. 11 displays a banner 1104 at the top of the screen that may be customizable to the company for identifying the company name, department, department function, etc. Additionally, the company logo 1112 may be displayed anywhere on the background field of the display, and is customizable to whatever the company wants. The display may include additional features such as a status indicator that represents if the user is currently "Logged out." In the example of FIG.

11, the system provides a "username" block 1108 that is fillable by the user. This is where the user will enter the username that has been programmed into the system as a unique ID to identify a particular user. The system also provides a "password" block 1116 that is fillable by the user. This is where the user will enter the password they previously have created.

The system stores in a locally- or remotely-provided non-volatile storage medium (e.g., in a database) authentication information based on the usernames and passwords assigned to the underwriters. The authentication information may be stored in any manner suitable for long-term storage, such as (1) the usernames and passwords in plaintext, (2) the usernames and passwords in encrypted form, (3) hashes of the usernames and passwords, and (4) hashes of the combined usernames and passwords. When the user enters a username and password into the login screen and clicks on the "Login" button 1120, the system verifies that the combination of username 1108 and password 1116 corresponds to a matching set of authentication information stored in the database. If the combination of username and password are authenticated, the system allows the user access and proceeds to displaying a user screen such as that shown in FIG. 12A. The underwriting system may be configured with a permissions system. Specifically, a system may be set up to restrict each underwriter/user's access to display only the loan applications that the system has assigned to them, a subset of loan applications, or the system may be set up to allow certain users access to every application. Once the user has entered the correct information in the login screen 1100 to access their account(s), the computer underwriting system proceeds to the next display screen.

FIG. 12A shows an example of a display screen 12000 which may be displayed after logging in. In particular, a graphic interface display screen 1200 with various portions or segments is depicted. More specifically, an overview graphic interface display screen 12000 is shown which may be referred to as an "underwriter dashboard" and is referred to as such throughout. In some embodiments, a underwriter dashboard 12000 is programmed to display any data the user specifies, including status of each loan application, metrics regarding the overall status of all applications, information on completed, pending, overdue, new, or any other type of loan application. FIG. 12A is a screenshot of an exemplary multi-part underwriter dashboard display 1200 as may be seen by a supervisor. As would be appreciated by those of skill in the art, the underwriter dashboard may be configured to show alternate information than that of supervisors.

The exemplary underwriter dashboard of FIG. 12A is divided or parsed into a number of sub-parts that will be described separately with respect to each sub-part. However, in general, by displaying metrics depicting the user's workflow progress, users are able to quickly gauge their work progress (and/or the work progress of their team members) and identify applications that are behind schedule. Such metrics may be displayed in any number of graphics or formats. A number of the exemplary metrics are depicted in pie chart and bar chart form; however, any graphs, charts, or other means of displaying metrics may be used.

Figure 12B:
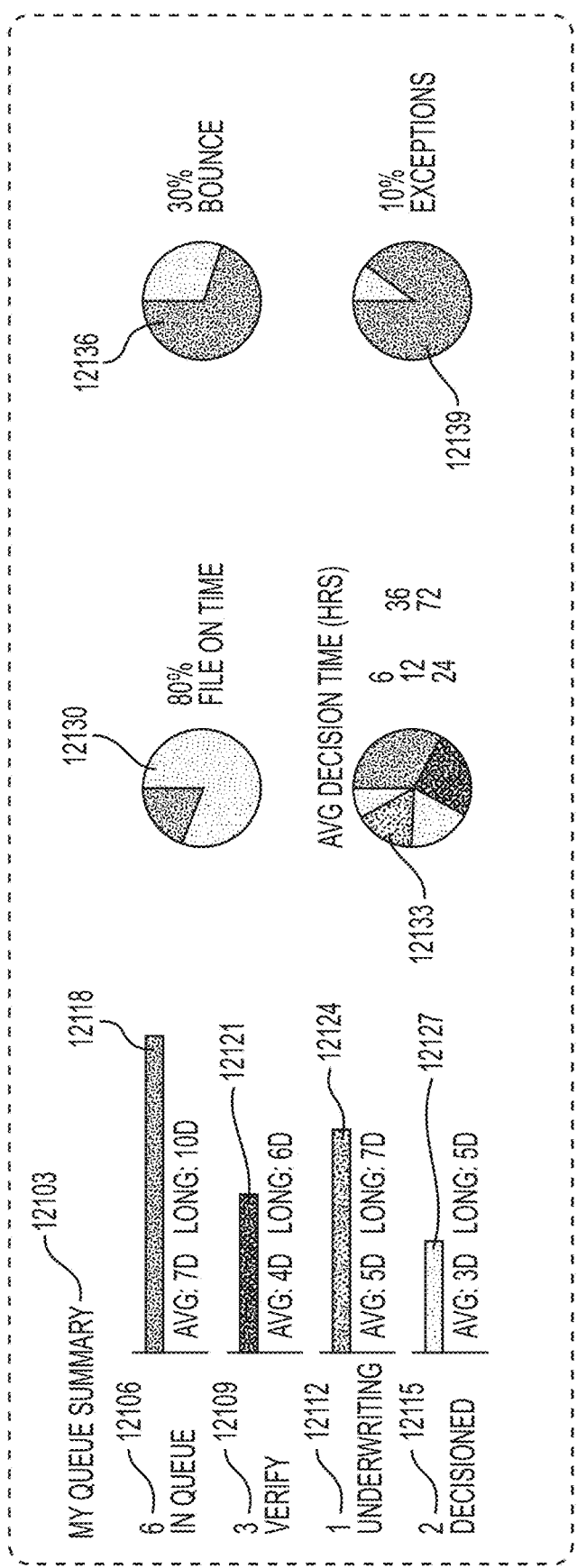
FIG. 12B is an expanded view of the "My Queue" area of the exemplary underwriter dashboard.
Figure 12C:
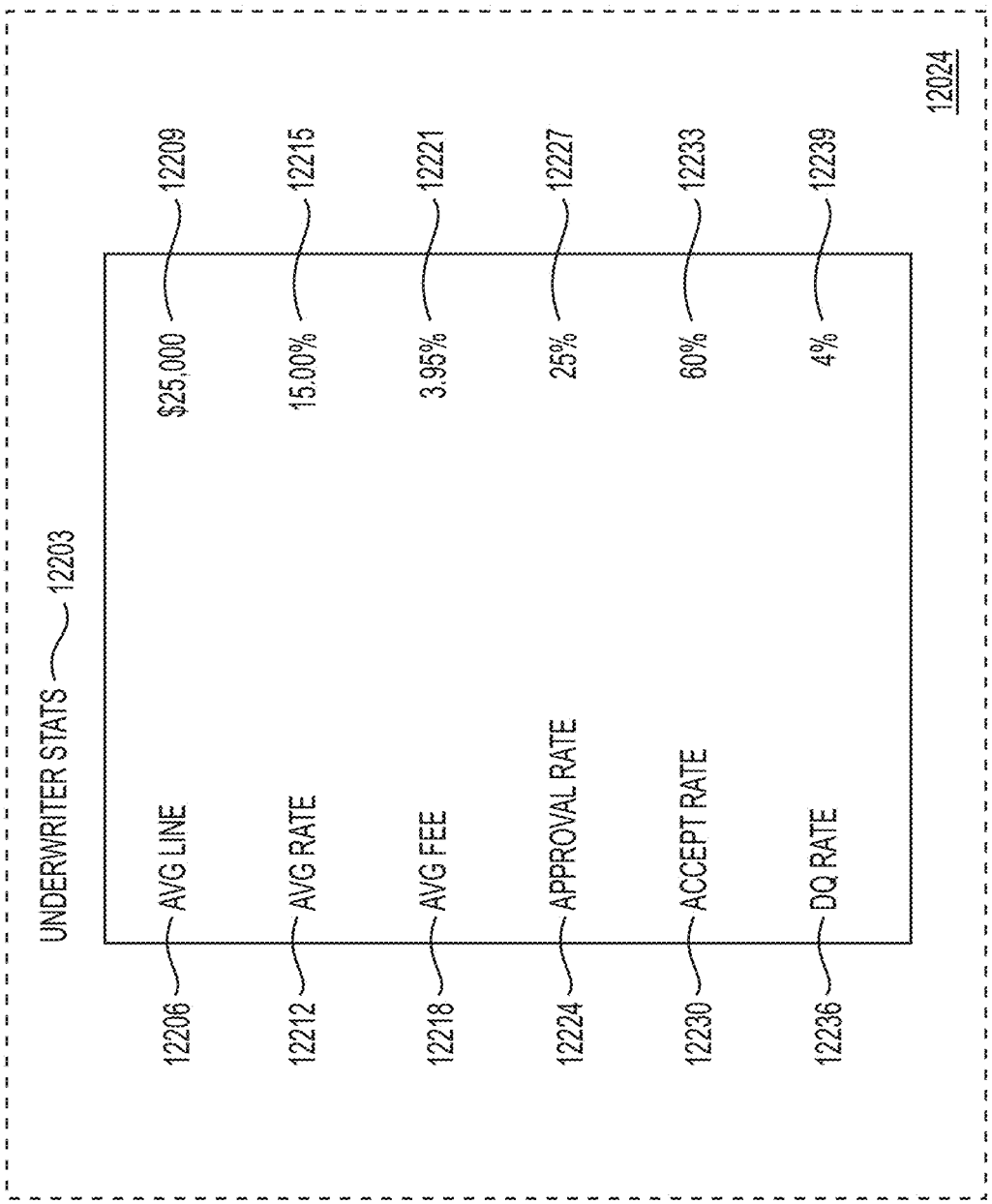
FIG. 12C is an expanded view of the "Underwriter Stats" area of the exemplary underwriter dashboard.
Figure 12G:
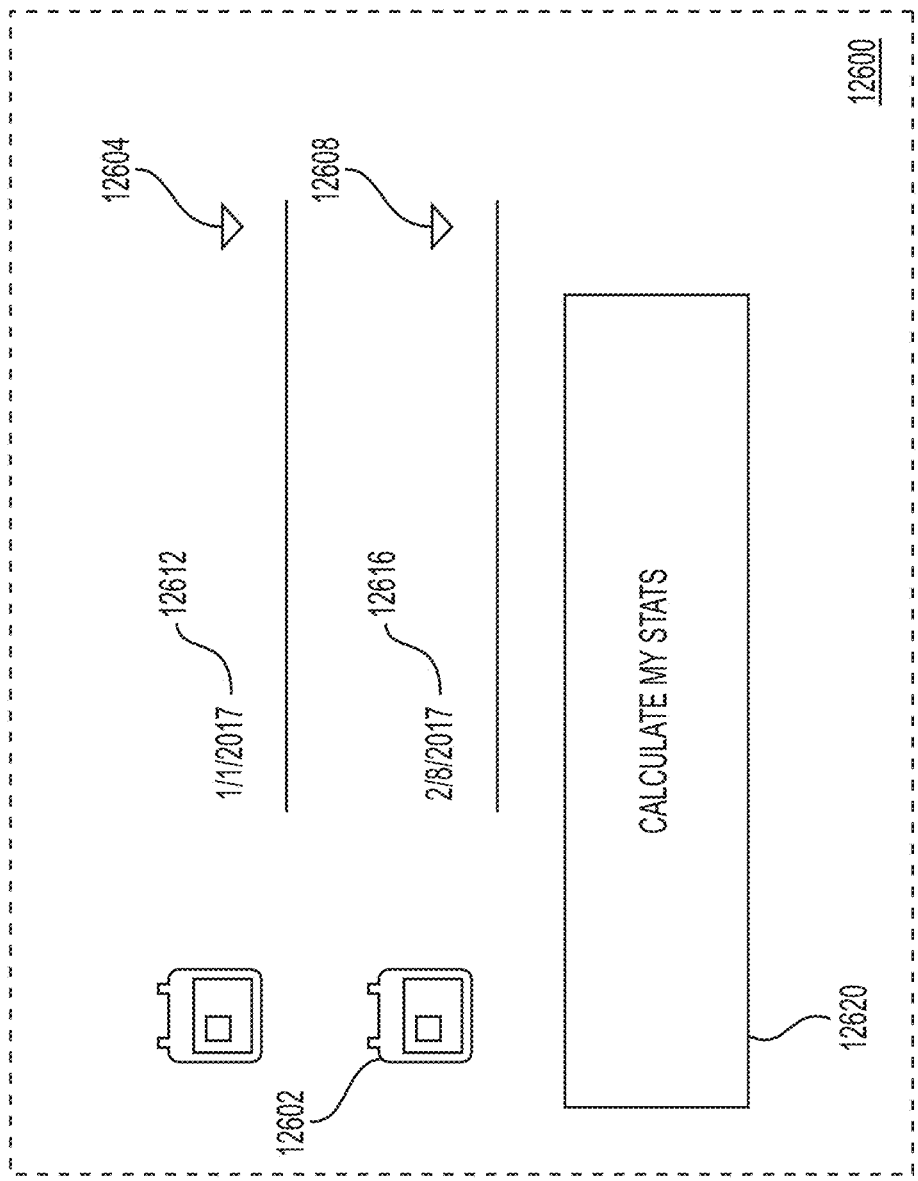
FIG. 12G is an exemplary field that allows the underwriter to choose date ranges for the display metrics.

Referring briefly to FIG. 12G, additionally, there may be a group of controls 12600 that allows the underwriter to select a date range for which to show the metrics the underwriter wants to see displayed on the underwriter dashboard 12000. The date pull-down menus 12604, 12608 enable dates to be selected as indicated by corresponding calendar icons 12602. The underwriter may select a start date and an end date, using pull-down menus that automatically populate the start date and end date fields 12612, 12616, or the user may simply utilize a keyboard to enter dates into the date fields 12612, 12616. Once the dates are selected, the underwriter clicks on the "CALCULATE MY STATS" button 12620 and the system will display metrics exclusively contained within that date range, start and end dates inclusive. Alternatively, the underwriter may choose no start date or end date, and the system will display metrics for all dates for which there is data in the system.

Referring now to the sub-parts of the exemplary display shown in FIG. 12A, the screen contains a banner 12003 at the top of the screen that is similar, or identical to, the banner 1104 at the top of the screen shown in FIG. 11. Referring again to FIG. 12A, the company logo 12006 is displayed on the left side of the banner 12003. Additional information may be shown on the banner 12003, customizable to the preferences of the company. In the example shown, the name of underwriter who is logged in 12009 is displayed. Additionally, the banner 12003 contains a "LOG OUT" button 12012 that, when clicked by the user, logs the user out of the system and returns the user to the Login screen displayed in FIG. 11. Alternatively, the system may generate a separate logout screen (not shown) that displays when the user has clicked the "LOG OUT" button 12012.

The display screen in FIG. 12A includes a Title 12015. In the example shown, this title 12015 is "My Queue." Beneath or beside the title 12015, an alert banner (not shown) may be displayed that provides system messages to the user. Such alerts may include text or icons alerting the user that there are application(s) older than a certain number of days (for example, the company may specify in the system to alert when applications are over two weeks old), or that an application is ready for final underwriting, or that new information has been collected that requires the underwriters attention, or if a tile has changed status. These alerts would be produced by coding the system to run a comparison between the specified metric and the corresponding field(s) in the database, and displaying a text or graphical alert specified by the coder.

Other alerts could include when the underwriter is close to the threshold for some of the metrics set by the company, e.g. bounce rate is above certain threshold, exception rate is higher or close to reaching a bound, etc. Manager also may receive certain alerts to show the manager that the underwriter(s) are not meeting the minimum SLAs, etc. An underwriter could also be alerted if their roles get modified; e.g. they receive higher approval authority, or they get new members on their team.

Referring still to FIG. 12A, below the title 12015, the display screen includes any number of sub-parts that allow the user/underwriter to view their worklists and metrics. These include, but are not limited to, a "My Queue Summary" sub-part 12021 (see FIG. 12B for additional detail), "Underwriter Stats" sub-part 12024 (see FIG. 12C for additional details), "My Team's Queue" sub-part 12027 (see FIG. 12D for additional detail), "Application List" sub-part 12030 (see FIG. 12E for additional details), and "All Applications" sub-part 12033 (see FIG. 12F for additional details).

In one exemplary embodiment of the underwriting system described herein a user, such as a supervisor, who manages the workflows of other users can set up their display to include metrics on an associated set of other uses (e.g., all users who report to the supervisor), in addition to showing their own user specific workflow metrics. The "My Team's Queue" sub-part 12027 in FIG. 12A provides this functionality and is displayed in further detail in FIG. 12D.

Referring now to FIG. 12B, various metrics are shown in the "My Queue Summary" sub-part 12021 of the underwriter dashboard. This sub-part shows the primary dashboard metrics for an individual underwriter to quickly and efficiently determine the status of all applications assigned to them. The "My Queue Summary" subtitle 12103 is displayed at the top left of the My Queue Summary sub-part 12021. The left side of this display field includes the number of applications assigned to the underwriter that are currently in each status within the system. For example, as shown in FIG. 12B, 6 applications are currently in a "In Queue" status 12106, 3 applications are in a "Verify" status 12109, 1 application is currently in an "Underwriting" status 12112, and 2 applications are in a "Decisioned" status 12115. These are exemplary status indicators and others may be used, such as "Hold," "Waiting Supervisor Approval," etc. The number of applications in a particular status may also be displayed as bar graphs, pie charts or the like, which allows the user/underwriter to visually determine the area of their workload that needs attention. Additional information may be included underneath the bar graphs to provide additional data measurement/metrics to the user/underwriter. For example, as shown, the bar that represents 6 applications having an "In Queue" 12118 displays data that shows that the average time an application remains in this status for this underwriter is 7 days, and the longest an application has remained in this status was 10 days. The bar that represents 3 applications in a "Verify" status 12121 displays data that shows the average time an application remains in this status for this underwriter is 4 days, and the longest an application has remained in this status was 6 days. The bar that represents 1 application in an "Underwriting" status 12124 displays data that shows the average time an application remains in this status for this underwriter is 5 days, and the longest an application has remained in this status was 7 days. The bar that represents 2 applications in a "Decisioned" status 12127 displays data that shows the average time an application remains in this status for this underwriter is 3 days, and the longest an application has remained in this status was 5 days.

Data measurement/metrics may also be displayed as pie charts in the My Queue Status sub-part 12021. Some useful metrics are shown in FIG. 12B and include a pie chart of the number of applications the underwriter processes on time 12130 (showing an 80% files on time rate). A pie chart displaying the bounce rate 12136 is shown (showing a 30% bounce rate). The bounce rate is generally the number of times an application is returned for additional data collection or the number of times additional information is requested from the borrower. Average decision time pie chart 12133 displays the percentage of applications that meet each of the decision time categories shown (in this case 6 hours, 12 hours, 24 hours, 36 hours, and 72 hours). This data may be useful to an underwriter to determine if decisions are taking longer than whatever goal the underwriter or the company may set. In the example shown, over 50% of applications are decided in either 6 or 12 hours, and only a small percentage of applications take 72 hours. While this pie chart does not provide exact percentages, the user can quickly see that, if their goal is to make a decision in 12 hours or less, they are at least meeting this goal 50% of the time, which can be useful in measuring progress and performance. Finally, in the example shown, an "Exceptions" pie chart 12139 is shown, depicting a 10% exception rate. The Exceptions rate is the percentage of loan approvals that have received an exception from the company's credit committee or other decision-making body. For example, a company may follow an underlying credit policy guideline for making underwriting decision based on FICO>minimum threshold; Revenue>minimum threshold, etc. If a loan application fails based on these criteria, an underwriter may seek an exception from the company's credit committee to proceed with underwriting the loan. Such exceptions might be granted if there are unusual or extenuating circumstances supporting a decision to make a specific loan offer (e.g., the applicant recently won a large contract, etc.). Generally, the company will establish a maximum percentage of allowable exceptions in order to reduce overall risk.

Referring to FIG. 12C, an Underwriter Statistics sub-portion 12024 is shown and the subtitle 12203 "Underwriter Stats" is displayed at the top of the sub-portion 12024. Within the sub-portion 12024 are displayed any number of statistics that correspond to the underwriter/user who is logged in. In the example in FIG. 12C, these statistics include Average Line of credit reviewed or approved (labeled "Avg Line" 12206 and showing a value of $25,000 (12209)), Average loan rate reviewed or approved (labeled "Avg Rate" 12212 and showing a value of 15.00% (12215)), Average loan fee for applications reviewed or approved (labeled "Avg Fee" 12218 and showing a value of 3.95% (12221)), loan approval rate (labeled "Approval Rate" 12224 and showing a value of 25% (12227)), the rate that loans are accepted by the borrower once a loan offer has been made (labeled "Accept Rate" 12230 and showing a value of 60% (12233)), and the delinquency rate on loans made by the underwriter (labeled as "DQ Rate" 12236 and showing a value of 4% (12239)).

Referring to FIG. 12D, a "My Team's Queue" sub-portion 12027 is shown and includes the subtitle "My Team's Queue" 12303 at the top of the sub-portion 12027. A table (or datagrid) 12304 is produced below the subtitle 12303. The table 12304 may contain any data that is stored within the system and that the user/supervisor/underwriter chooses to utilize for their underwriter dashboard. The data displayed in FIG. 12D on behalf of the supervisor includes underwriter names, the percentage of time each underwriter files on time, the percentage rate that each underwriter's applications are returned for corrections, and the rate of exceptions. These are represented in the table 12304 by generating a heading that corresponds to the database field. As shown in FIG. 12D, these headings are "Underwriter" 12306, "Files on Time" 12309, "Bounce Rate" 12312, and "Exceptions" 12315. Corresponding data is displayed beneath each heading in the table 12304. Three underwriter names and their corresponding data are shown in FIG. 12D. The underwriters are shown as "John", "Lynda", and "Brendon" (12318, 12321, and 12324, respectively). Their corresponding "Files on Time" rates are 75%, 90%, and 50% (12327, 12330, and 12333, respectively). This data is displayed by the system correlating the underwriter name field 12306 within the database with the "Files on Time" field 12309 in that database. The underwriters' corresponding "Bounce Rate"(s) are 30%, 20%, and 5% (12336, 12339, and 12342, respectively). This data is displayed by the system correlating the underwriter name field 12306 within the database with the "Bounce Rate" field 12312 in that database. The underwriters' corresponding "Exceptions" are 15%, 2%, and 5% (12345, 12348, and 12351, respectively). This data is displayed by the system correlating the underwriter name field 12306 within the database with the "Exceptions" field 12315 in that database.

Again, any number of additional columns and rows may be added to the table in order to provide the supervisor a useful tool to monitor the subordinates he or she is responsible for. Additionally, the table may be broken down into sub-teams; for example, if the company chief executive officer wanted to view all teams in one table, the display could include a supervisor name, department, or team name heading, followed by the members of that team, grouped such that the teams are shown together. Alternatively, additional metrics may be added to allow such a view to display the overall metrics of the team, rather than displaying individual team member performance. An important feature of this table is that the percentages and other data shown are displayed in any number of colors to alert the underwriter visually to corresponding rates. For example, if the system is programmed to show the "Files on Time" data 12309 that meets a 75% or higher rate as green, then the fields 12327 and 12330 in the example would be displayed as green numbers, and the field 12333 would be shown as some other color; for example yellow. The system may be programmed to any level of detail the company wants to use to show these rates in visual color display. This could include two colors, three colors, or as many colors as the company wants to differentiate different metrics, and different ranges within each metric.

The display screen or portion of a display screen shown in FIG. 12E features a list of loan applications currently assigned to the underwriter/user. The system generates the list filtered by the underwriter assigned to the loan application. Assignment of loan applications may be assigned by the manager or team leader, or it may be automatically assigned based on parameters programmed into the system, such as by dollar amount, client, order type, deal type, etc. This list may include any fields that are contained within the database and/or any values that can be calculated from fields within the database. The list shown in FIG. 12E is the default list of fields displayed. Alternatively, the fields that are displayed may be customized by the user.

The user may filter this list, and organize the list in any order based on any of the fields of data. In an exemplary display, the columns in the table include Request ID 12403, Business Name 12406, Guarantor 12409, Submitted 12412, Last Action 12415, Product 12418, Status 12421, Status Time 12424, Sales Owner 12427, and Score 12430, and each column is labeled with a header corresponding to the names of the fields. The Request ID 12403 is a system generated number that identifies the application within the system. The numbers in the table in the column below Request ID 12403 represent individual applications that are assigned to the underwriter user. In the example shown in FIG. 12E, there are four applications currently assigned to the underwriter; Request ID numbers 24636, 24999, 25635, and 25926. The Business Name 12406 identifies the name of the business or individual applying for the loan. The names in the table in the column below the Business Name header 12406 correspond to the Request ID in the same row. For example, the loan application with Request ID 24636 is being applied for by "Train A INC." The loan application with Request ID 24999 is being applied for by "Rec Inc." The loan application with Request ID 25636 is being applied for by "WHOLE PROD CORP. Inc." The loan application with Request ID 25926 is being applied for by "Copen au Gar."

Still referring to FIG. 12E, the Guarantor 12409 identifies the name on the loan application of who, if anyone, is guaranteeing the loan. The names in the table in the column below the Guarantor header 12409 correspond to the Request ID in the same row. For example, the loan application with Request ID 24636 is being guaranteed by "Daniel Jackson." The loan application with Request ID 24999 is being guaranteed by "Ea ler." The loan application with Request ID 25636 is being guaranteed by "Mich Alex." The loan application with Request ID 25926 is being guaranteed by "Aar Run." In this manner, the system displays guarantor of loans. Similarly, co-guarantors can be displayed.

Still referring to FIG. 12E, the "Submitted" column 12412 displays the date and time the application was submitted. The times and dates in the table in the column below the Submitted header 12412 correspond to the Request ID in the same row. For example, the loan application with Request ID 24636 was submitted on Jan. 13, 2017 at 4:51 PM. The loan application with Request ID 24999 was submitted on Jan. 19, 2017 at 1:55 PM. The loan application with Request ID 25636 was submitted on Jan. 31, 2017 at 7:49 PM. The loan application with Request ID 25926 was submitted on Feb. 6, 2017 at 2:18 PM. Any format of date and time may be used in this field. As with many of the other views or screen portions, the data to complete this view or display is pulled from a loan database.

Still referring to FIG. 12E, the "Last Action" column 12415 displays the number of days, or hours, or any other timeframe, since an action was last taken on the application corresponding to the Request ID in the same row. For example, the loan application with Request ID 24636 was last acted upon five hours ago. The loan application with Request ID 24999 was last acted upon one day ago. The loan application with Request ID 25636 was last acted upon five days ago. The loan application with Request ID 25926 was last acted upon one day ago.

Still referring to FIG. 12E, the "Product" column 12418 identifies the type of loan application the corresponding Request ID represents. For example, the loan application with Request ID 24636 is a "new" application. The loan application with Request ID 24999 is a "draw" application. The loan application with Request ID 25636 is a "new" application. The loan application with Request ID 25926 is a "renewal" application.

Still referring to FIG. 12E, the "Status Time" column 12424 displays the time that the status 12421 was last updated. These fields may be any combination of date and time.

Still referring to FIG. 12E, the "Sales Owner" column 14427 identifies the sales owner responsible for the loan with the corresponding Request ID in that row. For example, "Employee 1" is the sales owner of the loan application with Request ID 24636. "Employee 1" is the sales owner of the loan application with Request ID 24999. "Employee 2" is the sales owner of the loan application with Request ID 25636. "Employee 2" is the sales owner of the loan application with Request ID 25926.

Still referring to FIG. 12E, the "Score" column 12430 identifies the score of the loan with the corresponding Request ID in that row. For example, the loan application with Request ID 24636 scores a "B". The loan application with Request ID 24999 scores a "B". The loan application with Request ID 25636 scores a "B". The loan application with Request ID 25926 scores a "B". To prioritize the underwriter queue, a company may develop an internal score that ranks each application; for example from A+ to D−, with applications with a score of A+ receiving the highest priority for underwriting. Alternatively, other grading scales can be used in place of the letter grade score described above. For example, a decile ranking system can be used which shows which of the 10 risk bands that a potential loan has scored in (e.g., 10 for the best and 1 for the worst). FIG. 25A provides an illustrative function (written using the Python programming language) for providing a numerical score to a potential loan to help a supervisor quickly know how to assign the loan. FIG. 25B provides an illustrative function (written using the Python programming language) for converting the numerical score provided by FIG. 25A into a "letter grade" score for a potential loan to help a supervisor quickly know how to assign the loan.

Each row in the table shown in FIG. 12E may be linked (e.g., hyperlinked), so that when the user selects a loan application to view and work on, the computer system displays information, data, and options for the underwriter to view and interact with that are associated with the selected loan.

In an alternative embodiment, rather than in a list, pending loan applications are displayed and viewed in a heat map arrangement on a graphical display screen or portion of a screen (not shown). In that embodiment, a set or subset of loan applications (for example applications assigned to an individual underwriter, a subset of those assigned to an individual underwriter, loans assigned to a supervisor or a group) are shown on the screen in tiles that are heat mapped by location on the screen and color. Thus, in one example in which the hot spot is the top left corner of the screen, identification information for the loan application deemed most urgent or important to be processed is placed a tile in the upper left hand corner and colored fire engine red. Other applications are placed in tiles arranged away from the left top corner with colors ranging from red orange, to orange, to yellow followed by green or black. The least important or least urgent loan application is placed in the bottom right hand corner of the screen. Thus, the underwriter can work on "hotter" applications by working from top left corner towards the right bottom corner of the heat map screen.

In yet another heat map embodiment, the heat map is arranged from hottest point in the center of the computer screen and the tiles are arranged outward from the center. While the system can use time sensitivity or importance, in some embodiments these criteria are combined into a formula accounting for both time urgency and importance. The higher the formulaic number, the "hotter" the heat map for that loan. Sets of loans may also be similarly heat mapped. Various formulas may be used for heat mapping for time sensitivity and importance including a ranking of 1 to 10.

Referring once again to FIG. 12A, on a supervisor's underwriter dashboard 12000, below the Application List" sub-part 12030 (e.g., implemented as a table/datagrid) showing the applications assigned to the user, is displayed an "All Applications" sub-portion 12033 underneath the subtitle "All Applications." As shown in FIG. 12F, the "All Applications" sub-portion 12033 includes table/datagrid capable of showing all applications currently in the system or a subset of the loan applications (as filtered by the contents of the selection box 12036). The "All Applications" sub-part 12033 includes a display of data 12034 (e.g., using a datagrid) similar to the "Application List" sub-part 12030 (of FIG. 12E), but includes some additional information for the user to view. Within the "All Applications" sub-part 12033, a selection box 12036 is available for the user to click on select a particular type of loan application (or a characteristic of loan applications). For example, when the user clicks on this selection box 12036, a drop-down menu is generated that allows the user to select "All applications" or the name of an underwriter. When "All applications" is selected, all applications that the team is currently working on are displayed. When an underwriter's name is selected, only those applications that the underwriter is assigned to and currently working on will be displayed. Alternatively, the system may be programmed to display other types of application "filters" (e.g., individual business names) in the drop down menu, which would allow the underwriter to select only applications associated with that filter (e.g., only the selected business). Similarly, the system is programmed such that when the user selects a name from the drop-down menu, the applications with that name in the corresponding field in the database are displayed in the "All applications" section of the underwriter dashboard. In an alternate embodiment, the name selection box 12036 may be replaced with a static field that only displays the current user's name and the datagrid 12034 only displays that person's corresponding applications.

As described above, this set or list may be limited to show applications assigned to underwriters assigned to the supervisor, or may be an otherwise filterable list of company-wide applications, depending on the preferences of the company. As can be seen in FIG. 12F, the columns in this table are identical to the columns explained in FIG. 12E, with the addition of a column labeled "Underwriter" 12039. That column 12039 identifies the underwriter associated with the loan with the corresponding Request ID in that row. However, the loan application with Request ID 27001 is assigned to no one. This provides a signal to the supervisor that an underwriter needs to be assigned. The loan application with Request ID 24636 is assigned to "Employee 1." The loan application with Request ID 24999 is assigned to "Employee 1." The loan application with Request ID 25635 is assigned to "Employee 2." The loan application with Request ID 25926 is assigned to "Employee 2."

Figure 13:
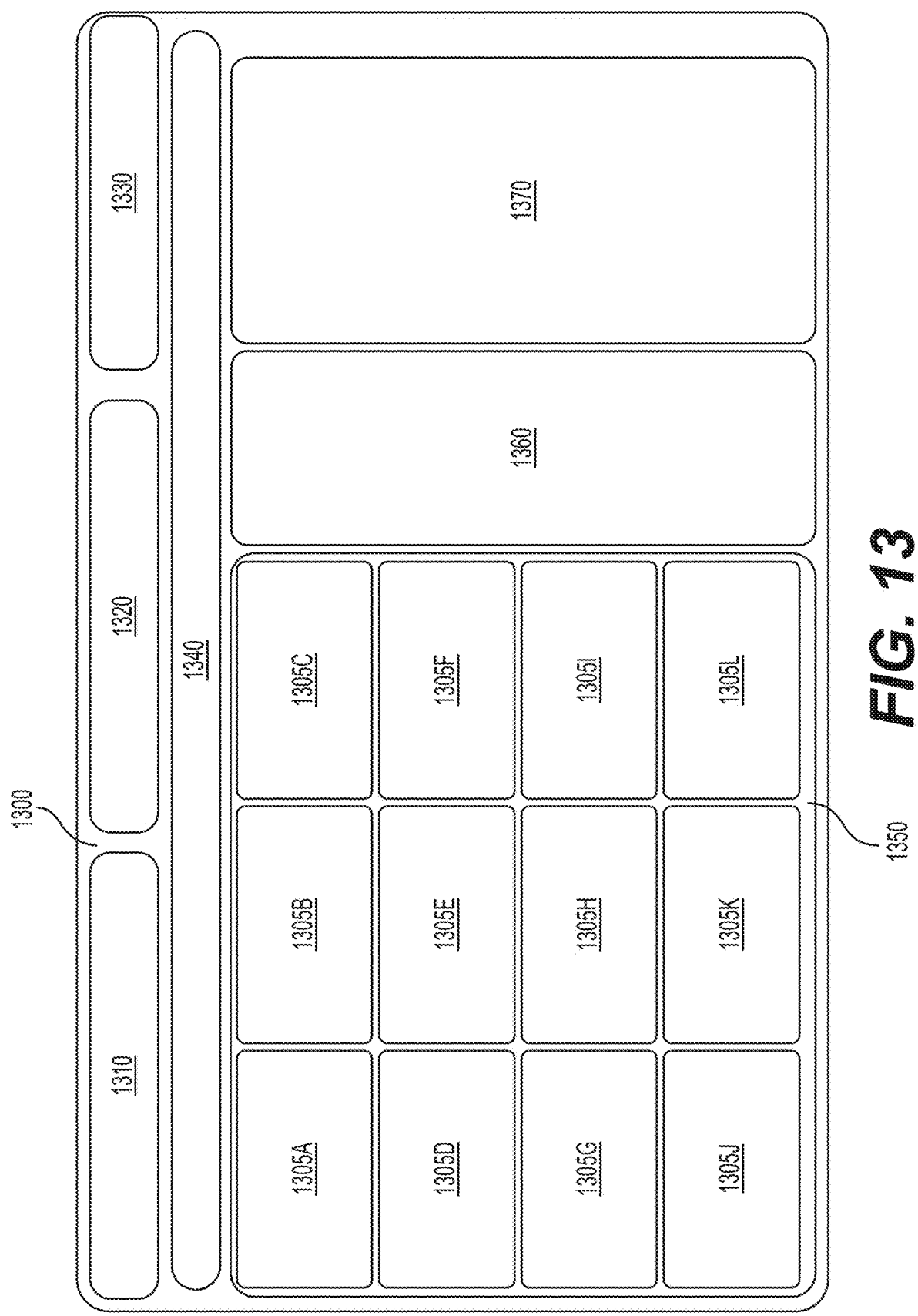
FIG. 13 is a screenshot of an exemplary loan dashboard of an individual loan application as seen by an underwriter.
Figure 14:
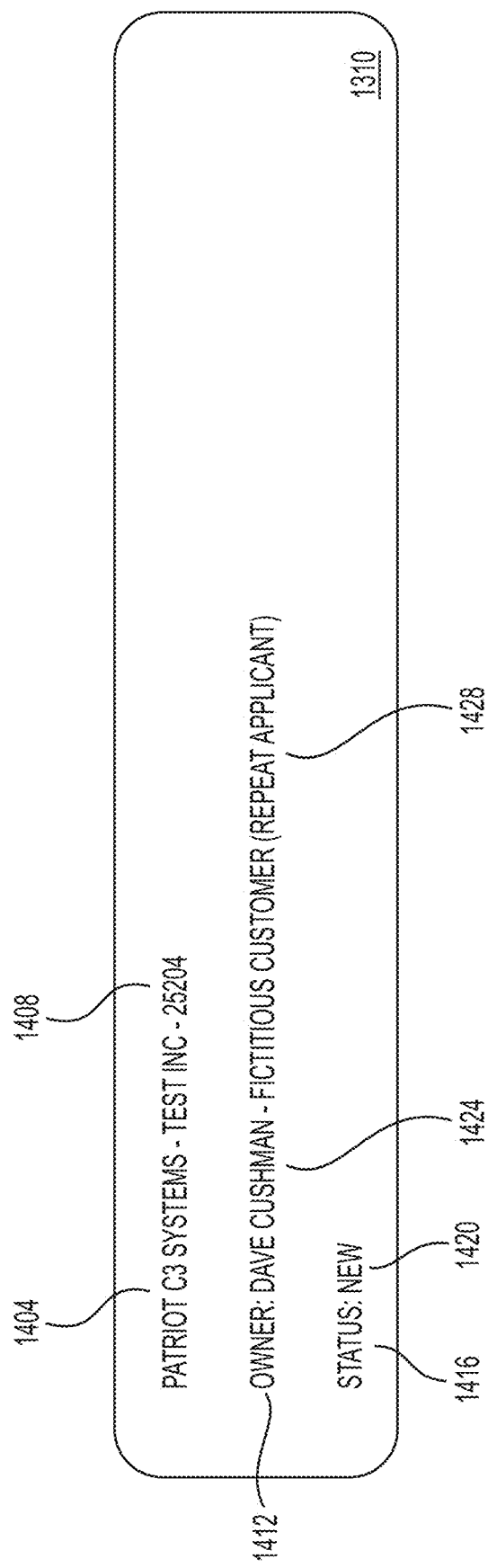
FIG. 14 is a screenshot of an exemplary loan application summary information heading (as could be used in in FIG. 13).
Figure 15:
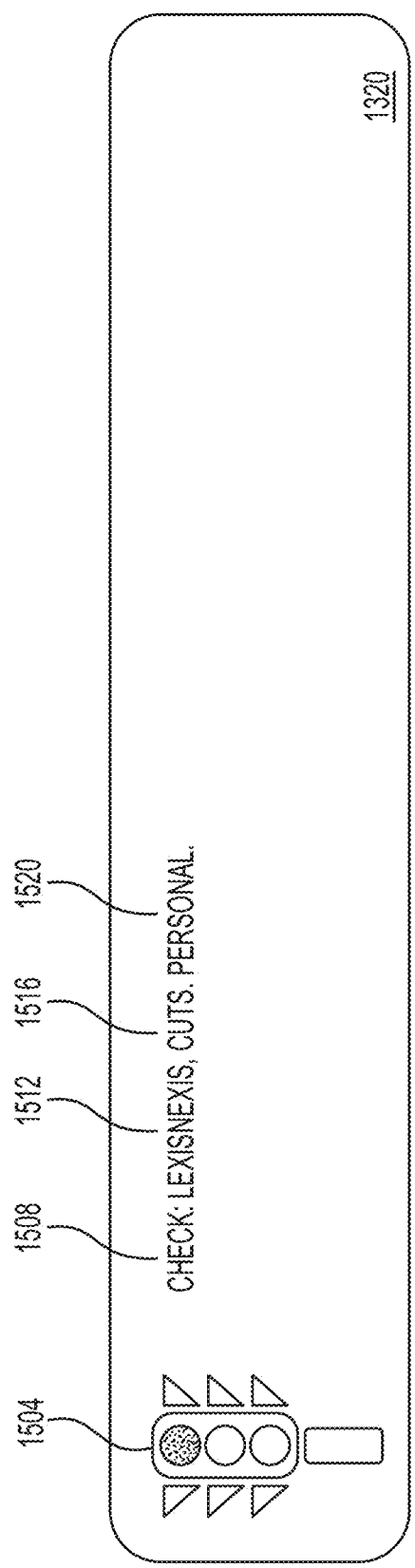
FIG. 15 is a screenshot of an exemplary loan application/deal alert (as could be used in in FIG. 13).
Figure 16:
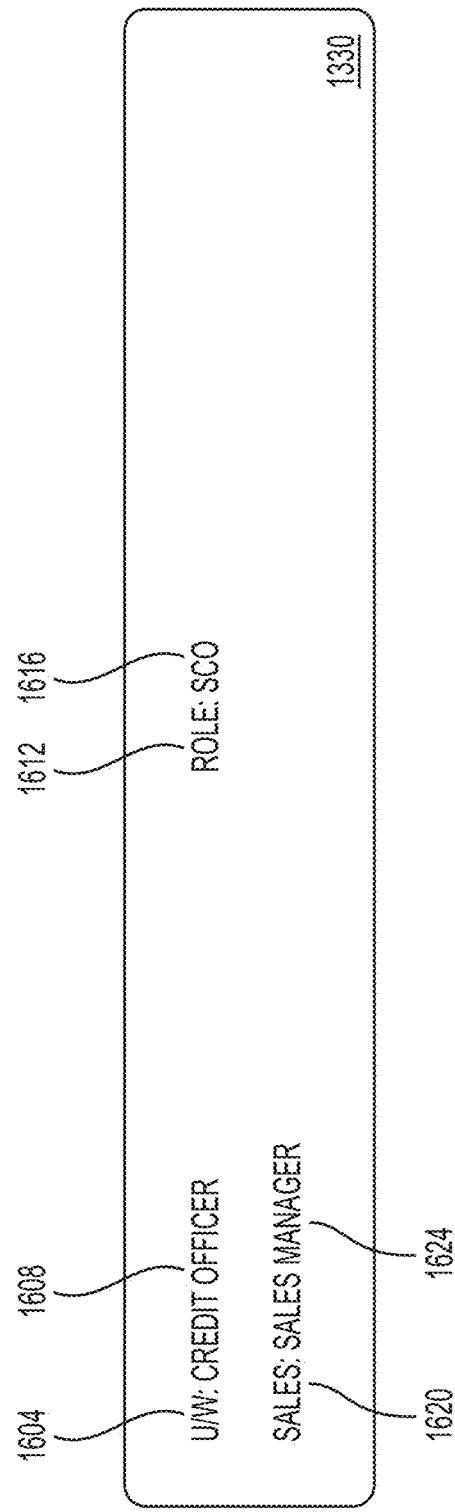
FIG. 16 is a screenshot of an exemplary banner showing underwriter information and role for the given loan application (as could be used in in FIG. 13).
Figure 17:
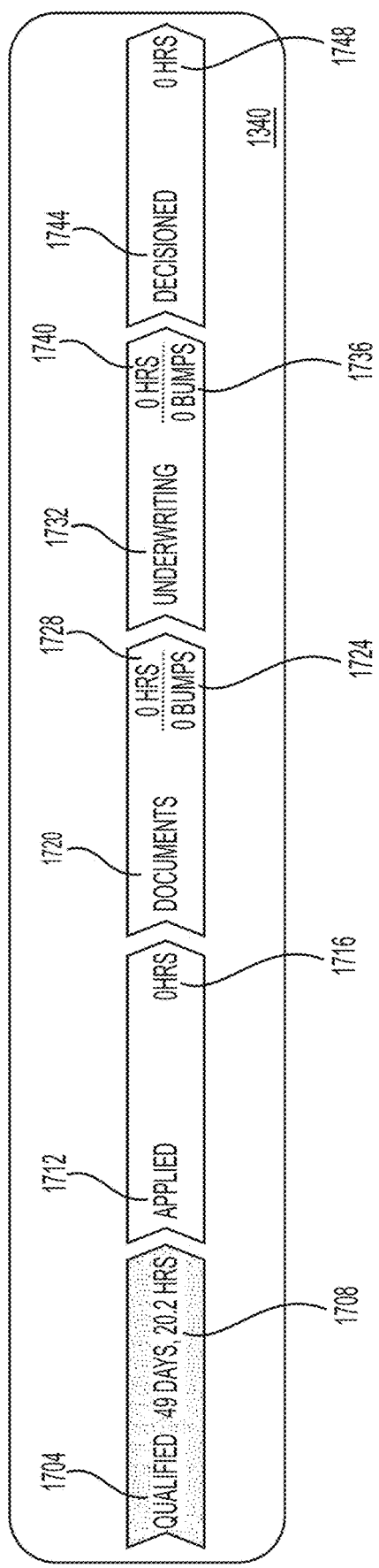
FIG. 17 is a screenshot of an exemplary loan application workflow display (as could be used in in FIG. 13).

FIG. 13 shows a graphical user interface acting as a loan dashboard 1300 that displays information associated with a particular loan. As illustrated, the loan has been assigned to an underwriter shown as Madhur Grover. The loan dashboard 1300 has multiple parts or segregable parts of the screen. A basic loan information area 1310 displays a loan name and basic information about the loan. (FIG. 14 provides additional details about the basic loan information area 1310.) An overall status/progress indicator and alert banner 1320 is a status section that identifies the categories of information to check in the application. (FIG. 15 provides additional details about the overall status/progress indicator and alert banner 1320.) An Underwriter/Sales Info and Role (USIR) banner 1330 displays personnel assignment. (FIG. 16 provides additional details about the USIR banner 1330.) A workflow process reporting section 1340 is shown below the basic loan information area 1310, the overall status/progress indicator and alert banner 1320, and the USIR banner 1330. (FIG. 17 provides additional details about the workflow process reporting section 1340.)

FIG. 14 represents an enlarged view of the basic loan information area 1310 of loan dashboard 1300 and provides basic information about the borrower such as business name 1404, Request ID 1408, business owner 1412, current status of the application 1416, and if they are a repeat applicant 1428. In the example shown in FIG. 14, the status 1420 is "new" and the business owner is shown to be "Dave Cushman—Fictitious Customer" 1424. The Request ID 1408 may be an alphanumeric or other identifier and corresponds to the request ID of the application. In one embodiment, the types of status available are "New," "Pending," "In Progress," etc.

FIG. 15 represents an enlarged view of the overall status/progress indicator and alert banner 1320 of the loan dashboard 1300. The overall status/progress indicator and alert banner 1320 enables the user to quickly identify the status of the loan evaluation process. One function of this banner 1320 is to alert the user to deal alerts that may require their attention or to alert the user that progress is completed, and/or some other milestone has been achieved. The banner 1320 represents current actions on the application. A graphic or icon may be used as an indicator symbol 1504. This indicator may be of any shape, icon, (street signs, etc.). For the example shown in FIG. 15, the status/progress indicator 1504 is displayed as a stoplight, and is referred to throughout as such. In this embodiment, the status indicator stoplight 1504 shows if the application is all good (green), has minor issues (orange), or has major issues (red). In the example shown in FIG. 15, "Legal Review" 1512 and "Cuts" 1516 parameters are highlighted next to the "Check" label 1508 in a manner indicating that the underwriter must check these tiles before the application can move forward in the approval process. Such an indication may be accomplished by the program highlighting the "Legal Review" 1512 and "Cuts" 1516 parameters in a pre-programmed color, such as red. The "Personal" 1520 parameter in the example is highlighted a different color (such as yellow) to indicate a different action is required by the underwriter.

In alternative embodiments, the status indicator 1504 may be represented by different color or different patterned flags, such as for example, red, yellow, green, and checkered flags to indicate the status is not started, attention is needed, all data has been collected and verified, and the loan is approved, respectively. In another embodiment, the status indicator 1504 may be represented by different street signs, such as for example a stop sign, a yield sign, a speed limit sign, and a highway sign with text that says "completed" to indicate the status is not started, attention is needed, all data has been collected and verified, and the loan is approved, respectively. Any combination of signs or icons may be utilized, based on the company's preference for visual cues to the underwriters.

Referring now to FIG. 16, an Underwriter/Sales Info and Role (USIR) banner 1330 of the loan dashboard 1300 identifies the name of the underwriter 1608 and sales representative 1624 as well as the underwriter's role 1616 in the organization, application, or any other role an underwriter may be assigned. In the example shown in FIG. 16, the "U/W" label 1604 represents underwriter, and is a static field that is identical on all underwriters' displays. The name of the underwriter 1608 displays the name of the underwriter who is currently logged in (in this example, "Credit Officer"). The "Sales" 1620 field represents the sales person associated with a particular application that is selected for viewing, and is a static field that is identical on all underwriter's displays. The name of the sales representative 1624 is displayed next to the static "Sales" 1620 field, and displays the name of the sales representative assigned to the currently selected application (in this example, "Sales Manager").

Underwriter role 1612 is used to determine approval band permissions (example, Senior Credit Officer can approve any size offer). The underwriter role 1612 in the example shown in FIG. 16 is "SCO" 1616, which stands for "Senior Credit Officer." Approval band permissions may be programmed into the system such that some functions or actions of the user are limited based on the criteria established for the approval band. For example, while a senior credit officer may be able to access every tile and make and save changes to the application, the system may be programmed to allow other roles, such as a junior credit officer, to only view tiles, but make no changes that can be saved within the system.

Referring now to FIG. 17, a workflow process reporting section 1340 of the loan dashboard 1300 shows what state 1704, 1712, 1720, 1732, 1744 the application is in, and the time length 1708, 1716, 1728, 1740, 1748 that the application has been in that state. An application can bump between the sales department for more documentation or underwriting for analysis. Each bump to the other team registers as another bump in the band to show how many times an application went back and forth. This workflow process reporting section 1340 is useful for the underwriter to quickly see where in the process a particular application is, as well as how many times, and for how long, it has been in each status. Such a display might assist supervisors when evaluating performance and developing business process changes/methods for further workflow efficiencies.

In the example shown in FIG. 17, the first application state an application will enter is the "Qualified" state 1704. This is where the application is considered to be until the potential borrower completes the actual loan application and submits for approval. To the underwriter/user, the application is represented as being in this state by the flag, arrow, or any other shape that the program uses to display the individual states, being highlighted in some manner. In the example shown in FIG. 17, this is done by the "Qualified" 1704 state being highlighted in a color such as blue. Once the potential borrower submits the application for approval, the workflow process reporting section 1340 will indicate that the application is in the "Applied" state 1712. In the example shown in FIG. 17, this would be represented by the "Applied" state 1712 being highlighted blue, and the "Qualified" state 1704 no longer being highlighted in blue. The system may be programmed to either revert the "Qualified" state 1704 to the original color or to another color indicative of completed workflow sections.

Once the application is in the "Applied" state 1712, and an underwriter or the system initiates the collection of data, the workflow process reporting section 1340 will indicate that the application is in the "Documents" state 1720. In addition to showing the amount of time the application spends in this state, the "Documents" state 1720 displays how many times the application is moved into this state from any other state. The application could be moved back into this state at any point in the application process. The number of "bumps" 1724 represents the number of times the application has moved back or back into the "Documents" state 1720. Additionally, in the embodiment shown, as shown in all states, the "Documents" state 1720 also displays the total amount of time 1728 an application has spent in the "Documents" state 1720.

Once the application is moved, either by the system, or manually, into the underwriter's workflow, the workflow process reporting section 1340 will indicate that the application is in the "Underwriting" state 1732. In addition to showing the amount of time the application spends in this state 1740, the "Underwriting" state displays how many times the application is moved into this state from any other state. The application could be moved back into this state at any point in the application process. The number of "bumps" 1736 represents the number of times the application has been moved into or back into the "Underwriting" state.

Once the underwriter has made a decision on the loan application, and either approved or disapproved the loan application, the workflow process reporting section 1340 will indicate that the application is in the "Decisioned" state 1744. In this embodiment, the total time the application spends in this state is also displayed 1748.

With all of the states described above, in some embodiments, the total time the application exists in each state is displayed. Such display may be any manner of displaying duration, such as days-hours-minutes-seconds, total hours, days and hours, etc.

Figure 18A:
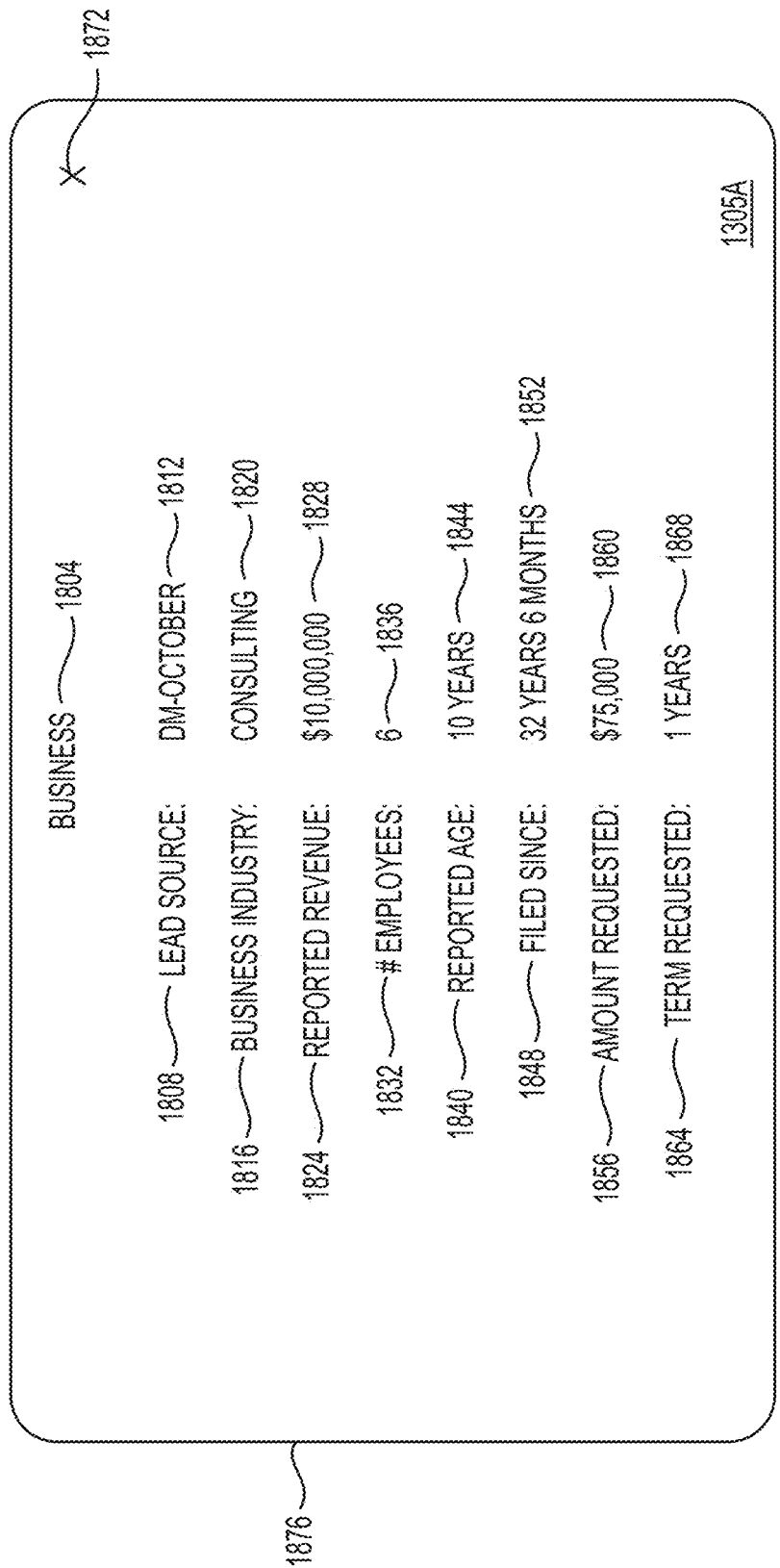
FIG. 18A is a screenshot of an exemplary business tile.

Returning to the loan dashboard of FIG. 13, a tile display area 1350 displays a selectable set of the tiles (1305A-1305L). (FIGS. 18A-18N provide additional details about the tiles 1305A-1305L displayed on the tile display area 1350). A loan adjustments and tile control area 1360 displays offers and adjustments for the loan application. Additionally, the loan adjustments and tile control area 1360 is where tiles that are not currently displayed in the tile display area 1350 are selectable as icons displaying the corresponding name of the tile. An additional part of the screen is the detailed information area 1370 that displays additional, Level 2 data that is available about the most recently selected tile (i.e., the tile in tile display area 1350 that most recently received the "focus" of the tile display area 1350). For example, the Level 2 details referred to as the "Credit Details" (and shown in FIGS. 21B and 21C) would be displayed when the "Credit" tile (1305B, shown in greater detail in FIG. 18B) is selected.

Referring generally to FIGS. 13-21C, all of the data, information, and documents that are or have become a part of the loan application in the collection process, are available for the underwriter to access, display and review through portions of the graphical user interface. The display of this loan related data, information, statistics and documents may be managed through the use of categorizing or grouping based on system or user preferences. Through the user interface, the following levels of information may be available to the user, and may be viewed as information, text, graphs, charts, metrics, and/or any other visual method of displaying data:

Level 1: high level—this is summarized data and is the data that is typically displayed on the tiles 1305, which provides an overview for the user to quickly identify the status of information gathering, trends, flags that require follow-up, etc.

Level 2: detailed level—consists of extracted structured details of information from source materials. This is the data that is displayed on the detailed information area 1370 and provides the user with details on the information that is graphically displayed on the tile from the tile display area 1350 that is selected.

Level 3: source documents/raw data—this is how the data that is collected originated and is sometimes stored in this format. It consists of actual credit reports, social media pages, bank account information, legal documents, tax returns, and/or other loan/mortgage data, etc. The level 3 raw data or raw information can be the source materials or source documents themselves. The underwriting system allows the user to access this reference data as needed through links, for example, graphical links.

Referring again to FIG. 13, the loan dashboard 1300 contains a number of task management features for the user to interact with to perform work functions associated with their role in the underwriting system. One of these features is a tile display area 1350 including a series of customizable tiles (e.g., 1305A-1305L). A tile (generally referred to as 1305) is displayed on the screen as any shape, generally two-dimensional shapes but three dimensional may be used. In one embodiment, the tiles 1305A-1305L are rectangular, which allows a high or maximum consolidation of the tiles on the screen. In other words, rectangles, including squares, usually utilize the screen space or screen "real estate" in the most efficient manner. However, in other embodiments, the tiles 1305A-1305L may be circular, hexagonal, or any other geometric shape. In some embodiments, the shapes for tiles 1305A-1305L are different or mixed, an octagon (or stop sign) for one, a triangle for another, a diamond, a circle, a rectangle, etc. The shapes themselves may have certain meanings in the system. For example, similar to road signs, an octagon may signify stop, a diamond may be a warning, a triangle with apex down yielding to a decision, etc.

In other embodiments, the tiles 1305A-1305L are cubes or rectangular boxes which can be rotated to reveal information on each side. In other embodiments, the tiles are prism shaped or slot machine reels and can be rotated about an axis to reveal information on each of the multiple sides or positions (e.g. six, eight, ten sides).

Referring to the tile display area 1350 in FIG. 13, each tile (1305A-1305L) shown contains information and graphical representations of the source document or raw data that the tile displays information for. The source information may be shown in a summary form or high-level form. In other embodiments, portions of the raw data or document are shown in the tiles 1305A-1305L. In yet other embodiments, icons within a tile 1305 provide access to additional data. The tile display area 1350 may be implemented as a tile or widget control (e.g., such as an Angularjs widget control like Angular gridster) to enable tiles to be placed on, drawn on, removed from, and reorganized on the tile display area 1350.

In some embodiments, the tiles 1305A-1305L are color-coded to provide visual indications to allow the user to determine where attention is needed. The tile color can be associated with an attribute, status and/or category. In some embodiments, the color coding is along the edge of the tile while in others the color coding is the edge, background, text and/or content of the tile. For example, if the tile has a green edge, this may indicate to the user that all required information has been collected for that field or topic and meets the requirements that the program has established in order to be considered acceptable. If the tile has a yellow edge, this may indicate that additional information must be collected or that the results of the collected information fall outside the preferred or required parameters that the system is programmed to consider acceptable. If the tile has a red edge, this may indicate that no information has been gathered, only partial information has been gathered, and/or the results of the collected information has failed the minimum required parameters that the system is programmed to compare against. In some embodiments, the red color signifies a tile of concern to the underwriter, while yellow may be cautionary and green is acceptable. The underwriting system may be programmed or configured in a number of way to establish the color coding or to establish the parameters or requirements for comparison and color coding. The underwriting system compares gathered information with stored parameters or requirements to produce any programmed color of tile.

The exemplary programming code (that references a global variable "vm" which is a global control object for controlling the dashboard) causes the system to color code the edge or border of a tile as red, green, or orange, based on the value parameters set up by the programmer for each color (in this example, the Cashflow tile 1305F):

```
function getCashflowData( ) {
  var url = vm.tile.data_url;
  if (!url) return;
  vm.loading = true;
  return restService.getData(url).then(function(resp) {
```

-continued

```
    vm.loading = false;
    if (resp.hasError) return;
    if (!angular.isObject(resp)) return;
    vm.data = resp;
    vm.avg_net = resp.avg_net;
    vm.ann_inf = resp.ann_inf;
    vm.tile.borderClass = resp.state;
    vm.period = resp.period;
    vm.resulting_revenue = resp.resulting_revenue;
    vm.resulting_spend = resp.resulting_spend;
    vm.resulting_net = resp.resulting_net;
    vm.actual_balance = resp.actual_balance;
    initChart( );
    loadChartData(resp);
    $rootScope.cash_state = resp.state;
});
```

A Cascading Style Sheet (CSS) for the dashboard can then be used to automatically set the border-color of the corresponding tile when a tile (e.g., the Cashflow tile 1305F or any other tile) changes one of its tile attributes to "ok", "fail" or "conditional" as defined by the CSS code fragment below:

CSS:
.tile.green-border, .tile.ok {border-color: #00b45a;}
.tile.red-border, .tile.fail {border-color: #0000;}
.tile.orange-border, .tile.conditional {border-color #ffa500;}

Alternatively, the display may be programmed such that the entire tile 1305, or other portion of the tile 1305, rather than the border of the tile, changes color to display the status of the particular data collected and/or the comparison results of that tile. For example, even the background of the individual tile can reflect the color coding (e.g., red, yellow, green, black). In yet another embodiment, the border and background can be changed independently to provide additional visual information. For example, a green border with no background color may mean "information acceptable and no warnings", but a green border with a yellow background may mean "information acceptable but a non-fatal, informational warning." However, a yellow or red border can be used to indicate that the information is incomplete or not acceptable, respectively, and the backgrounds can be used for informational warning levels.

A tile 1305 in the underwriting system may be programmed for any available color. In one embodiment, the tile background is black, which reduces strain on the user's eye. The icons, charts, graphs, and text that may be displayed on the tile may be any color that contrasts with the background color. The edge of the tile may be highlighted any color, which can be programmed to correlate with a status, category, etc. Alternatively, the background color may be programmed to correlate with a status, category, etc.

The tiles 1305 may be moved or rearranged on the graphical user interface screen. For example, in some embodiments each tile may be clicked and dragged to any position within the tile display area 1350 provided for the tiles. In this manner, tiles 1305 can be rearranged or shuffled. In FIG. 13, the tiles 1305 are configured in the tile display area 1350 on the left side of the graphic user interface. A tile 1305 may be minimized so that it either is not displayed at all, or is represented as an icon, box, or any other shape on a portion of the dashboard 1300 that allows the user to see which tiles are not being displayed (e.g., in the loan adjustments and tile control area 1360). This may be done to allow the user to view those tiles or categories of tiles that they wish to view, either individually or as a group. For example, the user may wish to view on the display only those tiles that indicate that attention is needed in a particular area. The tiles 1305 may be programmed to indicate attention is needed based on either system parameters or user-generated parameters, and may display such an indication in any number of ways, including for example color, shape, size, location, font, flashing, blinking, etc.

For example, the user may click on or highlight all the icons in the loan adjustments and tile control area 1360 that indicate that they have a red indicator, which would result in all of those tiles being displayed on the tile display area 1350 in FIG. 13. Alternatively, the user may select an icon (or utilize a pop-up menu that appears by right-clicking in the loan adjustments and tile control area 1360) that activates the function of automatically displaying in the tile display area 1350 all the tiles in the loan adjustments and tile control area 1360 that display a red edge. The "red-edge tiles" may be added to or replace tiles 1305 being displayed in the tile display area 1350. In an embodiment where red-tiles automatically replace existing tiles on the tile display area 1350, the system preferably removes tiles that do not need further attention (e.g., green tiles) to make room for the tiles being newly displayed. (Icons representing hidden tiles may be programmed in any configuration to display a given set of tiles 1305.)

The user may want to move individual tiles for any number of reasons, including, but not limited to, focusing on specific data, developing a workflow, organizing by importance for certain types of loans, or customizing a display for a particular loan. The tiles 1305 may be independently moved by using a touchscreen, a mouse or other user input tool connected to the computer system to select and drag the tile to the desired location within the defined field. If the tile 1305 is moved to an area on the defined field that is currently occupied by another tile, the tiles 1305 will shift such that the selected tile is positioned in the location selected by the user, and the other tiles 1305 will move around that selected tile. For example, the tile may be selected by placing the mouse cursor at any location on the tile face or edge.

A tile 1305 visually displays icons, charts, graphs, maps, and/or text based on the raw data the tile is programmed to display. In one embodiment, the user may click on the tile for additional information. When a tile 1305 is selected, the loan adjustments and tile control area 1360 (FIG. 13) displays this additional information about or associated with the tile 1305. Also, in some embodiments, a tile 1305 has an icon that when selected by the user, rotates the tile to provide another tile display (i.e., another face of the tile). For example, clicking on a tile 1305 displaying a pie chart, the tile could rotate and display a bar chart. The tile may be clicked and rotated again as many times as there are other tiles to display information (in in different formats and/or alternative information).

In an embodiment, the tiles 1305 in the graphical user interface are continuously active and updating based on the collection of information with processing being performed in the background. The data that is fed to the tile 1305, supporting data and/or raw data may be accessed by selecting an information icon that will display the documents, API-collected information, and any other available data for the user. All documentation is maintained within a database that the computer system accesses and stores to digitally (i.e., a database that is locally or remotely accessed from non-volatile storage or from memory).

The tiles may be configured in any manner, including, but not limited to, by: status, priority, etc.

In an alternative embodiment, rather than displaying the tiles in a default configuration, tiles are displayed and viewed in a heat map arrangement on a graphical display screen or portion of a screen (not shown). In that embodiment, tiles are shown on the screen heat mapped by location on the screen based on their color as described above with respect to loans.

When an underwriter clicks on a request ID (prospective borrower ID) (e.g., using the interface of FIG. 12E or 12F) the system shows the loan dashboard 1300 shown in FIG. 13, which, again, displays various tiles (illustrated as 1305A-1305L) to the underwriter. In the embodiment shown, there are 12 displayed tiles and each tile shows information on specific set(s) of attributes grouped together logically. The tiles (1305A-1305L) in FIG. 13 are color coded for quick recognition by user, for example, where green means that that a set of information is acceptable whereas red means that the underwriter needs to look at this information in more depth. This view helps the Underwriters to make fast, consistent, and compliant decisions. The data is structured and everything is available to the underwriters digitally. The systems guide the underwriter on where to look and where to take action.

Tiles can be moved, ordered, removed, or added, for best information flow based on underwriter's preference. Any tile 1305, with an additional level of information or deeper information, can be clicked on with more information showing in detailed information area 1370.

FIGS. 18A through 18O display exemplary tiles that provide the underwriter a quick glance at the status and information collected by the system. Each tile is further explained below.

FIG. 18A is an exemplary business information tile 1305A showing basic information about the borrower such as Business name, Request ID, Business owner and if they are a repeat borrower, and current status of application. This business information tile 1305A contains business information as reported/provided on an application. The tile title 1804 is displayed at the top or somewhere prominent on the tile. The location of the tile title 1804 will be consistent among all tiles for uniformity.

In FIG. 18A, additional information displayed may include the Lead Source 1808, Business Industry 1816, Reported Revenue 1824, number of employees 1832, filed since 1848, amount requested 1856, and term requested 1864. In this example, the Lead Source 1808 is shown to be "DM—October" 1812, which represents the source through which the company obtained the lead for the loan application. The Business Industry 1816 for this example is "consulting" 1820. This field is pulled from the database based on information entered by the potential borrower into the loan application. The reported revenue 1824 is shown to be $10,000,000 (1828) in this example, which is pulled from the database based on information entered by the potential borrower into the loan application. The number of employees 1832 is shown in the example to be six 1836. This field may be represented by either text or numerically, depending on the program settings or user preferences. In FIG. 18A the number of employees 1832 is shown numerically 1836. Reported Age 1840 represents the age of the business, which is based, for example, on the articles of incorporation or other business establishment documents. In the example shown, the age of the business is ten years 1844. The "Filed Since" field 1848 represents how long the business has filed taxes, and is based on information provided by the potential borrower in the loan application. In the example shown, this value is 32 years 6 months 1852, which represents the total time since the first filing, and may be displayed in any date/time method. The "Filed Since" field 1848 may alternatively be shown as the first date (month, day, year) of filing. The "Amount Requested" 1856 field in the example is $75,000 1860 which represents the loan amount requested by the potential borrower, and is pulled by the system from the database based on the information entered into the loan application by the potential borrower. The "Term Requested" field 1864 in the example is shown to be 1 year 1868, which represents the loan term requested by the potential borrower, and is pulled by the system from the database based on the information entered into the loan application by the potential borrower.

Any additional business information that may be useful to the underwriter may be shown on this tile 1305A, but it is a feature of the system to show only that information which will be most useful to the underwriter to make a lending decision in order to increase efficiency and reduce the clutter shown on the display. Each tile contains a "close tile" icon 1872 (represented as an "X") which, when selected by the user, closes the tile by minimizing it and placing a smaller tile icon that just displays the tile title 1804 for the underwriter to see in loan adjustments and tile control area 1360 for later selection (shown in enlarged form in FIG. 19A). The tile edge 1876 in the example shown in FIG. 18A is gray, which may represent a tile that is for informational purposes only; in this case the business tile displays only information that is entered by the applicant, and therefore does not require system verification of the status of the data collection. Alternatively, the tile edge 1876 may be programmed to turn green once all information has been verified by the underwriter, and may be programmed to remain red until all information has been entered into the system by the applicant.

Figure 18B:
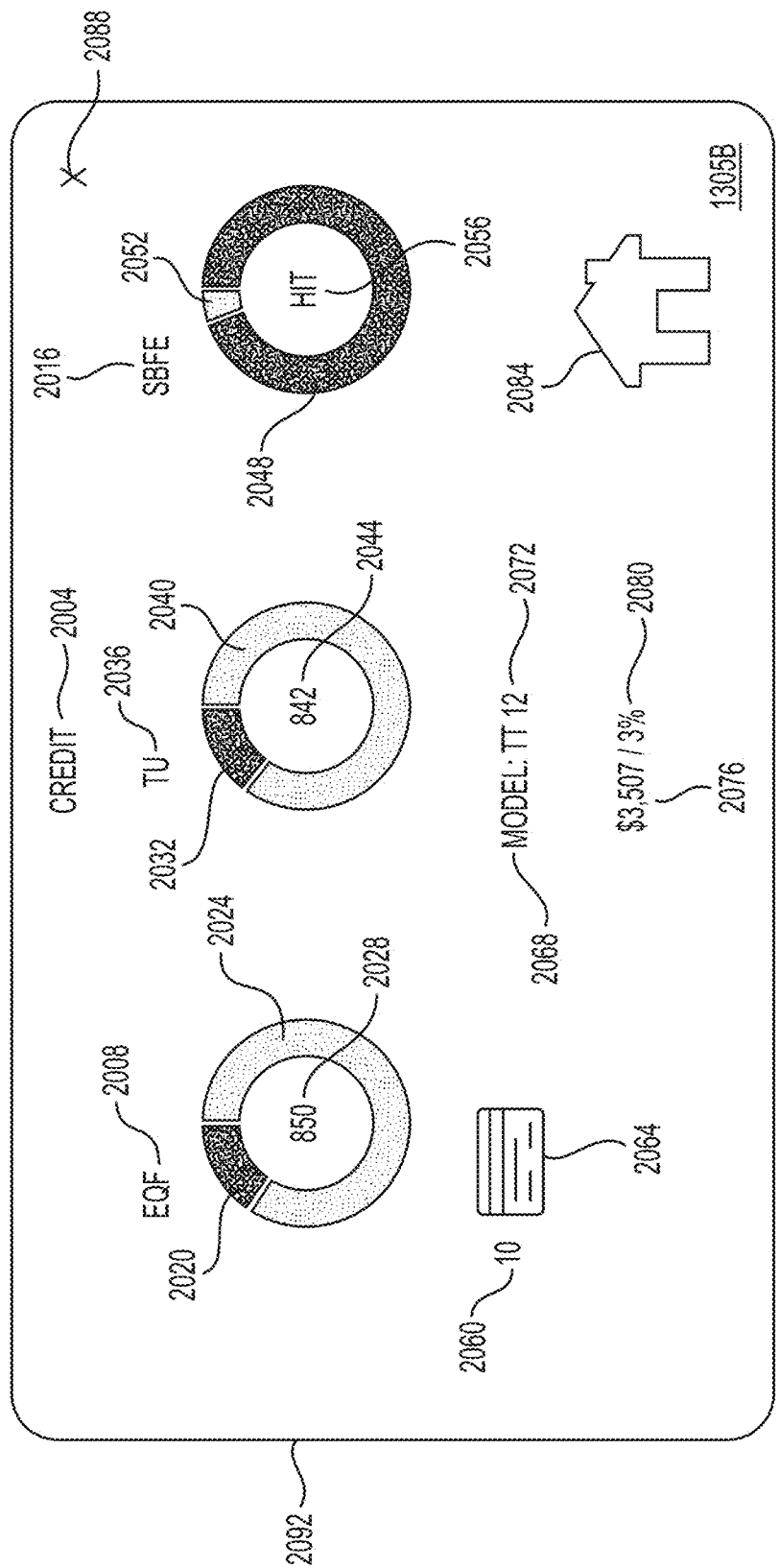
FIG. 18B is a screenshot of an exemplary credit tile.

FIG. 18B is an exemplary credit tile 1305B and shows summarized information from multiple credit bureaus including for example, Equifax, TransUnion, and/or Small Business Financial Exchange (SBFE). The "Credit" tile title 2004 is displayed at the top of the tile. The three circular displays on the tile will be referred to as "Donuts." The Donuts are a graphical depiction of the status of credit payments and delinquencies for the potential borrower. Donuts show a sum of current credit balance versus what is available. Within the donut on the left is the FICO reported for Equifax (EQF) 2028. Within the donut in the center of the tile is the FICO reported for TransUnion (TU) 2044. The donut on the right indicates there was a HIT on SBFE 2056. Referring to the EQF Donut on the left side of the tile, the sections of the donut would be colored different colors to represent the status of payments. Green=current, orange=late payments, red=severely late (or default). For example, the larger shaded portion of the donut 2024 would be colored orange, representing a high number of late payments. The smaller shaded portion of the donut 2020 would be colored green, representing a smaller number of current payments.

Still referring to FIG. 18B, and now referring to the TU Donut in the center of the tile, the sections of the donut would be colored different colors to represent the status of payments. Green=current, orange=late payments, red=severely late (or default). For example, the larger shaded portion of the donut 2040 would be colored orange, representing a high number of late payments. The smaller shaded portion of the donut 2032 would be colored green, representing a smaller number of current payments.

Visually comparing the two credit reports sided-by-side allows the underwriter to verify that the collection of credit information is accurate. Any anomalies between the two credit reports would be immediately apparent, for instance, if the credit scores 2028, 2044 were not in the same range, or if a large percentage of late payments were reported on one credit report but not the other. By identifying such anomalies, the underwriter is prompted to look further into the issue for resolution.

Still referring to FIG. 18B, and now referring to the SBFE Donut on the right side of the tile, the sections of the donut would be colored different colors to represent the status of payments. Green=current, orange=late payments, red=severely late (or default). For example, the larger shaded portion of the donut 2052 would be colored green, representing a high number of current payments. The smaller shaded portion of the donut 2052 would be colored orange, representing a smaller number of late payments.

Still referring to FIG. 18B, credit card icons 2064 show number of revolving credit lines 2060 (in this example, the number of revolving credit lines is 10). Model 2068 shows the StreetShares twentile (TT) based on the StreetShares credit profile. In this example, the Model 2068 is "TT3" 2072. As described in greater detail below with respect to FIG. 21A, the twentile is one method a company may utilize to segregate the loan offers based on risk and any other factors the company wishes to factor in. The twentile in these examples segregates applications into twenty separate bands of possible values. A company may customize the Model 2068 field in whatever manner provides their underwriters the information the company uses for classifying potential borrower credit. House icon 2084 shows if business owner has a mortgage. If the house icon 2084 is present on the tile 1305B, it indicates that the business owner has a mortgage. If no house icon is present on the tile 1305B, it indicates that the collection of information revealed no mortgage. Additional information regarding the mortgage may be collected and displayed, such as the monthly payment 2076 and annual percentage rate 2080 (shown as $3,507 and 3% in the example, respectively). Alternatively or additionally, the house icon may be color coded to depict the status of the mortgage. For example, a house icon may be green for on-time payments and all in order, yellow for caution (e.g., possible insufficient source of funds for each payment or possible supplementation by third party), orange for recorded late payments, and red for mortgage in default.

While particular graphics and icons are shown with reference to FIG. 18B, various other visual displays of the relevant loan application data may be used within the tiles described. Also, certain colors are described to color code the data, variations are possible in the color as would be understood by a person of ordinary skill in the art.

FIG. 18C is an exemplary Fraud Check tile 1305C. In the embodiment shown, a member of the staff performs a manual fraud check to be sure person applying is who they say they are. Once Fraud check is performed and passes, the tile edge 2964 turns green or other positive indicating color. Until the fraud check is performed, the tile edge 2964 remains red or negative. The "Fraud Check" tile title 2905 is displayed at the top of the tile. The Fraud Check tile 1305C contains a "close tile" icon 2960 as discussed above with respect to FIG. 18A. Static fields or name fields are displayed in a column on the left side of the Fraud Check tile 1305C. These static fields include "Fraud Check" 2910, "Performer" 2915, "Number" 2920, "Comments" 2925, and "Date" 2930. The staff member who performs the fraud check enters their name into the appropriate field in the system when the fraud check is conducted. In this example, the staff username who conducted the fraud check was "mgrover" 2940, which correlates to, and is selected from, a list within the system of all staff members. The "Number" 2920 represents the phone number 2945 that the staff member 2940 called to verify that the applicant is who they said they were on their application. The staff member may enter any comments into the system. There is a drop down from which the numbers can be chosen. The numbers are collected using third party data sources like Lexis Nexis and Small Business Financial Exchange. In the example, "mgrover" 2940 called the applicant at "(210) 622-9460 2945" on Mar. 29, 2017 at 18:21:19 2955 and entered the comment "Talked with the borrower" 2950. Once the staff member completes a successful fraud check, the staff member changes the fraud check status to "pass" 2935.

Figure 18D:
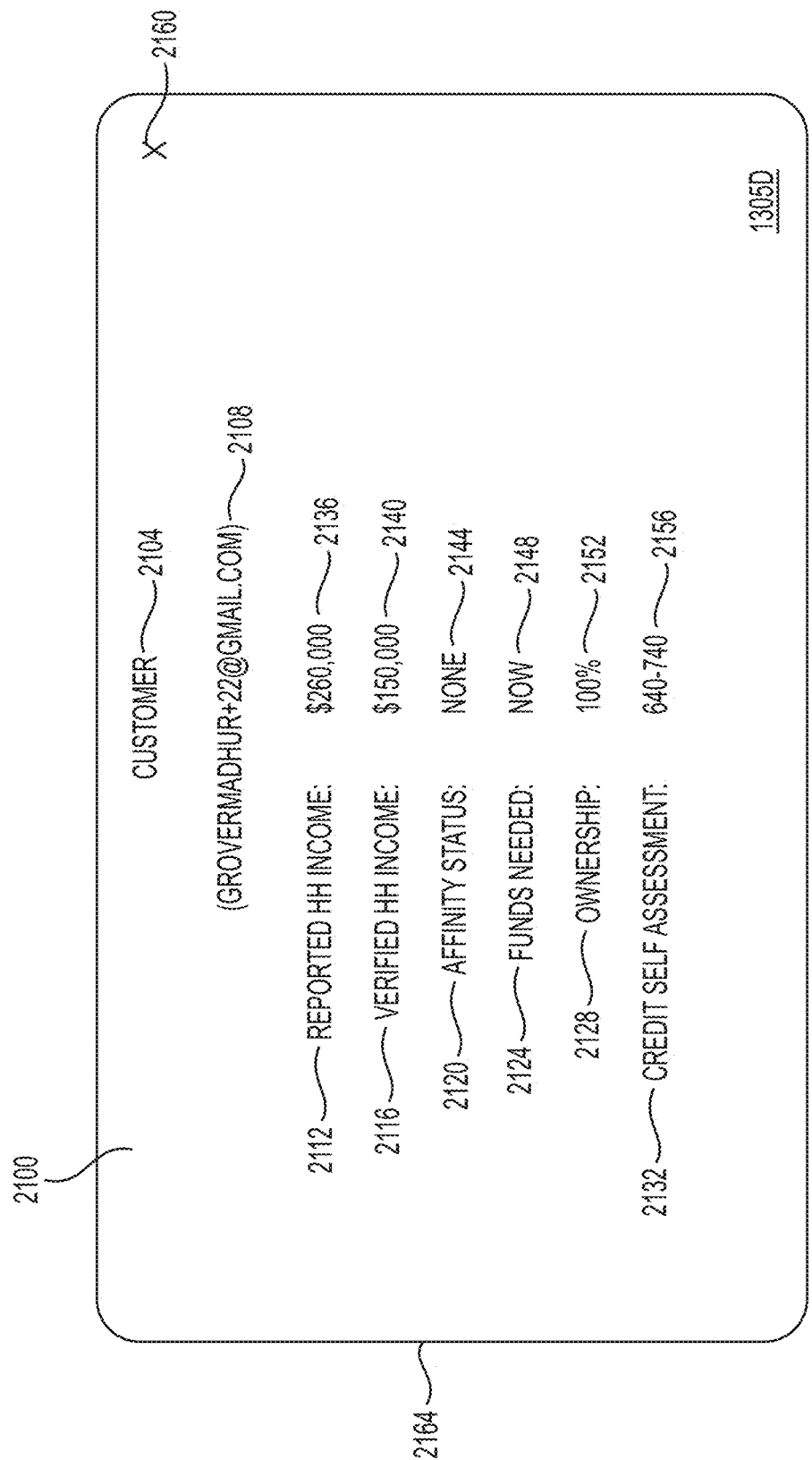
FIG. 18D is a screenshot of an exemplary customer tile.

FIG. 18D is an exemplary customer tile 1305D that displays customer personal data, and includes both reported income 2112, 2136 and verified income 2116, 2140, Veteran information 2120, 2144, when funds are needed 2124, 2148, ownership 2128, 2152 and credit self-assessment 2132, 2156. Additional customer information displayed may include an e-mail address 2108, telephone number or any other information that the underwriter or company prefers. The customer tile 2011 contains close tile icon 2160, in the upper right hand corner, which, when selected by the user, closes the tile by minimizing it and placing a smaller tile icon in the loan adjustments and tile control area 1360 with the tile title 2104 for the underwriter to see and select.

In some embodiments, the tile edge 2164 in the example shown in FIG. 18D is colored. For example, the color may be gray which may represent a tile that is for informational purposes only; in this case the customer tile 1305D displays only information that is entered by the applicant, and therefore does not require system verification of the status of the data collection. Alternatively, for example, the tile edge 2164 may be programmed to turn green once all information has been verified by the underwriter, and may be programmed to remain red until all information has been entered into the system by the applicant.

The "Reported HH Income" field 2112 represents the household income that the applicant enters into the loan application. In this example, the value entered by the applicant was $260,000 2136. The "Verified HH Income" field 2116 represents the household income that the system calculated through documents, such as IRS tax forms, bank statements and the like. In this example the value calculated by the system was $150,000 (2140). By visually displaying this data on one tile, the underwriter is able to quickly and efficiently see a significant disparity between reported and verified income. This will prompt the underwriter to look into the issue and find if there was a problem in the data collection, if the applicant misrepresented income, or if there is some other explanation (such as the presence of non-taxable income).

The "Affinity Status" 2120 shows what groups the borrower is a member of or is associated with. For example, the veteran status of the applicant or member of a college alumni group. In this example, there is affinity information is None (2144). However, the tile could display amplifying information regarding the affiliate status, such as veteran's paygrade (O3), branch of service (Air Force), and years of military service (10.5).

The "Funds Needed" field 2124 represents when the applicant selected that they require the loan. In this example, the applicant indicated that they need the loan "now" 2148. The options for the applicant select include "Now," "Few Days," "Few Weeks", "Month or more." In an alternative embodiment, a date may be selected as the date the loan is required. The system may be programmed to show either that date, or automatically categorize the date into the previously listed menu options for display on the tile.

The "Ownership" field 2128 represents the loan applicant's ownership percentage of the business that the loan is for. For example, if there were two equal partners, the applicant would indicate 50%. In the example shown in FIG. 18D, the applicant selected 100% 2152 indicating that they are the only owner of the business. The "Credit Self-Assessment" field 2132 represents the loan applicant's self-assessment of their credit worthiness. In this example, the applicant selected the 640-740 range 2156. The system may be programmed to allow any ranges to be available for selection, but ranges of 100 are optimal because individuals and businesses tend to be able to self-identify their credit within such a range of credit scores. Having such a self-assessment allows the underwriter to determine if the applicant is knowledgeable about their own credit history, or alternatively, may allow the underwriter to identify anomalies (such as if the applicant thinks they have a significantly lower credit than the Equifax or TransUnion credit reports indicate).

Figure 18E:
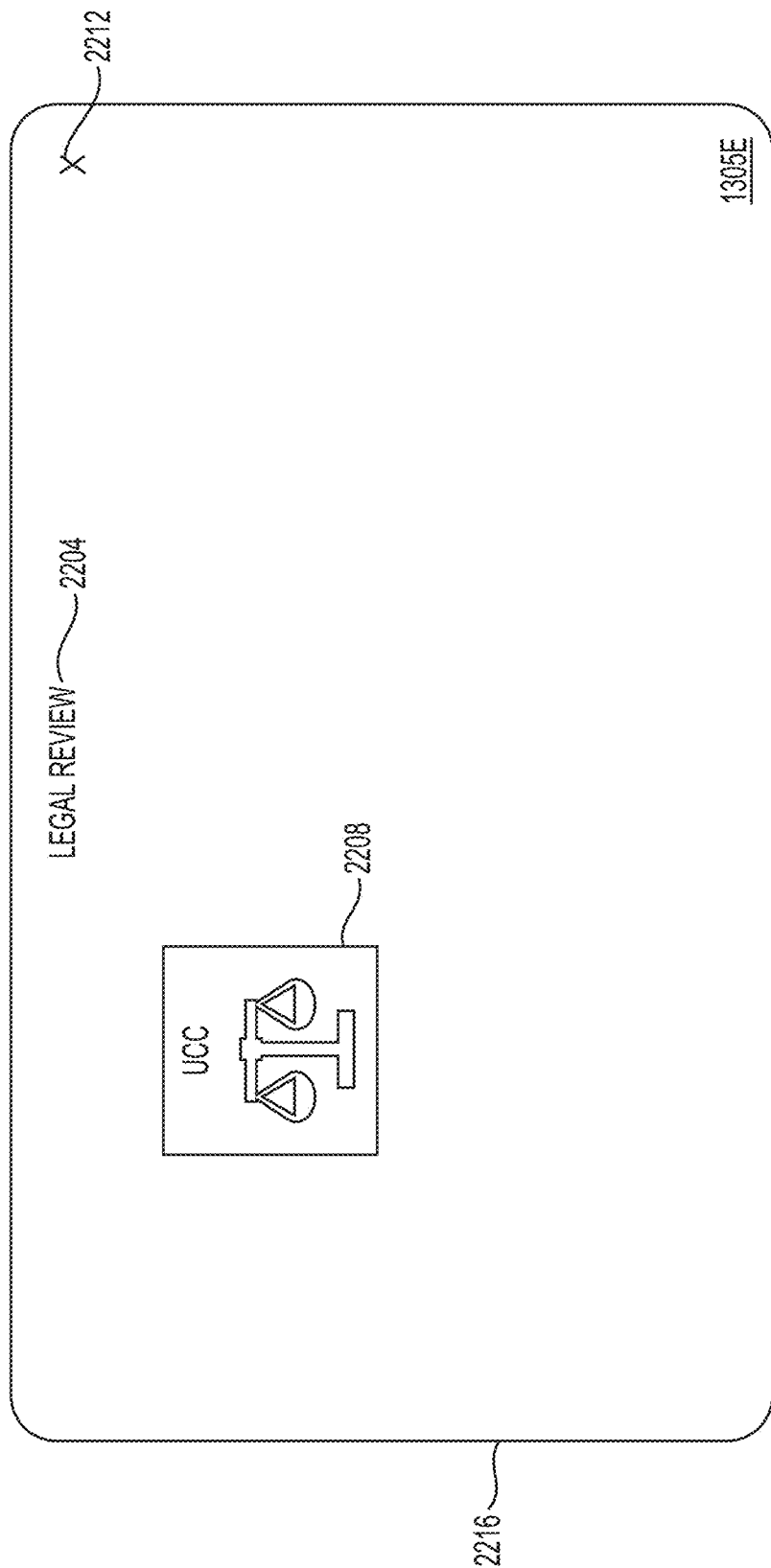
FIG. 18E is a screenshot of an exemplary Legal Review tile.

FIG. 18E is an exemplary Legal Review tile 1305E. Specifically, the Legal Review tile 1305E shown is for a legal database (e.g., Lexis/Nexis databases) and shows whether or not there were any hits on the selected legal database(s), including judgements and liens, Criminal records, Corporate filings, National UCC Liens, business bankruptcies, foreclosures or hits on Sex Offenders databases, etc. Other third party vendor databases may be used to gather information about the borrower and shown in a similar Legal Review tile 1305E. The tile title 2204 is displayed at the top of the tile. The Legal Review tile 1305E contains a close tile icon 2212 in the upper right-hand corner, which, when selected by the user, minimizes the tile 1305E and places it, with its tile title 2204, in the loan adjustments and tile control area 1360 as described for other tiles. The tile edge 2216 in the example shown in FIG. 18E could be colored such as red to indicate that one of the above mentioned hits were identified for the applicant (either a personal or business hit), or it could be green to indicate that no hits were found in the Legal Review database for either the applicant or the business. The "UCC" "scales of justice" icon 2208 is highlighted with a bright color when the system receives a hit from the Legal Review search. If an informational icon within a tile is highlighted, the underwriter can visually determine that they need to check this data to ensure the hit is not a false positive. If the hit is a false positive, the underwriter can select the scales of justice icon 2208 to remove the false positive from the system. Taking this action changes the corresponding database field to show that there are no negative hits on the legal search, and the scales of justice icon 2208 is "greyed out," and the tile edge 2216 turns green so that the underwriter can visually determine that there are no legal hits remaining on the application.

Figure 18F:
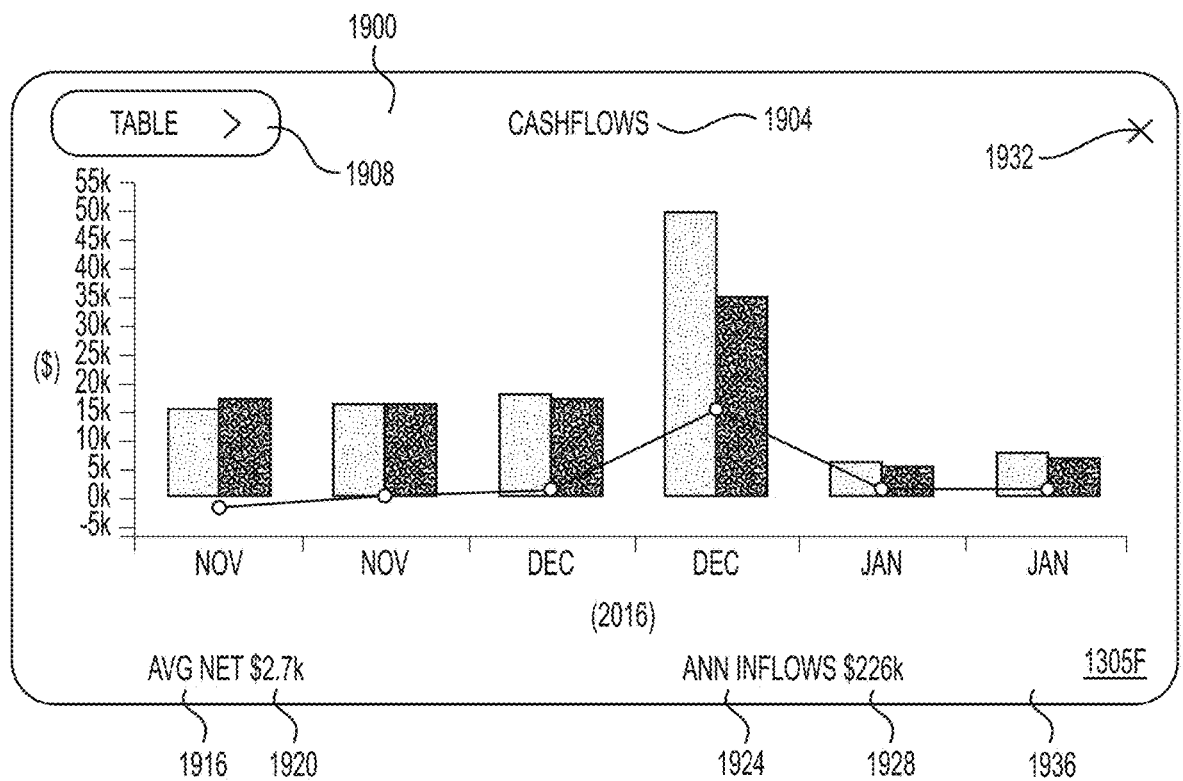
FIGS. 18F and 18N are screenshots of the front and back of an exemplary cashflow tile that is turnable or flippable.
Figure 18N:
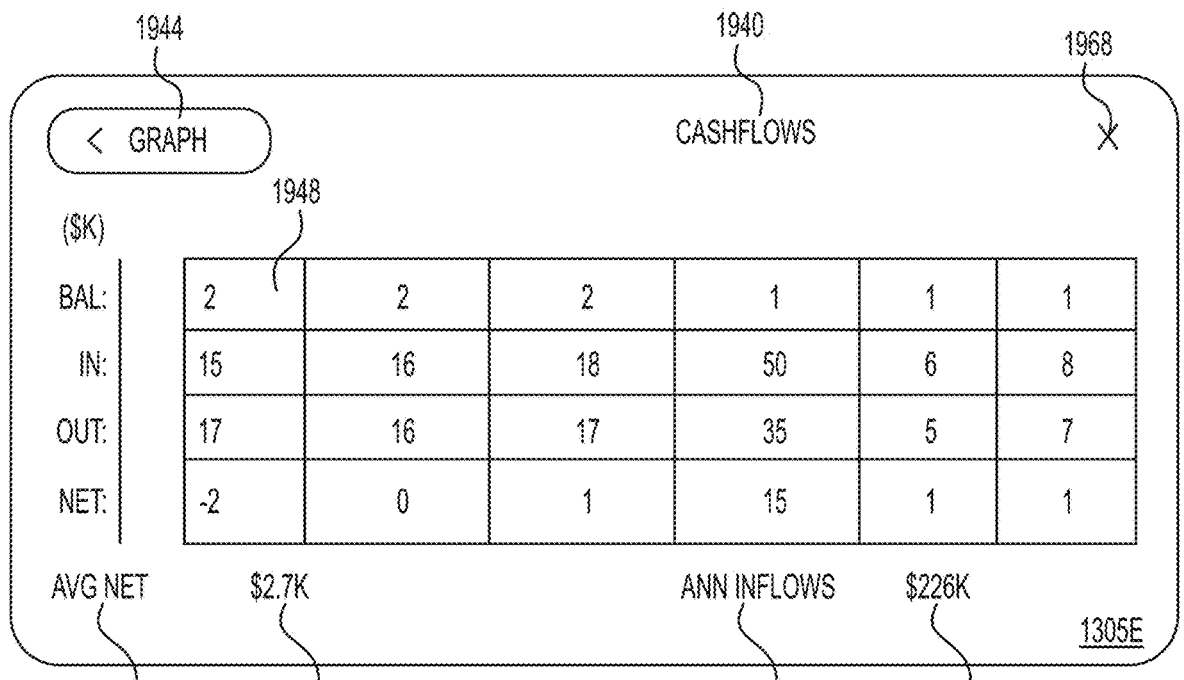

FIG. 18F is an exemplary Cashflow tile 1305F. A chart is generated based on transaction information provided directly from business/personal bank connections (if user connected using the Plaid service), or by an underwriter entering data from uploaded bank statements. (Automated methods for processing cashflow data are provided with respect to FIGS. 24A-24C below.) In addition to its other characteristics, FIG. 18F shows an example of a tile 1305F that may be turned or flipped, and the display that results from the user selecting the icon to initiate the turn or flip. When the user selects the icon labeled "table >" on the cashflow tile 1305F that currently displays a bar graph of the cashflow information, the tile will turn and now display the cashflow table (as shown in FIG. 18N). Likewise, when the user clicks the icon labeled "<graph" on the cashflow tile that displays a table of the cashflow information, the tile will turn back and now display the cashflow graph (as shown in FIG. 18F). The tile title 1904 is displayed at the top or somewhere prominent on the tile. The location of the tile title 1904 will be consistent among all tiles for uniformity.

In FIG. 18F, additional information displayed may include a graph 1912 or chart 1948 displaying cashflow data that the system generates from documents and information collected. For example, any documents to support the business or personal income of the potential borrower is entered into the system, or collected automatically through API processes described in this application. The system is programmed to enter this data into a chart 1948, which will automatically display on the cashflow tile 1305F as shown. The Average Net 1952 for the graph (here shown to be $2.7 k 1956) and the Annual inflows ("Ann Inflows") 1960 (here shown to be $226K 1964) are displayed under the table. The Average Net and Annual Inflows amounts are automatically calculated based on the table data using standard accounting formulas and practices.

A primary feature of the tile system in the underwriting system is that the tiles may be "flipped" or "turned" to show either additional data or display the same data in a different way. In order to change display formats, the user may flip or turn the tile from the graph display to the table display using corresponding icons. To perform a switch on the interface of FIG. 18F, the user would click on the "table >" icon 1908 at the top left of the tile 1305F in FIG. 18F and toggle between the graph and table views. To switch back to the graph view, the user would click on the "<graph" icon 1944 at the top left of the tile 1305 in FIG. 18N. This will result in turning the tile back to display the Cashflow tile title 1904 that has a graph 1912 underneath that displays the same data as was shown on the table. The same Average Net 1916 of $2.7K 1920 and Ann Inflows 1924 of $226 k 1928 is displayed because the graphic display represents the same data as the other side of the tile.

In one embodiment of the tiles, the tiles are flipped by applying a transformation (i.e., a rotation of 180 degrees) to the tile. In an embodiment where the flip is to be seen as an animation, the transformation may be given a "transition time" (e.g., 0.5 seconds) during which the transformation is to occur so that the transformation is not instantaneous. In an embodiment that utilizes an Angularjs framework, the transformation may be triggered by adding information (e.g., an object class) to a tile that can be handled by the framework. For example, when the user clicks on the "table >" icon 1908, a class can be added to the attributes of the cashflow tile 1305F such that when the cascading style sheets (CSSs) of the dashboard are processed due to a change in the tiles, the code to trigger the transformation is automatically executed. To flip the tile back in response to clicking on the "<graph" icon 1944, the object class added to the cashflow tile 1305F would be removed and the processing of the CSSs would cause the cashflow tile 1305F to be redrawn in its original form (including any changes to the data that may have occurred since the cashflow tile 1305F was initially flipped).

The tile edge 1936 in this example would be green, indicating that the calculated cashflow meets or exceeds the parameters the system has calculated as being the minimum required for the loan application.

The system automatically checks available information sources (e.g., bank records and QuickBook records) to determine how much credit the customer is getting in its bank account(s) and how much debit is happening in the same account(s). The automatic checks preferably run using 3 months, 4 months, 5 months and 6 months of the data. If the customer fails all the tests then the tile becomes red. If the customer fails some monthly test the tile becomes yellow and if the customer passes all the test the tile becomes green.

In one embodiment, the cashflow information is obtained automatically either by directly downloading monthly statements (or other bank records) from the borrower's bank(s) or by utilizing a third-party interface (e.g., Plaid) to get the same information. In either of those implementations, the monthly statements or other banking records may be in text form, image (or PDF) form, or a combination. Alternatively, the monthly statements or other banking records may be collected in paper form which is converted to scanned images by the borrower or the underwriters (and saved on the system as PDFs or as images). The process of automatically analyzing the borrower's banking records is described herein after with respect to FIGS. 24A-24C.

The Average Net 1916 and Annual Inflows 1924 amounts may be color coded to represent ranges that these values fall into. For example, if the system is programmed with a minimum average amount, the calculated average amount for a particular loan applicant may be compared against this and be shown as green if the amount exceeds the minimum, or red if the amount fails to meet the minimum. This provides an additional visual efficiency for the underwriter when evaluating the loan. In the example shown in FIG. 18F, the underwriter could see that the Average Net meets the minimum standard but the Annual inflows do not meet the minimum standard, which would allow the underwriter to identify a potential issue with the application. This piece of information could be programmed to be one parameter (of many) that results in a flag being raised in FIG. 15 deal alerts as something to check by placing it next to the "Check" label 1508. By programming the system to flag this issue in the overall status/progress indicator and alert banner 1320, the underwriter is provided alternative areas to quickly and efficiently identify any potential issues that require attention.

Figure 18G:
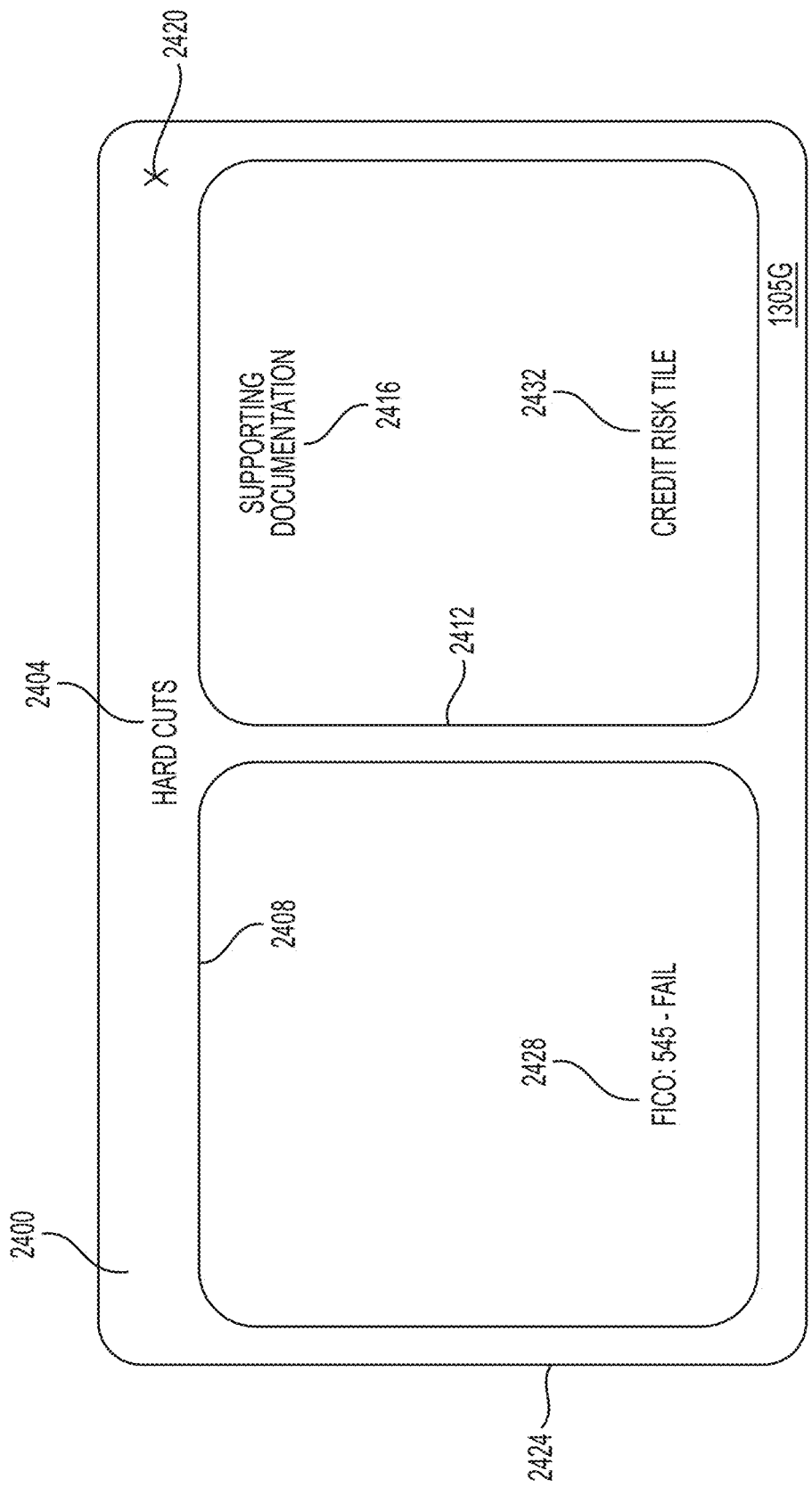
FIG. 18G is a screenshot of an exemplary hard cuts tile.

FIG. 18G is an exemplary Hard Cuts tile 1305G that identifies whether or not the loan application fails any set guidelines or requirements. For example, whether the loan has failed any hard cuts related to FICO score, previous default, arrest record, number of liens, and/or judgements etc. The "Hard Cuts" tile title 2404 is displayed at the top of the tile. The Hard Cuts tile 1305G contains a close tile icon 2420 in the upper right-hand corner, which, when selected by the user, minimizes the tile 1305G and places it, with its tile title 2404, in the loan adjustments and tile control area 1360 as described for other tiles. The tile edge 2424 in the example shown in FIG. 18G could be color coded for example, red to indicate that one or more hard cuts have failed, or it could be green to indicate that all hard cuts have passed.

The hard cuts are pre-programmed parameters that the company or underwriter uses as a minimum (or maximum depending on the particular parameter being considered) to filter out loan applications that no offer should/could be made. For example, the underwriter may, through experience and training, determine that no applicant with a FICO score of less than 600 will be extended a loan offer. If in the data collection process, the system identifies a FICO score of less than 600, such an event would be displayed on the Hard Cuts tile 1305G and the border 2424 would turn red. The field on the left 2408 of the Hard Cuts tile 1305G would list any and all parameters that failed the hard cut test. The field on the right 2412, labelled Supporting Documentation 2416, would list the documents (such as a credit report, Legal Review report, etc.) that identify the failure of the hard cut. Alternatively, the supporting documentation could list the tile that displays the supporting information, and provide a hyperlink for the user to select that will display that tile and information when selected. This allows the underwriter to quickly determine where to look if they want to verify that the hard cut was failed, and there wasn't a discrepancy in data. In the example shown in FIG. 18G, the hard cut tile 1305G indicates that the minimum FICO score has not been met, and thus has failed a hard cut test. The alert "FICO: 545 —FAIL" 2428 on the left half of the tile indicates the applicant's score is 545. If the programmed hard cut was a minimum FICO score of 600, the applicant fails, and that failure is displayed here on the hard cut tile. Corresponding to this hard cut alert is a hyperlink 2432 on the right side of the hard cut tile that identifies where the user can view this supporting information/documentation.

Additional exemplary hard cut parameters that would cause a business to be denied include, but are not limited to: a. In business for less than one year, unless revenue exceeds $100K, b. Less than $25K in verifiable revenue, c. Business financial delinquencies greater than $200 in the prior three months, d. More than five new financial accounts in three months, e. More than six business financial inquiries in three months, f. Lien that has not been paid off, or on a payment plan (but tax liens where the business is properly executing against a payment plan are eligible for approval), g. Business debt exceeding 80% of business revenue, h. In bankruptcy proceedings but not dispositioned, i. Bankruptcy dismissed within the past three years, and j. Bankruptcy discharged within the past year. Similarly, additional hard cut parameters that relate to a principal guarantor that would cause a business to be denied include, but are not limited to: a. Current, non-medical financial trade collections greater than $200, b. Medical collections greater than $1,000, c. Current delinquency on an account in an amount $200 or more, d. Outstanding judgment greater than $1,000 that was filed within past five years, e. Outstanding tax lien (either federal or state) that is not on a payment plan, f FICO score less than 640, g. Bankruptcy within past three years, h. Greater than six credit inquiries in the past six months, i. Previously charged off on a prior account of this lender/broker, j. Personal debt payment-to-income ratio greater than 50%, including mortgage, k. Less than $25K in income (can be joint), l. Lien that has not been paid off, or on a payment plan (but tax liens where the business is properly executing against a payment plan are eligible for approval), and m. Less than 36 months of credit history or less than three trades.

Figure 18H:
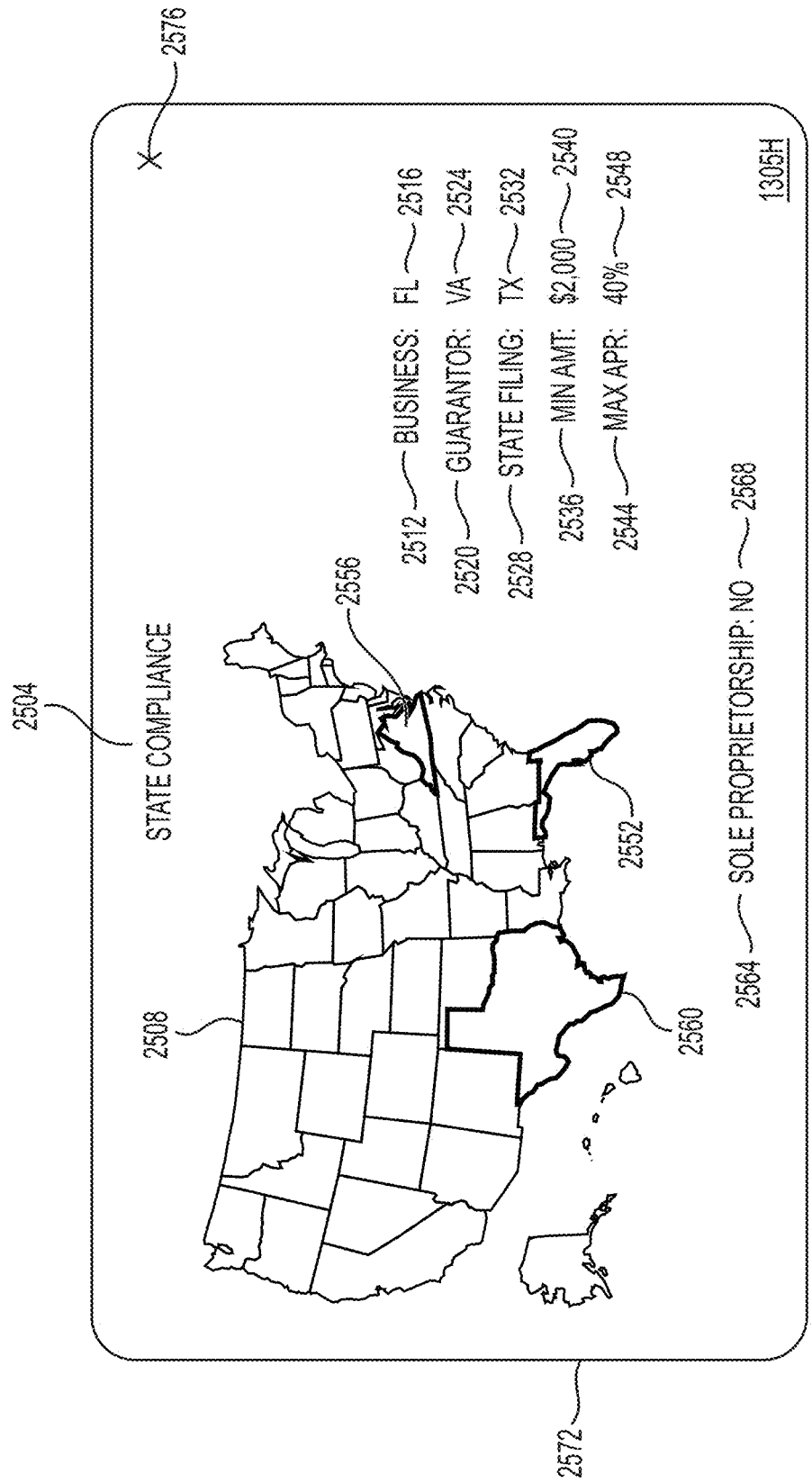
FIG. 18H is a screenshot of an exemplary state compliance tile.

FIG. 18H is an exemplary State Compliance tile 1305H that shows the Business address, borrower address and business state filings are located as well as the Minimum amount to be lent and the Maximum interest rate based on state level usury caps. The "State Compliance" tile title 2504 is displayed at the top of the tile 1305H. The State Compliance tile 1305H contains a close tile icon 2212 in the upper right-hand corner, which, when selected by the user, minimizes the tile 1305H and places it, with its tile title 2504, in the loan adjustments and tile control area 1360 as described for other tiles. The tile edge 2572 in the example shown in FIG. 18H can be color coded, for example, green to indicate that there are no state compliance issues based on the information provided by the applicant when compared with the location of the business, guarantor, filing state, etc., or it could be red to indicate that a state compliance issue was identified that requires the underwriter's attention for resolution.

In the embodiment shown, a map of the United States 2508 is shown on the State Compliance tile 1305H to provide the underwriter a quick glance look at which states the applicant/loan application has a relationship with. In the example shown, the applicant's business is in Florida and the Guarantor is located in Virginia. The business files taxes in Texas. This is determined by looking at the fields on the right side of the State Compliance tile 1305H. A field labeled "Business" 2512 is a static field. To the right of the "Business" field 2512 is the state that the applicant identified as the location of the business (in this example, FL 2516). Another field labeled "Guarantor" 2520 is a static field, and located below the "Business" field 2512. To the right of the "Guarantor" field 2520 is the state the applicant identified as the location of the guarantor (in this example, VA 2524). Another field labeled "State Filing" 2528 is a static field, and is located below the "Guarantor" field 2520. To the right of the "State Filing" field 2528 is the state the applicant identified as a location where the business files taxes (in this example, TX 2532. In addition to the states being identified on the right side of the State Compliance tile 1305H, the corresponding states are highlighted on the United States Map 2508. In the example shown, the States highlighted are Florida 2552, Virginia 2556, and Texas 2560. The highlighting may be done in any color, with the colors either meaning nothing, or having a pre-programmed meaning. For example, the state with the principle place of business may be coded to be yellow, the state of the guarantor may be coded to be blue, and the state where taxes are filed may be coded to be red. Additionally, the states identified on the right side of the tile 2516, 2524, 2532 may be the same color as the corresponding state highlighted on the United States Map 2508.

Another field labeled "Min Amt" 2536 is a static field, and is located below the "State Filing" field 2528. To the right of the "Min Amt" field 2536 is the minimum amount of a loan that may be made by a lending institution in any of the states identified in the Business 2512, Guarantor 2520, or State Filing 2528 fields (in this example FL 2516, VA 2524, and TX 2532). Based on the state compliance parameters that are programmed into the system, the highest minimum amount of these three states in this example would be $2,000 2540, which is shown to the right of the "Min Amt" field 2536.

Another field labeled "Max APR" 2544 is a static field, and is located below the "Min Amt" field 2536. To the right of the "Max APR" field 2544 is the maximum annual percentage rate that a lending institution may charge in any of the states identified in the Business 2512, Guarantor 2520, or State Filing 2528 fields (in this example FL 2516, VA 2524, and TX 2532). Based on the state compliance parameters that are programmed into the system, the highest minimum amount of these three states in this example would be 40% 2548, which is shown to the right of the "Max APR" field 2544.

Another field labeled "Sole Proprietorship" 2564 is a static field, and is located centered at the bottom of the State Compliance tile 1305H. To the right of the "Sole Proprietorship" field 2564 indicates whether or not the applicant's business is a sole proprietorship based on the applicant's loan application. This field 2568 will display either a "Yes" or a "No." The Minimum Amount 2540 and Maximum APR 2548 may be affected by whether or not an applicant is a sole proprietorship 2568 based on compliance regulations in the states identified in 2516, 2524, and 2532.

For State compliance, generally all states that may be involved are identified. To be cautious, in some embodiments, for each type of rule, the most restrictive rule from any of the involved states is used as the guideline. For example, the minimum amount of the loan is taken from the involved state that has the highest number. Similarly, the maximum APR is taken from the lowest number of any one of the involved states. The data for each state's compliance requirements is generated by the company and stored within the database. When a loan application is submitted, the system compares the state of the application to the corresponding state in the database to identify the compliance requirements for that state. The tile graphically displays this information and is color coded according to the programming for the tile, for example, red if there is a state compliance problem or issue.

Figure 18I:
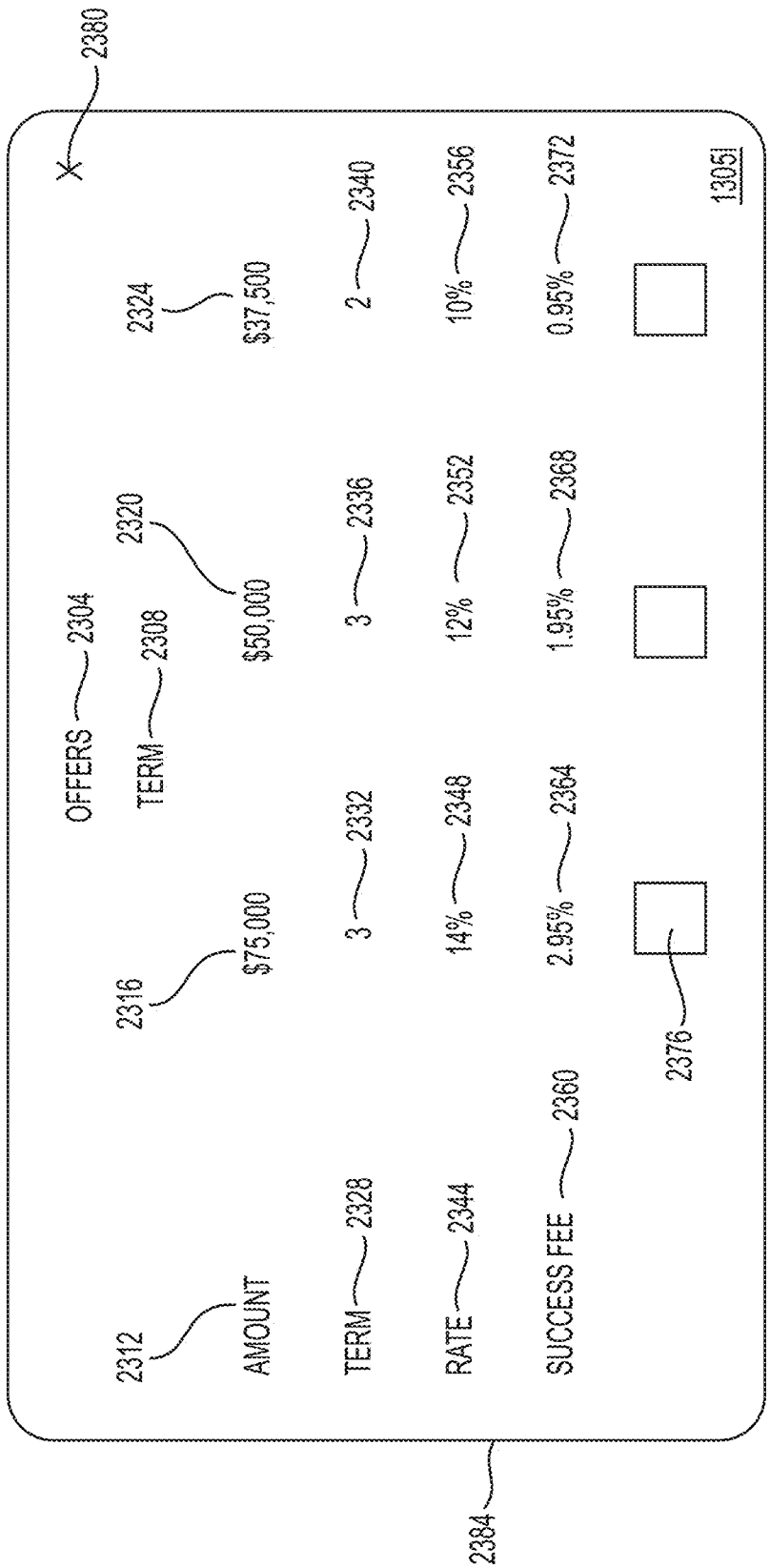
FIG. 18I is a screenshot of an exemplary offers tile.

FIG. 18I is an exemplary offers tile 1305I. Loan offers to borrowers are preferably generated in an automated fashion using an optimization method that determines a maximum loan amount that can be offered to a potential borrower. However, in some examples, offers are based on product selected by Underwriter and pricing based on the risk assessments described herein. In general, every input into the system affects or can be used for calculation of offers, but offers also are subject to state compliance rules. The process of producing an offer is described below with reference to FIG. 26, and the remainder of the discussion of tile 1305I assumes that the system has automatically calculated one or more offers for the potential borrower.

The tile title Offers 2304 is displayed at the top of the tile. The offers tile 2300 contains a close tile icon 2212 in the upper right-hand corner, which, when selected by the user, minimizes the tile 1305I and places it, with its tile title 2304, in the loan adjustments and tile control area 1360 as described for other tiles. The tile edge 2384 in the example shown in FIG. 18I could be color coded, for example red to indicate that no loan offer has yet been made to the applicant, or it could be green to indicate that an offer was accepted. The offer tile 2300 contains several items in a table format that are useful to the underwriter in visually seeing loan options available for the applicant. The "Amount" 2312 represents the loan amounts of separate loan options. In the example shown, three separate loan options are displayed for the underwriter to choose from, in the amounts of $75,000 (2316), $50,000 (2320), and $37,500 (2324). As can be seen, the system generates a first offer (e.g., $75,000) for a maximum amount of money that a borrower is authorized to borrow under the risk thresholds established by the underwriter. As additional offers, the system is also configured to provide an offer at approximate 75% of the maximum amount (potentially rounded to a next lower "rounded" dollar amount) and an offer at approximate 50% of the maximum amount (potentially rounded to a next lower "rounded" dollar amount).

"Term" 2328 is listed in the next row down, indicating the loan term length associated with the loan amounts listed immediately above the term values 2332, 2336, 2340. In the example, for the $75,000 loan 2316, a loan term of 3 years 2332 is available. For the $50,000 loan 2320, a loan term of 3 years 2336 is available. For the $37,500 loan 2324, a loan term of 2 years 2340 is available. Term length can vary greatly from borrower to borrower and offer to offer.

"Rate" 2344 is listed in the next row down, indicating the interest rate that would be offered with the loan amounts listed above. In the example, for the $75,000 loan 2316, an interest rate of 14% 2348 is available. For the $50,000 loan 2320, an interest rate of 12% 2352 is available. For the $37,500 loan 2324, an interest rate of 10% 2356 is available. Interest rate can vary greatly from borrower to borrower, offer to offer and based on loan amount and other loan terms.

"Success Fee" 2360 is listed in the next row down, indicating a fee (represented as percentage of the loan value) that would be added to the cost of the loan based on each respective loan amount listed above for providing the loan. In the example, for the $75,000 loan 2316, a success fee of 2.95% (2364) would be added. For the $50,000 loan 2320, a success fee of 1.95% (2368) would be added. For the $37,500 loan 2324, a success fee of 0.95% (2372) would be added. These fees may be amortized over the life of the loan, or the borrower can pay down the success fees at any time.

Empty boxes 2376 are located below each loan amount column. When a loan offer is extended to an applicant, normally a range of offers is presented. The dollar amounts 2316, 2320, 2324 and corresponding interest rates 2364, 2368, 2372 are offered as a choice for the applicant to select in their offer letter. When the applicant selects the loan they want to accept, the empty box 2376 below that loan amount and corresponding interest rate becomes filled in, checked off, or any other method of indicating that the option has been selected. This allows the underwriter to visually see what loan offer the applicant has accepted.

Figure 18J:
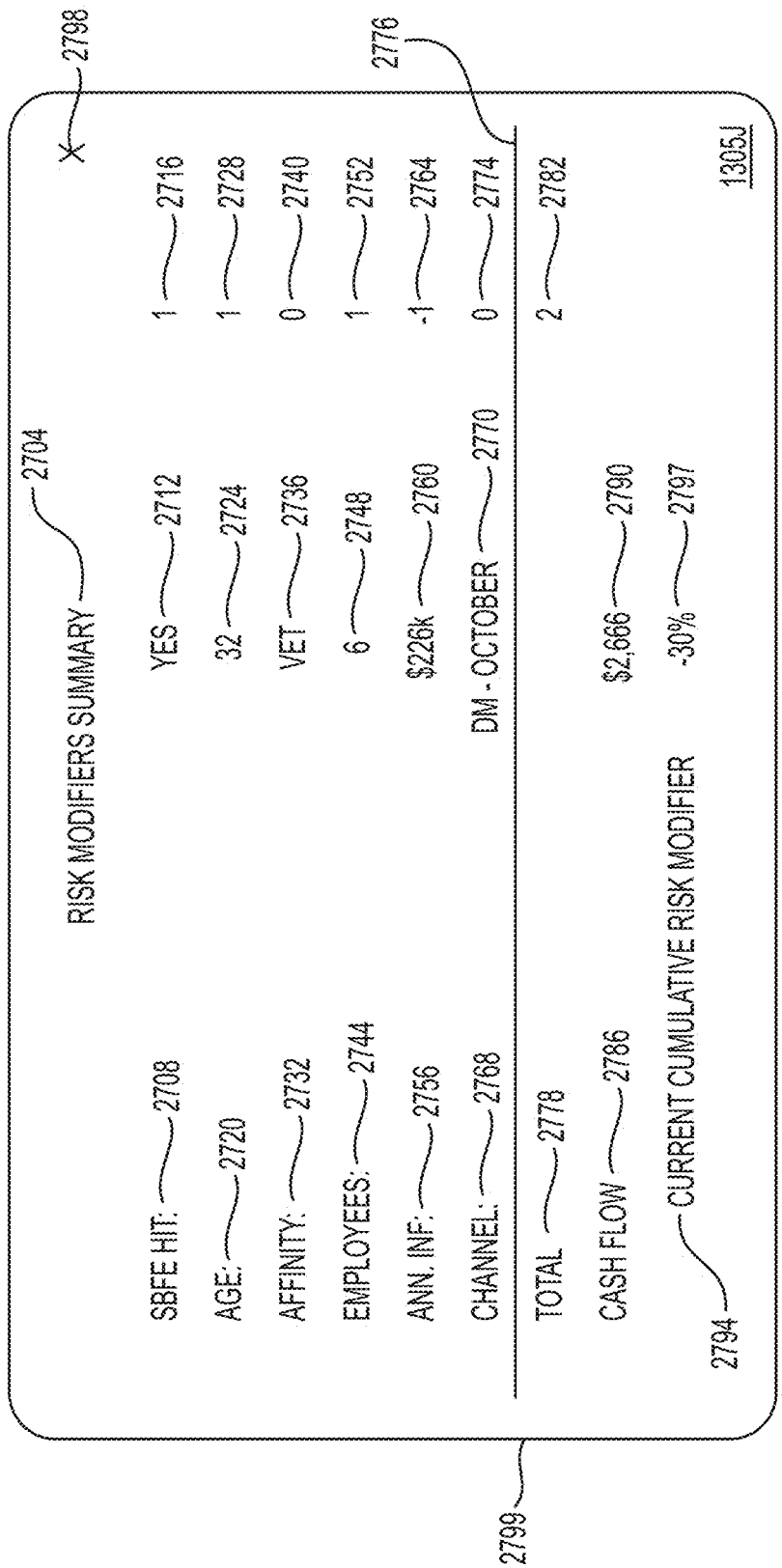
FIG. 18J is a screenshot of an exemplary risk modifier tile.

FIG. 18J is an exemplary Risk Modifiers Summary tile 1305J that shows whether or not any risk modifiers are present that would cause the risk of the deal (and therefore the APR) to be raised or lowered. The "Risk Modifiers" tile title 2704 is displayed at the top of the tile. The Risk Modifiers Summary tile 1305J contains a close tile icon 2798 in the upper right-hand corner, which, when selected by the user, minimizes the tile 1305J and places it, with its tile title 2704, in the loan adjustments and tile control area 1360 as described for other tiles. The tile edge 2799 may be color coded. For example the tile edge may be gray, which may represent a tile that is for informational purposes only; in this case the Risk Modifiers Summary tile 1305J displays only information that is entered by the applicant, and therefore does not require system verification of the status of the data collection. Alternatively, the tile edge 2799 may be programmed to turn green once all information has been verified by the underwriter, and may be programmed to remain red until all information has been entered into the system by the applicant.

In the example shown, the information fields displayed on the Risk Modifiers Summary tile 1305J are presented to the underwriter in tabular form with three columns. Various of methods of presenting the Risk Modifier data are possible such as by chart. The far-left column consists of static fields labeled "SBFE Hit" 2708, "Age" 2720, "Affinity" 2732, "Employees" 2744, "Ann. Inf" 2756, "Channel" 2768, "TOTAL" 2778, and "CASH FLOW" 2786. The middle column contains information collected by the system correlating to the static field immediately to the left of the data in the center column. For example, the "SBFE HIT" 2708, which identifies if any hits were returned by the system on a check of the Small Business Financial Exchange (SBFE), displays a value of "Yes" 2712, indicating that a hit on the SBFE was identified by the system. The column all the way to the right displays either a "1", "0", or "−1" which is a score based on the result of the middle column. The scores from the far right column above the summation line 2776 are added together to provide a "TOTAL" score (2778). In the same example, because the "SBFE HIT" 2708 has a value of "Yes" 2712, the score in the right column is "1" 2716 (and would have been 0 if the response was "No"). The second illustrated factor is "Age" 2720, which represents the business's age. The value in the center column for the "Age" 2720 is "3" which corresponds to a score in the right column of "1". The score in the right column for the "Age" 2720 is based on the pre-programmed scores for age ranges that is set by the underwriter or the company based on the risk of different ages. For example, any business that has existed for 3 or more years gets a score of 1, any business that has existed for more than 2 years but less than 3 years gets a score of 0, and any business that has existed less than two years gets a score of −1. In general, when scoring the various characteristics, 1 represents a positive factor, 0 represents a neutral factor, and −1 represents a negative factor.

The next row, "Affinity" 2732 relates to the veteran status, college alumni, law enforcement, first responder, women-owned business, geographic factors, or other affinity groups. Such group affinities may be set based on the company's preferences for risk tolerance and lending histories. In the example, the middle column shows "None" 2736 which corresponds to a score of "0" (2740). If a favorable affinity group were named in the loan application, the corresponding score would be "1".

The next row, "Employees" 2744 identifies how many employees the business applicant has. In the example, the middle column shows that there are "6" employees 2748 based on the information provided by the applicant and verified by the system, which returns a value of "1" 2752 in the far right column. As an example, an applicant with one employee may return a value of −1, an applicant with two to four employees may return a value of 0, and an applicant with five or more employees may return a value of 1. The number of employees in each band can be modified as employment conditions change.

The next row, "Ann. Inf" 2756 relates to the annual inflow of revenue for the applicant. In the example, the middle column shows that the annual inflow is "$226K" 2760, which returns a value in the far right column of "−1" 2764. The underwriter or company may create value ranges within the system that correlate to scores of −1 (<$250,000), 0 (>=$250,000 and <$500,000), and 1 (>=$500,000) based on experience, industry standards, or any other method.

The next and final row above the summation line 2776, is "Channel" 2768, which relates to the method that the applicant was referred to the company. In the example, the middle column shows that the applicant was reached by "DM—October" 2770 indicating that a company direct mailing in October of the preceding year was used. The corresponding value in the far right column for the "DM—October" 2770 is "0" 2774 indicating that it is a neutral channel. The lending company can set these values in the database based on the company's own lending preferences. For example, certain internet funnels that have a negative repayment history could be given a value of −1; while other channels could be given a value of 0.

The summation line 2776 separates the categories and values above the line, with the total below the line. In this example, the "TOTAL" 2778 is calculated as "2" 2782 as a function of taking the sum of all the far right column values above the summation line 2776. (1+1+0+1+(−1)+0=2). If the sum of the factors is at least 2, the system can provide an automatic reduction of 10% (additively) into an overall "Risk modifier" (as explained in greater detail below) to indicate a further reduction in the risk of defaulting on the loan. For example, if a risk modifier was previously 90% due to other factors, an additional 10% (additive) reduction would give an updated risk modifier of 80%.

Below the "TOTAL" static field 2778 is displayed a "CASH FLOW" static field 2786. To the right of the "CASH FLOW" static field 2786 is the net cashflow value that the system verified for the applicant. In this example, that net cashflow value is "$2,666" 2790 per month. Like the other risk factors of FIG. 18J, net cashflow can add to (or subtract from) an overall risk modifier for the application. If net cashflow is at least $1000, the system can provide an automatic reduction of 10% to the risk modifier (e.g., lowering the risk modifier from 90% to 80% or from 100% to 90%). Alternatively, if net cashflow is less than −$1000 (negative $1000), then the risk modifier may be increased by 10% (additively) (e.g., from 90% to 100% or from 80% to 90%). Net cashflows of greater than −$1000 and less than $1000 preferably provide no change in the risk modifier. The current cumulative risk modifier label 2794 is displayed next to its corresponding values from the above factors (and other factors described below). As illustrated, the current cumulative risk modifier indicates a total risk reduction of 30% (20% of which comes from the score of "2" on the illustrated risk modifiers and the net cash flow value).

Figure 18K:
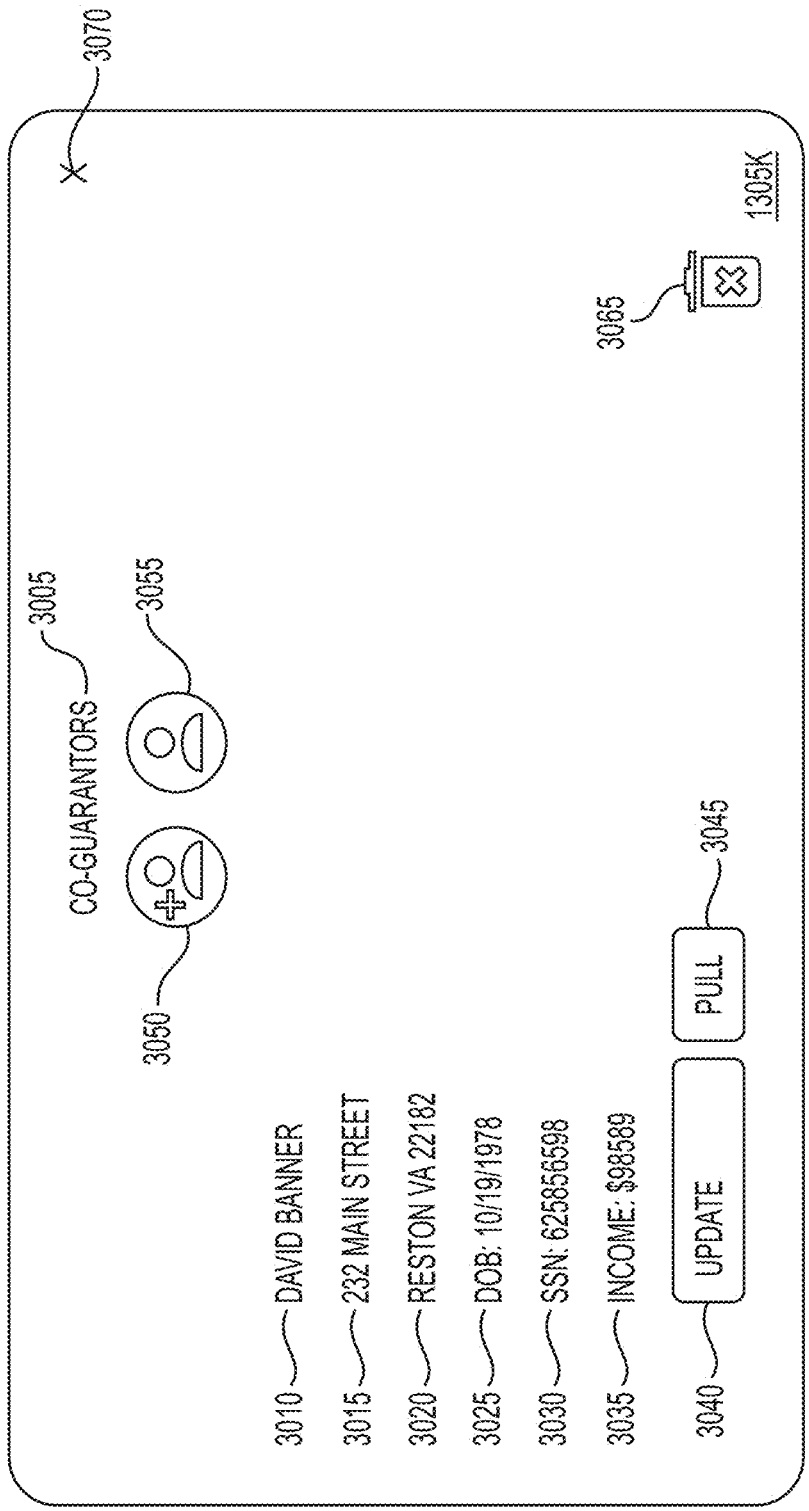
FIG. 18K is a screenshot of an exemplary co-guarantor tile.

FIG. 18K is an exemplary Co-Guarantor tile 1305K. An underwriter or an applicant can add multiple co-guarantors to a loan application; e.g. when the business has multiple owners, etc. The Co-Guarantor tile 1305K contains a "close tile" icon 3070 as discussed above with respect to FIG. 18A. If multiple co-guarantors are attached to the loan application, the person icon 3055 will be highlighted in a color (such as green). If only one (or none) co-guarantor is assigned to the loan application, the person icon 3055 will remain "greyed out" such that the underwriter will know that nothing will happen if they select the person icon 3055. If there are multiple guarantors, the underwriter/user may view information for the next co-guarantor by selecting the person icon 3055.

Information included on the Co-Guarantor tile 1305K includes the name of the co-guarantor 3010 (in the example shown, "David Banner"), street address 3015 (in the example shown, "Reston Va. 22182"), "DOB" 3025 which means Date of Birth (in the example shown, "Oct./19/ 1978"), "SSN" 3030 which means social security number (in the example shown, "987-65-4320"), and "Income" 3035 of the guarantor (in the example shown, "$98589").

A trash can icon 3065 is located at the bottom right of the Co-Guarantor tile 1305K. The trash can icon 3065 allows the underwriter/user to delete a co-guarantor, for instance, if the co-guarantor is no longer a part of the application. If the underwriter/user wants to update the information on file for the co-guarantor, the underwriter/user selects the "update" box 3040 located on the bottom of the Co-Guarantor tile 1305K. Doing so allows the underwriter/user to update any of the non-static fields on the tile. Alternatively, the underwriter/user may select the "pull" box 3045, whereby the system will automatically pull the information from the application to fill the non-static fields on the Co-Guarantor tile 1305K.

FIG. 18O is an exemplary comment box the underwriter may utilize to enter the data related to the Fraud Check Tile 1305C. Such comment boxes may be available for any tile, and allow the underwriter or user to enter data that is saved into the database for that loan application. In FIG. 18O, fields are shown for Fraud Check 2960, Performer 2964, Number 2968, and Date 2972. The Fraud Check 2962 pull-down allows the user to select such status as "Pass," "Fail," "Need further data," etc. The Performer 2964 field displays the user who performed the fraud check, and may be entered manually or the system may be programmed to automatically populate this field based on who is logged in when the fraud check comment block is saved. In the example, the comment was entered by user "mgrover." 2966. The Number field 2968 represents the phone number 2970 the user called to perform the fraud check; for example, the phone number listed on the loan application. The date field 2972 represents the date the call was placed or the fraud check comment block was saved. In the example, the date and time 2974 are shown. This may be displayed in any date and/or time configuration programmed into the system for display. The comment block contains a "Save" button 2976. The user clicks on this when the data is entered, and the system saves the information to the database. When the user is done with the comment block, they click the "X" button 2980 to close the comment box. The information saved by the user will now show up when the Fraud Check Tile 1305C is viewed again.

Figure 18L:
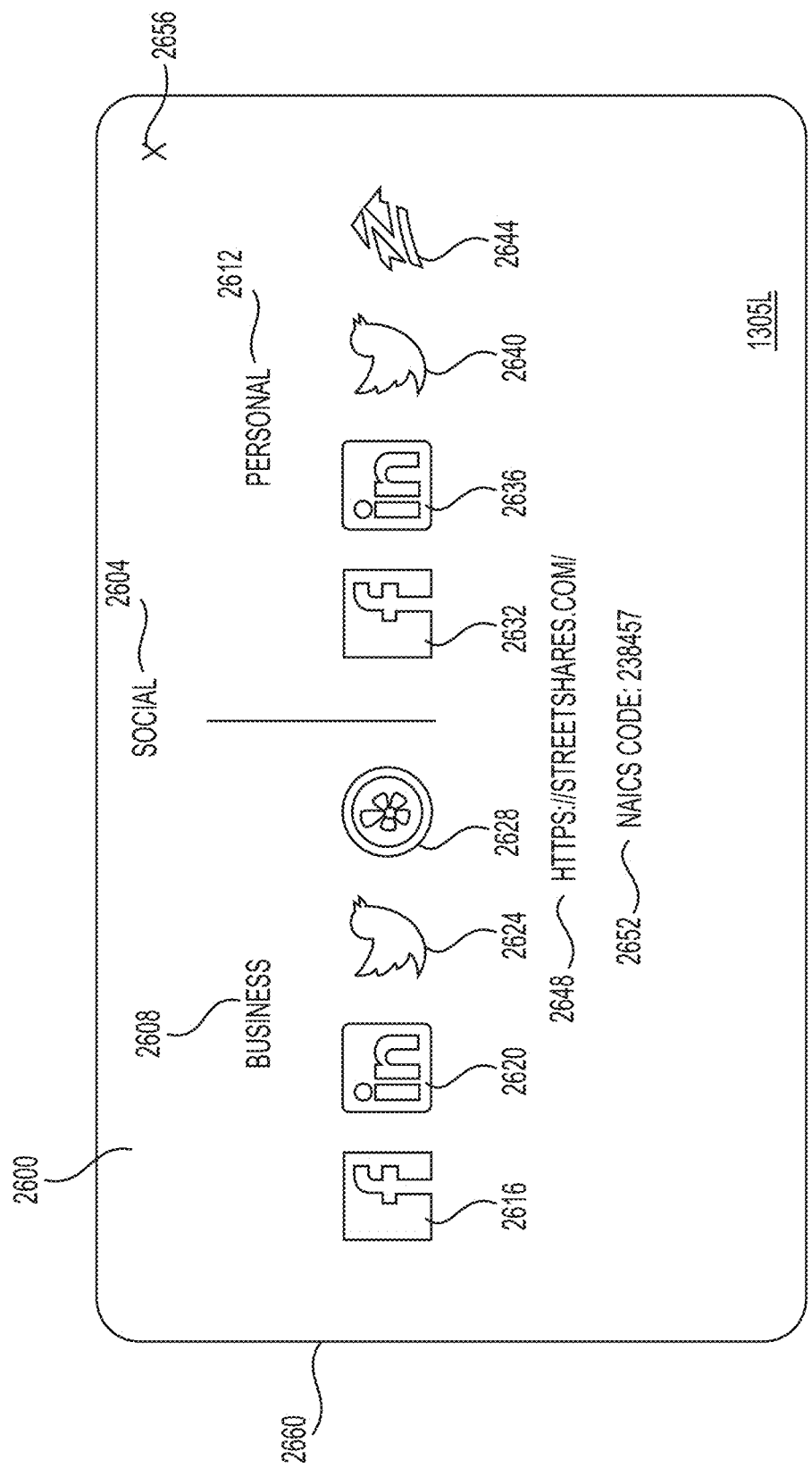
FIG. 18L is a screenshot of an exemplary social media tile.

FIG. 18L is an exemplary Social Media tile 1305L. The "Social Media" tile title 2604 is displayed at the top of the tile. The Social Media tile 1305L contains a close tile icon 2656 in the upper right-hand corner, which, when selected by the user, minimizes the tile 1305L and places it, with its tile title 2604, in the loan adjustments and tile control area 1360 as described for other tiles. The tile edge 2660 in the example shown in FIG. 18L can be color coded, and for example, could be green to indicate that social media sites were found to contain information corresponding to the applicant, or it could be red to indicate that no social media information could be located.

The system pulls in social accounts for both business and personal to allow the underwriter to perform and verify fraud checks. Such social media accounts checked for businesses 2608 may include, but are not limited to, Facebook 2616, LinkedIn 2620, Twitter 2624, and Yelp 2628. Such social media accounts checked for persons 2612 may include, but are not limited to, Facebook 2632, LinkedIn 2636, Twitter 2640, and Zillow 2644. The applicant's business website 2648 may also be listed to allow the underwriter to verify the business is what the application says it is. Such a verification may be useful to the underwriter as a fraud check. The business website 2648 is hyperlinked so when the underwriter clicks on it, the webpage associated to the business opens.

Additionally, NAICS code 2652 of the business is shown. The NAICS code provides an idea to the underwriter on the type of industry the business operates in. Alternatively, an underwriting company may decide to establish a policy that restricts lending to certain NAICS codes based on risk tolerance, state compliance regulations, etc. The NAICS code would alert an underwriter in these cases of potential lending issues. The NAICS code display 2652 could be programmed to display as green if there are no policy issues, or red if there are policy issues.

Each of these icons may be active allowing a user to select and obtain more information about the loan applicant from the raw data associated with the icon. Also, if disreputable, negative information and/or inconsistent information is found on social media, the underwriter may ask more questions to the borrower.

Figure 18M:
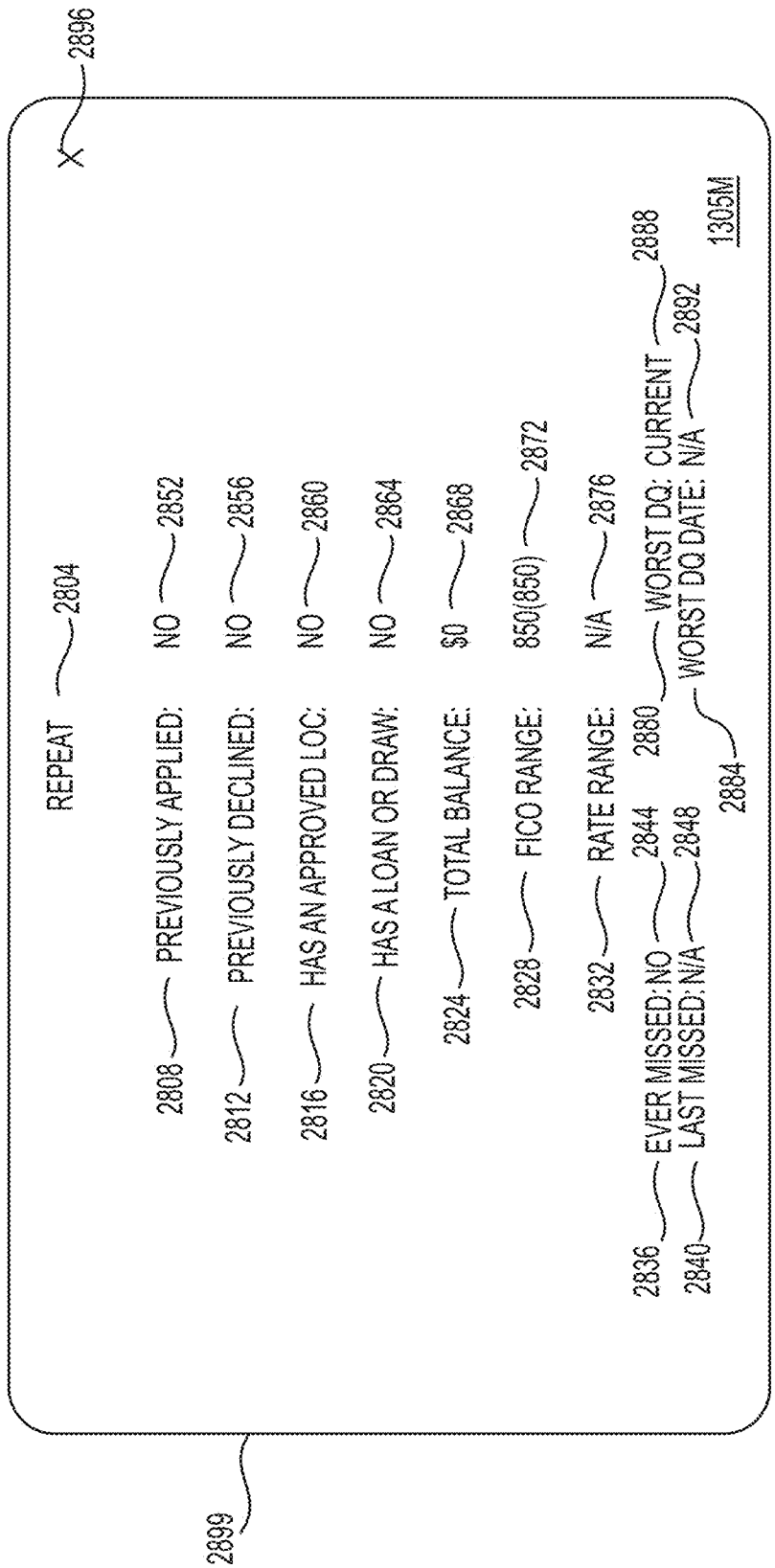
FIG. 18M is a screenshot of an exemplary repeat tile.

FIG. 18M is an exemplary Repeat tile 1305M, which calculates and shows underwriter if someone recently applied for a loan (even if with another account) and status of application or loan. The "Repeat" tile title 2804 is displayed at the top of the tile. The Repeat tile 1305M contains a "close tile" icon 2896 as discussed above with respect to FIG. 18A. The Repeat tile 1305M consists of a series of information with a static field on the left, and the applicant data displayed to the right of the static field, the two fields separated by a colon. The static fields displayed include: "Previously applied" 2808 (with a value in the example of "No" 2852); "Previously declined" 2812 (with a value in the example of "No" 2856); "Has an approved LOC" where LOC means Line of Credit (with a value in the example of "No" 2860); "Has a Loan or Draw" 2820 (with a value in the example of "No" 2864); "Total Balance" 2824 (with a value in the example of "$0" 2868); "FICO range" 2828 (with a value in the example of "850 (850)" 2872); "Rate range" 2832 (with a value in the example of "N/A" 2876); "Ever missed" 2836 (with a value in the example of "No" 2844); "Last Missed" 2840 (with a value in the example of "N/A" 2848); "Worst DQ" 2880 where DQ means delinquency (with a value in the example of "current" 2888); and "Worst DQ date" 2884 (with a value in the example of "N/A" 2892).

The tile edge 2899 may be programmed to turn red if, for example, there was any negative data regarding repeat loans for the applicant. Otherwise, the tile edge 2899 may be programmed to turn green or other positive indicating color.

In addition, to the tiles shown or described above, other tiles may be added or created by the user/programmer. Some examples of additional tiles might include:
(1) a Financial Statement Analysis Tile (this will include balance sheet, income statement, statement of CFs etc.), (2) a Standard Financial Ratios tile displaying automatically calculated ratios (e.g., quick ratios, current ratios), and (3) other Fraud detection tiles (IP addresses, geo location etc.).

Figure 19A:
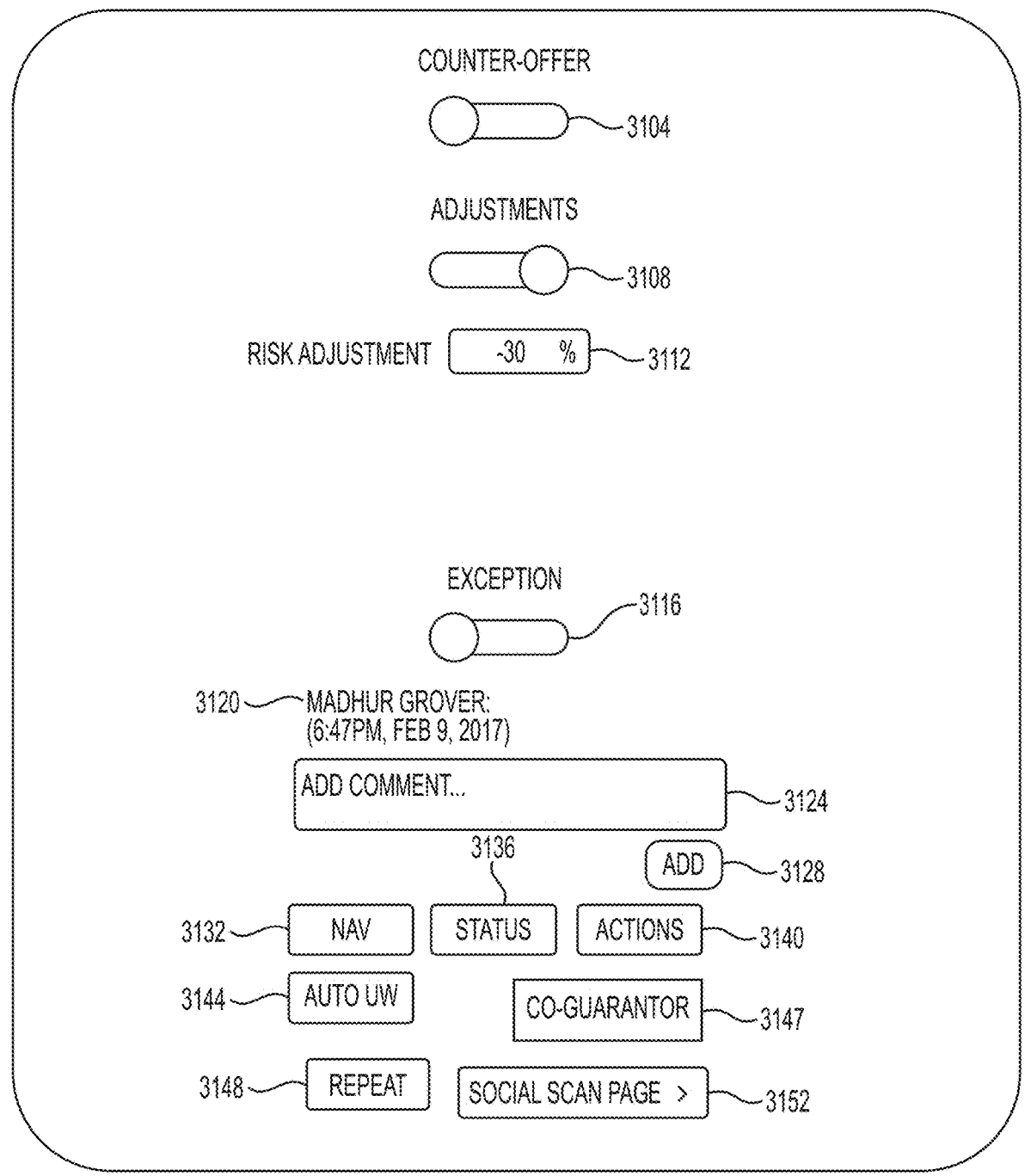
FIG. 19A is a screenshot of an exemplary underwriter control panel (UCP) (as could be used in in FIG. 13).

FIG. 19A shows an enlarged view of underwriter's control sub-panel 1360 which is part of the underwriter's screen 1300 shown in FIG. 13. This sub-panel allows (1) for manual adjustments (using Adjustments Sliding Control 3108) in a slidable fashion and (2) adjustments for exceptions (using Exception Sliding Control 3116) along with auditable comments 3124. Additional navigation is available (using "NAV" button 3132), and hidden tiles are represented by smaller tiles with the tile title shown, allowing the underwriter to select any tile they wish to display. When tiles are minimized using the "X" icons located at the top right of each tile, an icon displaying only the tile title is shown at the bottom portion of the Underwriter control panel. For example, a co-guarantor tile 3147 is available to add additional co-guarantors which will have Equifax information pulled onto the tile 3147.

The Counter-Offer sliding control 3104 allows the underwriter to manually (by moving/sliding the slider to the right) change the offer values by indicating that a "counter-offer" should be made to the system's default offer. When the underwriter moves the Counter-Offer sliding control 3104 to the right, the counter offer automatically decreases the current cumulative risk modifier by 20% (e.g., from 100% to 80% or from 90% to 70%). This change in the current cumulative risk modifier causes the risk analyses to be re-run based on the new calculated risk of the application as described in greater detail with respect to FIGS. 21A and 25. As with any other changes to the risk calculations herein, this also causes the corresponding tiles (and details pages) in various portions of the dashboard 1300 to be updated (in real-time) as well, such as by updating the Offers and Risk modifiers. If the underwriter moves the Counter-Offer sliding control 3104 to the left (thereby canceling the counter offer), the counter offer automatically increases the current cumulative risk modifier by 20%, and the maximum loan amounts, offers and risks are recalculated.

Similarly, the Adjustments sliding control 3108 allows the underwriter to manually (by moving the sider to the right) enable the use of a risk adjustment value 3112, which in the example is shown to be −30%. Adjustment values may be set by the lending company; for example, 5% increments may be programmed. By sliding the Adjustments sliding control 3108 to the left, the risk adjustment value 3112 is reset to zero, and the risk adjustment value is no longer factored into the current cumulative risk modifier. In an alternate embodiment, the Adjustments sliding control 3108 can be used as a relative slider so that data need not be entered into the textbox (or up/down control) for the risk adjustment value 3112 to set the risk adjustment value 3112. Instead, the Adjustments sliding control 3108 is initially placed half way between the left and right extremes and any movements of the Adjustments sliding control 3108 right cause an increase in the risk adjustment value 3112 while any movements of the Adjustments sliding control 3108 left cause a decrease in the risk adjustment value 3112. This change in the risk adjustment value 3112 causes a change in current cumulative risk modifier which causes the risk analyses to be re-run based on the new calculated risk of the application as described in greater detail with respect to FIGS. 21A and 25. As with any other changes to the risk calculations herein, this also causes the corresponding tiles (and details pages) in various portions of the dashboard 1300 to be updated (in real-time) as well, such as by updating the Offers and Risk modifiers.

In some embodiments, the underwriter is allowed to by-pass certain rules and make an exception to a rule. By doing so, the deal is marked as an exception so that it can be tracked as exception within the database. Tracking all the exceptions may be beneficial for the lending company to do based on the company's policy of numbers or percentages total of loan offers with exceptions. The Exception sliding control 3116 allows the underwriter to manually (by moving the scale to the left or right) set or clear a flag indicating whether the loan application is an exception to the company's standard rules.

Figure 19B:
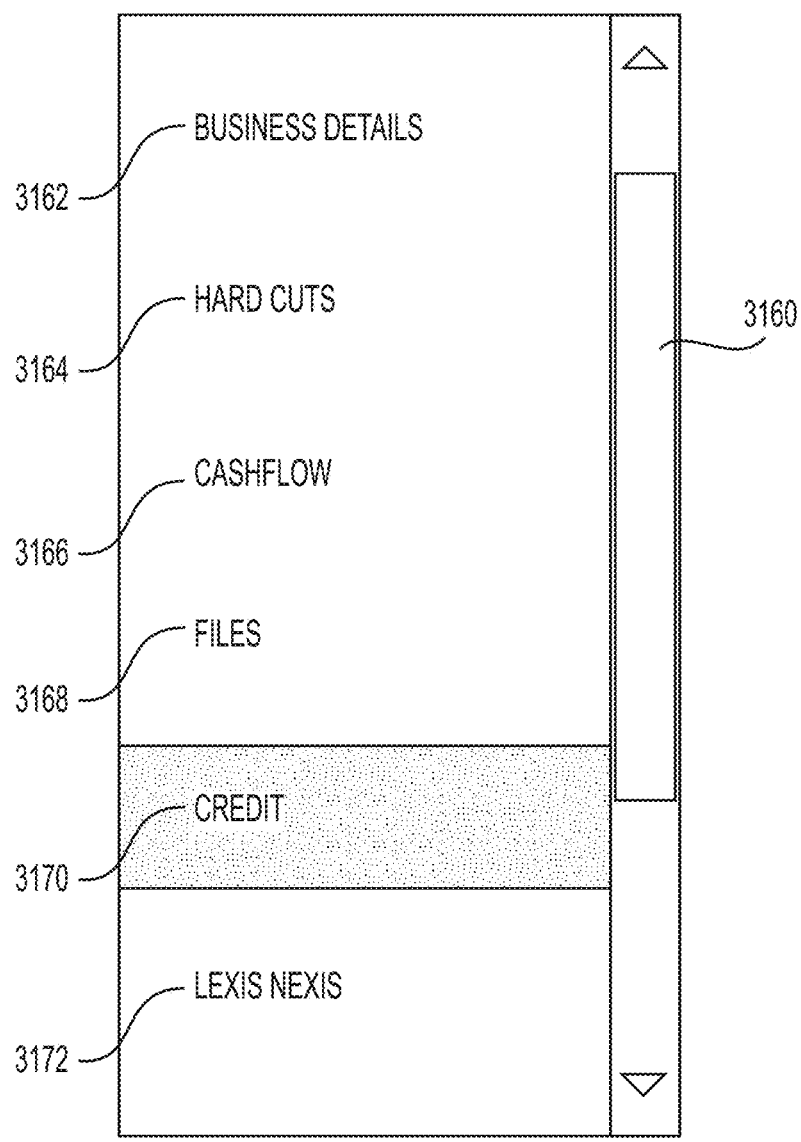
FIG. 19B is a screenshot of a pull-down menu for navigating the underwriter control panel and that is displayed in response to a user selecting the "NAV" button on the UCP of FIG. 19A.

The Underwriter who is logged in is identified 3120, along with the current date and time. The comment box 3124 allows the Underwriter to enter any comments they wish to save regarding the application. Beneath the comment box 3124 are any number of small tiles that, when selected, take the underwriter/user to another screen to interact with that section of the application. The "ADD" tile 3128 allows the underwriter to add additional comments once they have been entered into the comment box 3124. The "NAV" tile 3132 allows the underwriter to quickly access a navigation screen. When the user selects the NAV tile 3132, the view shown in FIG. 19B is displayed. This provides the user a slidebar 3160 menu of all available tiles to select for display on the tile screen. Examples of available tiles are shown as "Business Details" 3162, "Hard Cuts" 3164, "Cashflow" 3166, "Files" 3168, "Credit" 3170, and "Legal Review" 3172. The list of available tiles may include any tiles the system has available for display. The slidebar 3160 shown on the right of the tile names allows the user to scroll up and down to see the available tiles.

The "STATUS" tile 3136 allows the underwriter to quickly access a status screen. When the user selects the STATUS tile 3136, the view shown in FIG. 19C is displayed. This provides the user a menu of available application statuses. Examples of statuses are shown as "Approved" 3176, "Pre-Approved" 3178, and "New" 3180. When the user selects one of the available statuses, the underwriter display shows only those applications with the corresponding selected status.

Figure 19D:
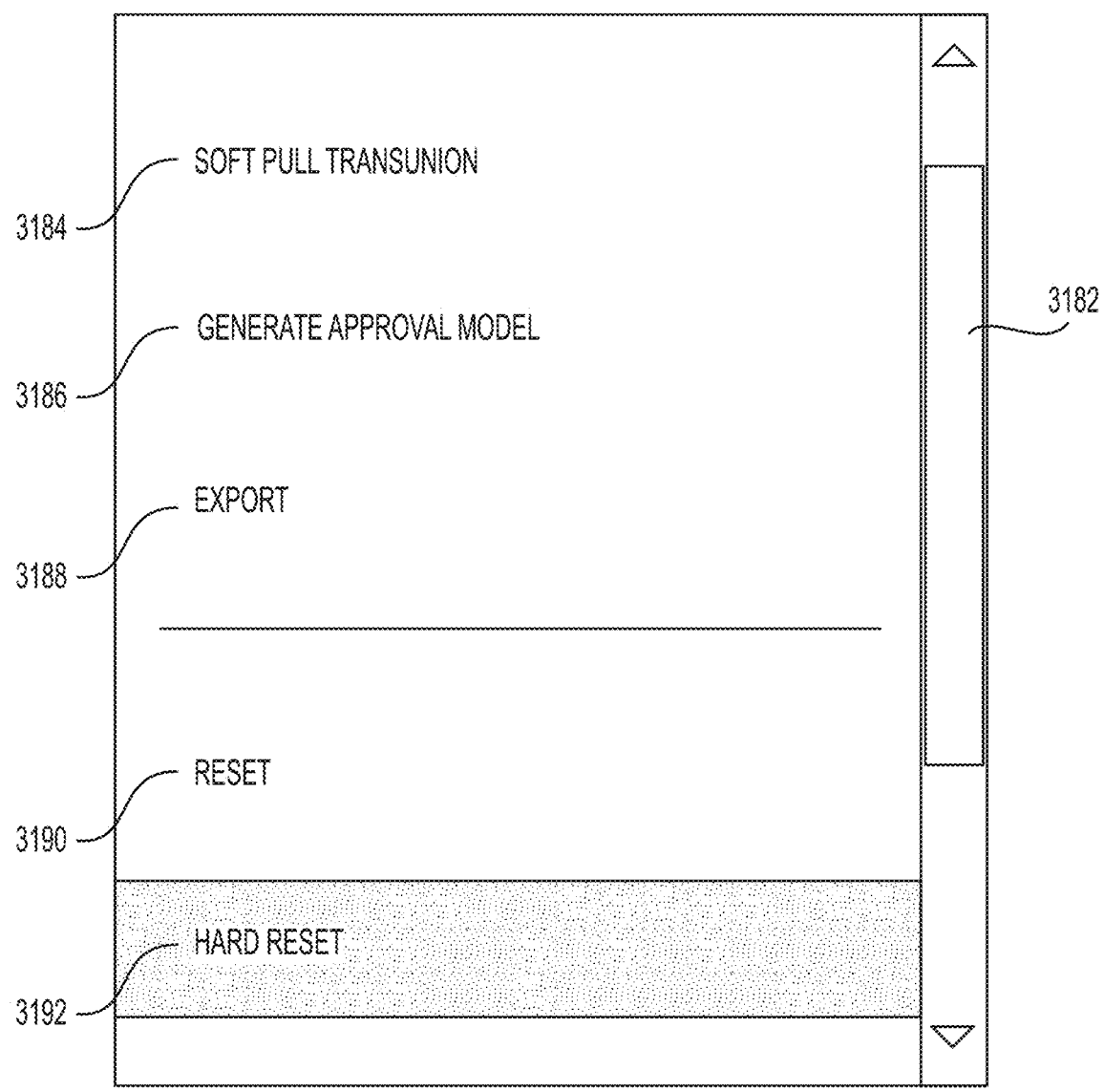
FIG. 19D is a screenshot of a pull-down menu for displaying and selecting available actions for the underwriter to take in the underwriter control panel and that is displayed in response to a user selecting the "Actions" button on the UCP of FIG. 19A.
Figure 20A:
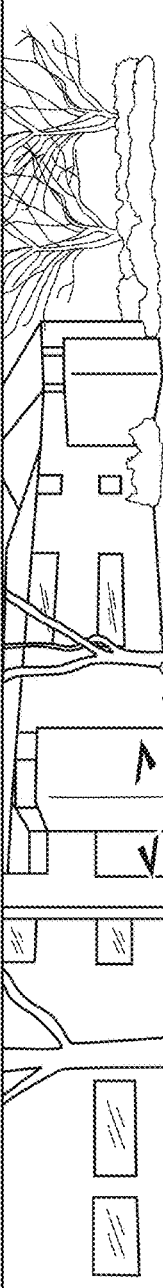
FIGS. 20A and 20B are an exemplary Social Scan page that is displayed in response to a user selecting the "Social Scan" button on the UCP of FIG. 19A.
Figure 20B:
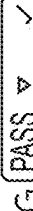

The "ACTIONS" tile 3140 allows the underwriter to quickly access a menu of options within the system. When the user selects the ACTION tile 3140, the view shown in FIG. 19D is displayed. This provides the user a slidebar 3182 menu of all available actions available to the user. Examples of available actions are shown as "Soft Pull Transunion" 3184, "Generate Approval Model" 3186, "Export" 3188, "Reset" 3190, and "Hard Reset" 3192. The list of available tiles may include any tiles the system has available for display. The slidebar 3182 shown on the right of the tile names allows the user to scroll up and down to see the available actions.

program may be set up to identify why the application failed the test, and include such information in the rejection letter.

The "REPEAT" tile 3148, when selected, opens the Repeat Tile (See FIG. 18M) in the tile viewing field. The "SOCIAL SCAN PAGE" title tile 3152 (as shown in FIG. 19A), when selected, takes the underwriter to another screen (e.g., FIGS. 20A and 20B) that displays more detailed results from the social media search. The following is an example of the programming code that initiates the API function to populate the Social Scan Page:

```
function loadStreetView( ) {
    var js = document.createElement("script");
    js.type = "text/javascript";
    js.src =
"https://maps.googleapis.com/maps/api/js?libraries=geometry&key=AIzaSyASJjZo3gE8
WNfXooa0mpXTfbzQDuGjsj8";
    js.onload = function( ) {
        getGeocodingBusiness( );
        getGeocodingPersonal( );
    }
    document.body.appendChild(js);
}
```

The "AUTO UW" tile 3144 allows the underwriter to update all information in the system regarding the application. When the "AUTO UW" tile 3144 is selected, the program runs a programmed script to search for any new data and auto populates the appropriate fields in the database. Because the tiles display the data contained in the database fields, anytime the user views a tile, the most up-to-date information is always displayed. Further, the system can be programmed to automatically make the underwriting decisions and approve for certain offers based on the lending company's preferences. The scoring and twentiles described may be used in the automatic loan approval process. In some embodiments, a decision tree or formula is used by the system to make an automatic loan approval decision. Such a decision tree would include all hard cuts, twentile rankings, offers corresponding to twentile and risk analysis. For example, the auto underwriting program would run a script that would ask if the first hard cut was met (first hard cut could be a minimum FICO score, for example). The program will compare the value in the database for this field and compare it to the hard cut value. If the hard cut has not been met, then the script directs the program to reject the application, update all appropriate fields, and issue a rejection letter to the applicant. Such a rejection letter can be pro-forma and programmed as a document in the system. The letter could be issued electronically or by mail, as the company prefers. If the comparison of the value passes the first hard cut value, the program's decision tree would progress to the next hard cut value comparison, and continue in this manner until all hard cuts have been passed.

Once all hard cuts are passed, the script would next direct the program to identify the twentile of the applicant, and proceed along a decision tree for that twentile. By doing so, the program will compare the application to the maximum loan amounts and rates available for an applicant in that twentile. If all values ultimately pass, an acceptance offer is issued to the applicant, either electronically or by mail, depending on the preference of the company. If at any point along the decision tree the value fails the programmed minimum or maximum value (as applicable for the particular field), the rejection letter is issued. Additionally, the FIG. 21A is an example of Level 2 additional details that are shown when a tile is selected. In this example, additional details supporting the summary of the risk modifier tile 1305J (See FIG. 18J) are shown in the detailed information area 1370 on the loan dashboard view 1300 when the underwriter selects the risk modifier tile 1305J. A title 27004 appears at the top of the data that corresponds to the tile which has been selected. In this case, because the Risk Modifier tile was selected, the title 27004 is "RISK MODIFIER DETAILS." Four columns are illustrated the title 27004. Alternatively, depending on the tile selected and the additional detail that is available for any given set of data, the display below the title 27004 may be tabular, graphical, pictorial, textual, etc. In the example shown in FIG. 21A for the risk modifier details, the leftmost column lists all fields that the system is programmed to collect data for related to Equifax and Transunion credit checks. These fields are created by the lending company based on any number of parameters that the company wants to account for when categorizing the risk of a loan.

The second from the left column (i.e., the values column 27008) contains the values corresponding to the fields of the leftmost column. The third column from the left is labeled "Dec." and displays a score (1 through 10) to which the value of the values columns correlates to. "Dec." stands for decile, and represents the assigned score (1 through 10) of each of the value ranges. Alternatively, these ranges could be set up in quartiles, quintiles, sextiles, septiles, etc.

Exemplary ranges for "Revolving Balance" are illustrated and assigned a corresponding decile score as follows:

| Decile for Revolving Balance | Equifax | TransUnion |
|---|---|---|
| 10 | $0-$1,466 | $0-$1,751 |
| 9 | $1,466-$5,112 | $1,751-$5,023 |
| 8 | $5,112-$8,830 | $5,023-$8,481 |
| 7 | $8,330-$12,135 | $8,481-$12,612 |
| 6 | $12,135-$16,202 | $12,612-$17,294 |
| 5 | $16,202-$20,458 | $17,294-$21,786 |
| 4 | $20,458-$26,321 | $21,786-$28,036 |
| 3 | $26,321-$37,224 | $28,036-$40,881 |

| Decile for Revolving Balance | Equifax | TransUnion |
|---|---|---|
| 2 | $27,224–$51,766 | $40,881–$59,087 |
| 1 | >$51,766 | >$59,087 |

In the example shown in FIG. 21A, because the Revolving Balance value is over $51,766, the system displays the Dec. value of 1. Ranges may be linear or non-linear and are generally based on risk tolerances assigned by the lending company based on a lending history analysis. Such ranges are created for each of the values the system displays, such that each value is assigned a corresponding decile. number between 1 and 10 inclusive.

As discussed above, in one embodiment, the parameters are combined using a regression-based set of weightings for each of the parameters being taken into account as they relate to whether a loan was a performing versus non-performing loan, optionally plus a starting factor (i.e., an "intercept" ("b") in a linear combination of factors). As shown in FIG. 21A, the exemplary factors ($f_1$-$f_7$) are: ($f_1$) "FICO" (for FICO score), ($f_2$) "Inquiries" (for the number of credit inquiries made in a last threshold period of time), ($f_3$) "LTI" (for the loan to income ratio created by the amount of the loan being checked by the underwriter), ($f_4$) "Revolving balance" (for the average balance of the potential borrower over a threshold period of time), ($f_5$) "Oldest Trade" (the earliest reported credit (e.g., on Equifax) of the potential borrower which is used to determine the length of time between when the loan was applied for and when credit reporting started), ($f_6$) "Average Net Inflow" (for the average positive cashflow of the potential borrower over a threshold period of time), and ($f_7$) "Inflow Trend" (for trend of the positive cashflow of the potential borrower over a threshold period of time). The various threshold periods of time need not be the same for each of the parameters. Exemplary weighting factors (as generated using Equifax credit data) for those parameters are: $w_1$=−0.00776394, $w_2$=0.229626107, $w_3$=2.370461691, $w_4$=4.44E-06, $w_5$=−0.000131645, $w_6$=−0.864846637, and $w_7$=−4.69E-05, respectively, with a starting factor (i.e., intercept) of b=3.98672896. (As would be appreciated by those of ordinary skill in the art, separate weightings can be used for the TransUnion data. Such weightings can be determined using a regression (e.g., linear regression) of the TransUnion specific credit data for loans based on their loan performance.) In the illustrated example, a borrower's data is illustrated twice—once for data obtained from Equifax and once for data obtained from TransUnion. A score is generated for each. The Equifax data is illustrated as: FICO: 677, Inquiries: 0, LTI: 18.26%, Revolving Balance: $66,895, Oldest Trade: Aug./17/2001, and assuming that the loan was applied for on Nov./7/2017, Average Net Inflow: −$5,978 and Inflow trend: 54.97%. Together those factors are used to generate a linearized sub-score (lss) of:

$$lss = b + \sum_{i=1}^{7} f_i * w_i$$

In the example, the linearized sub-score is then used to a generate a score of 18.02%, assuming a scoring equation of:

$$score = 1/1e^{-lss}$$

Should a borrower be declined, FIG. 21A also provides information to an underwriter that provides the "rank" of each factor in how it related to the decision to decline the borrower. One-by-one, for each of the factors ($f_1$-$f_7$), the current factor is set to a "high performing score" (e.g., the average of the best 2.5% of values for that factor used to generate the weightings), while the values of the remaining factors are kept their original values. (Exemplary high performing scores (best 2.5% average scores) for each of the seven listed factors are: 800, 0, 4%, $0, 14022.5 days since the first credit report, 0.4888314, and $12792, respectively. As would be understood by those of skill in the art, other high performing scores could be used and could be obtained by performing a histogram on historical data for each of the factors being considered and isolating the high performing (e.g., top 2.5%) data for each factor and averaging those values. There may also be separate high performing parameters for use with the Equifax and TransUnion data.) This provides a differential score for each factor that can be compared with the actual score to see how that factor affected the score and, therefore, which values could have brought the score down even more. (The scores in the exemplary embodiment reflect a chance of default, so a lower score is a "better" score. However, alternate scoring methods can be used such that a higher score is better without departing from the teachings here.) The greater that a factor could have helped the final score indicate less risk of default, the higher that factor is for a "denial ranking."

As shown in the rightmost columns of FIG. 21A, the decline ranking for each factor is illustrated, along with what the score would have been had the factor been at the maximum values and all the other factors kept constant. As can be seen, the "oldest trade" factor most heavily raised the potential borrower's score (i.e., indicated an increased risk of default). Had the borrower had a high performing score for that factor, its risk score would only have been 7.04%.

The scoring process can then be repeated using the TransUnion information. As can be seen from FIG. 21A, the information retrieved from Equifax and TransUnion may not be the same and may therefore result in different scores (and different denial rankings). As will be further described below, the loan amounts may be different between the two reporting bureaus because the loan amount is an automatically generated value associated with a maximum amount that a borrower can borrow under the risks presently specified by the system (which vary based on the credit reporting information).

The range of scores is then divided into groupings, preferably in a group of twenty ranges (i.e. into 20 "twentiles" (" "TT")) so that the risk can be more easily assessed. The twentile ranks (from 1 through 20) of the score represents the loan risk of the application. A TT of 1 is the lowest risk, and therefore the most likely candidate for the underwriter to approve for a loan. A TT of 20 is the highest risk and therefore the least likely candidate for the underwriter to approve for a loan.

The division of the scores into the twentiles need not be linear. An exemplary mapping of sets of score ranges to twentiles is provided below.

| Start | Less Than | Twentile |
|---|---|---|
| 0 | 0.03657322 | 1 |
| 0.03657322 | 0.05002613 | 2 |
| 0.05002613 | 0.06443682 | 3 |
| 0.06443682 | 0.08016457 | 4 |

-continued

| Start | Less Than | Twentile |
|---|---|---|
| 0.08016457 | 0.09841874 | 5 |
| 0.09841874 | 0.1080168 | 6 |
| 0.1080168 | 0.1225399 | 7 |
| 0.1225399 | 0.1419387 | 8 |
| 0.1419387 | 0.1519368 | 9 |
| 0.1519368 | 0.1547167 | 10 |
| 0.1547167 | 0.1690174 | 11 |
| 0.1690174 | 0.1935825 | 12 |
| 0.1935825 | 0.203022 | 13 |
| 0.203022 | 0.2130408 | 14 |
| 0.2130408 | 0.2599068 | 15 |
| 0.2599068 | 0.2905481 | 16 |
| 0.2905481 | 0.3625842 | 17 |
| 0.3625842 | 0.3843768 | 18 |
| 0.3843768 | 0.6243625 | 19 |
| 0.6243625 | 0.7307067 | 20 |

In the example shown, the Equifax score is 18.02% which corresponds to a TT (twentile) score of 12. Similarly, the Transunion score is 15.19% which corresponds to TT 10. Between the two scores, the system uses the more conservative score of TT 12.

The above calculations with respect to FIG. 21A are illustrated as having been performed using a cumulative risk modifier of 100% (i.e., no change in the risk analysis). As is described herein, variations in the scoring of a loan can occur due to increase or decreases caused by a series of calculated assessed risks added together as a cumulative risk modifier.

As is described in greater detail below, the Risk Modifiers Details often may be used in conjunction with an optimized process for determining a maximum amount of money that a borrower can be underwritten for. However, in an alternate embodiment, the scoring can occur for a fixed loan amount specified by a borrower where the borrower has indicated that he/she is not interested in any other loan amounts. In such a configuration, the LTI (loan-to-income) values would be the same between the Equifax and the TransUnion analyses since the loan amount is fixed, rather than optimized. In general, the scoring performed by the system as described herein (both for a fixed loan amount and for a varying loan amount as part of the optimization process described herein) is performed by the computer instructions generally referred to as a "loan request scoring module."

Figure 21B:
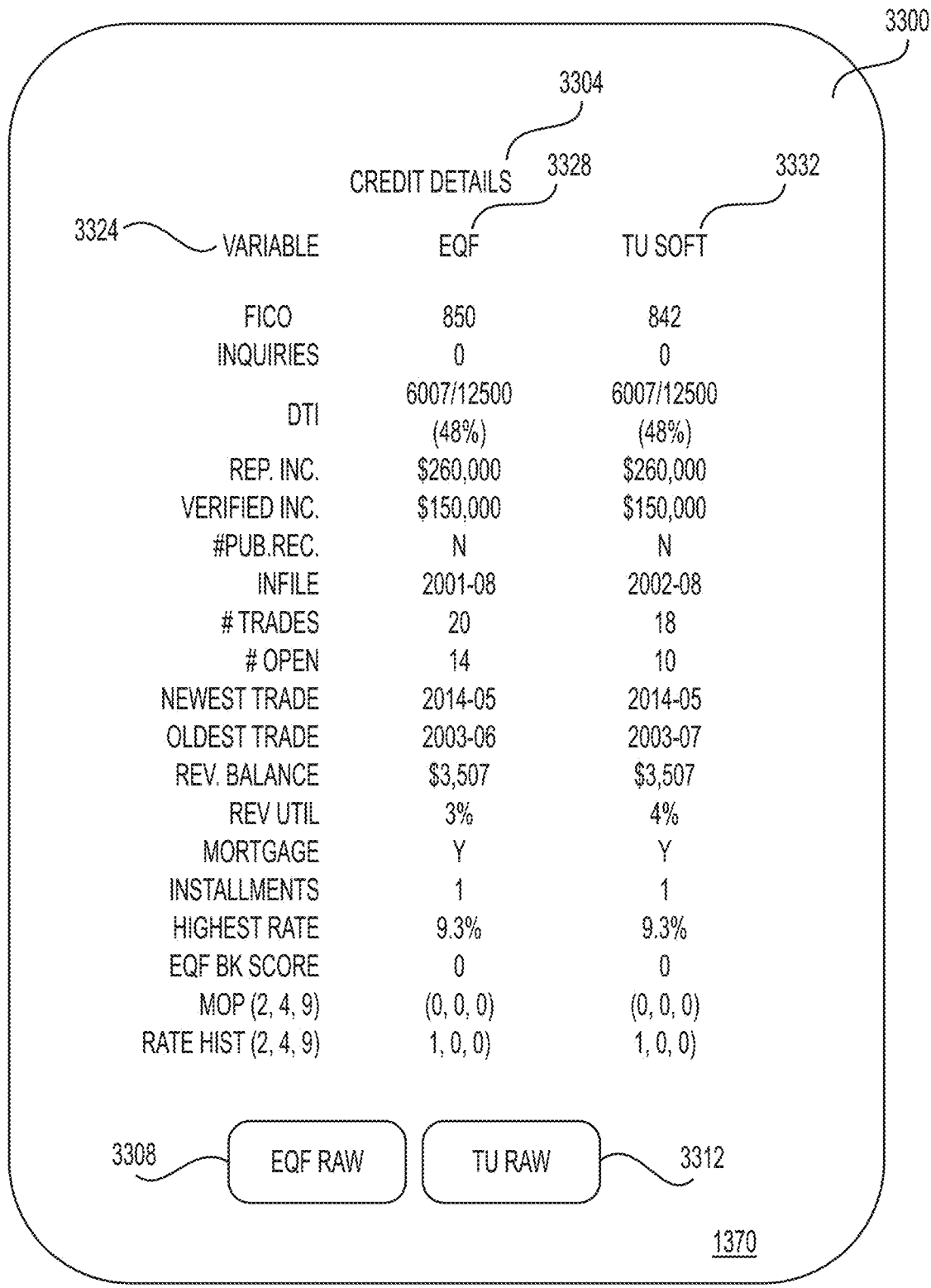

FIG. 21B is another example of an example of Level 2 additional detail that is shown in the detailed information area 1370 when a tile is selected. In this example, the details from the credit tile 1305B (See FIG. 18B) are shown. A title 3304 appears at the top of the data that corresponds to the tile which has been selected. In this case, because the Credit tile was selected, the title 3304 is "CREDIT DETAILS." Below the title 3304 are several columns. Alternatively, depending on the tile selected and the additional detail that is available for any given set of data, the display below the title 3304 may be tabular, graphical, pictorial, textual, etc. In the example shown in FIG. 21B for the credit details, the left column "Variable" lists all fields that the system is programmed to collect data for. Columns to the right of the "Variable" column 3324 include an "EQF" column 3328 and a "TU soft" column 3332 with data listed below each to represent the value of the variable in the "Variable" column 3324. EQF stands for EquiFax, and TU stands for TransUnion. Below this data may be any number of additional tiles that provide the underwriter options to further review data depending on what is available from the program. In this example, an "EQF raw" tile 3308 and "TU raw" tile 3312 are available. By selecting the "EQF raw" tile 3308, the screen display changes to that display shown in FIG. 21C (3301). The data shown is a detailed analysis of the information contained in the Equifax report. At the bottom of this screen display 3301 are two additional tiles, namely a "Hide EQF" tile 3316 and a "TU raw" tile 3320. If the underwriter selects the "Hide EQF" tile 3316, the screen reverts to the display of FIG. 21B (3300). If, instead, the underwriter selects the "TU raw" tile 3320, the display shows the detailed analysis of the information contained in the TransUnion report. If, when viewing FIG. 21B (3300), the underwriter selects the "TU raw" tile 3320, the display shows the detailed analysis of the information contained in the TransUnion report.

In addition to the Risk Modifier Details information and the Credit Details information described above that can be displayed in the detailed information area 1370, other tiles can cause the detailed information area 1370 to display other information. As shown in FIG. 21D, Hard Cuts Details information can be displayed in the detailed information area 1370. The Hard Cuts Details information is preferably color-coded to indicate whether the information fails any hard cuts. For example, the information in FIG. 21D all passes the hard cuts and is preferably green. However, any failing entry could be color-coded red for easy identification.

Similarly, as shown in FIG. 21E, Cashflow Details information can be displayed in the detailed information area 1370. The Cashflow Details information is preferably color-coded to indicate whether the information fails any cashflow constraints. For example, the information in FIG. 21E that passes the cashflow threshold (everything except the 6 month test) would be green, but the 6th test fails and would be color-coded red. In addition, the initial underwriter decision is initially automatically set to "FAIL" as shown. In some configuration, the underwriter may be provided some discretion where, as here, the value is just on the edge. In such a case, the underwriter may be allowed to select the "FAIL" icon (e.g., by right clicking) and override the decision.

Yet another set of details that can be displayed in the detailed information area 1370 are the offers that are being established for proposing to the borrower. As can be seen in FIG. 21F, information on an offer for 100% of the maximum amount for the borrower (as determined by the optimization process described below), 75% of the maximum and 50% of the maximum are provided to the underwriter in the detailed information area 1370. (Alternatively, the same information could be provided on the reverse side of the offers tile 1305I (FIG. 18I), and the underwrite can flip back to the front using the "Flip" icon in the upper left hand corner.) Using the "Add Offer" button, the underwriter can automatically generate a new (e.g., fourth) offer. Once the underwriter has determined what offers are to be made, the corresponding boxes are checked and the "Approve" button is selected. Should the borrower elect to accept one of the offers and the loan needs to be financed, the underwriter can push the accepted loan information into a loan marketplace by using the "Set Request Values" button.

The computer-implemented method described herein comprises a configuration of commercially available computer equipment including a display that is electronically connected to multiple Application Program Interfacing (API) systems, including, but not limited to, Quickbooks, Plaid, consumer and business bureaus, legal reviews(e.g., LexisNexis), etc.

The overall process described above is exemplified by the process flow depicted in FIG. 22. The process begins 3404 when the loan applicant creates a loan application 3408. The applicant submits the application, which is received 3412 by the loan/underwriting company. The application is then assigned, either automatically or manually, to an underwriter 3416. The underwriter initiates data collection 3420 for the loan. When the underwriter initiates the data collection 3420, the system processes the request and sends data requests 3424 to various API programs to search for the data required. The API programs search for requested data and information 3428 and return the data to the system to be automatically updated in the application 3432. Once the information has been collected in the system, the underwriter can access the data to check the status of data collection 3436. The underwriter will be able to quickly see the progress by viewing the loan dashboard 1300 of FIG. 13.

Once the underwriter has checked the status of data collection, a determination will be made if the data collection status is complete 3440. If the status is not complete 3444, the program continues to send data requests to the API programs 3424 until the status is complete 3448. Also, requests may be sent to the borrower to add information or clarify information. Once the status is complete 3448, the underwriter makes a loan decision based on the quality and results of the data collected 3452. If the underwriter approves the loan 3456, the underwriter's approval is entered into the system. Offers are made to the borrower and the underwriting process ends and the applicant receives loan approval 3460. If the underwriter denies the loan 3464, the process ends and the applicant receives a loan rejection 3468.

Figure 23:
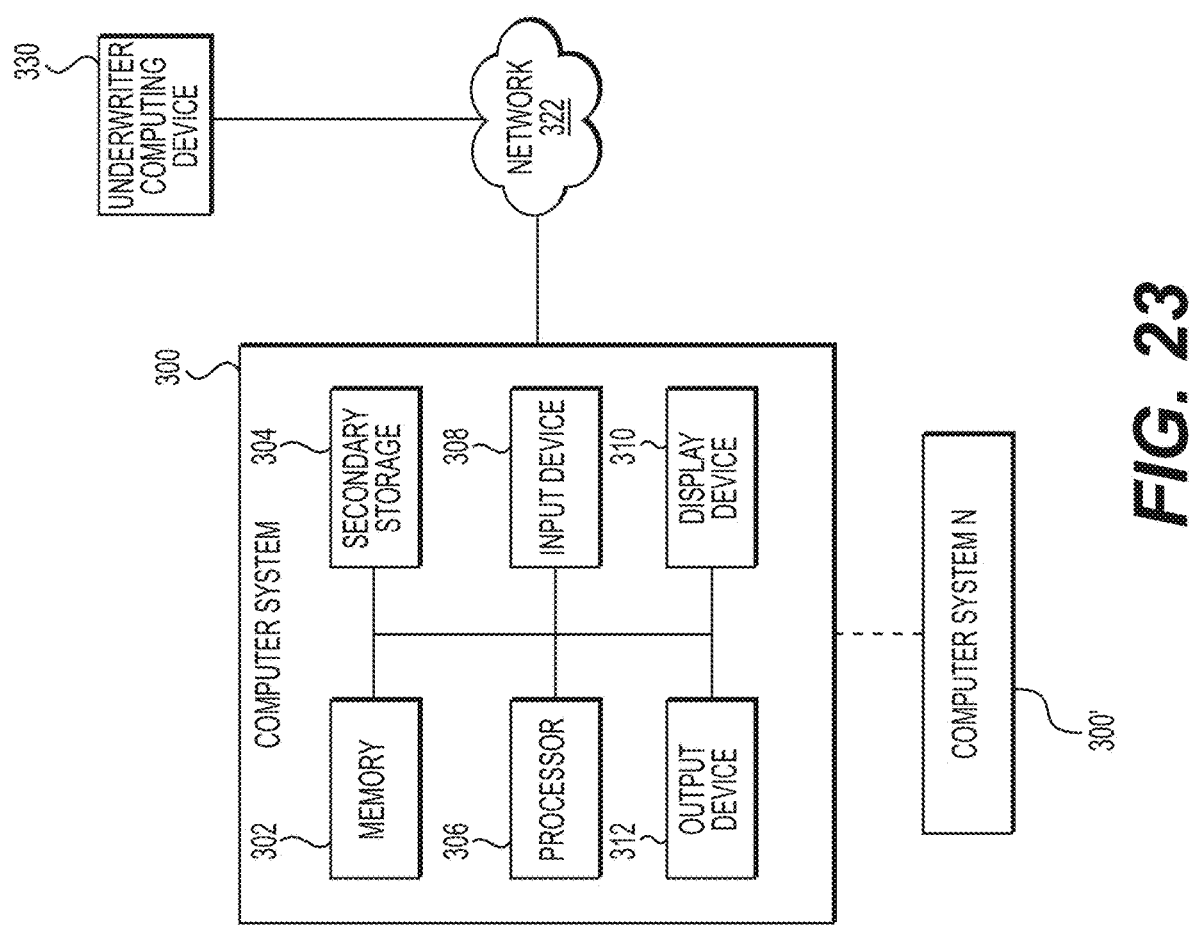
FIG. 23 is an exemplary computer system used to accomplish implement the exemplary loan application submission and underwriting process as described herein.

An exemplary computer system is shown in FIG. 23. Computer system 300 typically includes a memory 302, a secondary storage device 304, and a processor 306. Computer system 300 may also include a plurality of processors 306 and be configured as a plurality of, e.g., bladed servers, or other known server configurations. Computer system 300 may also include an input device 308, a display device 310, and an output device 312. Memory 302 may include RAM, SRAM, non-volatile RAM (including but not limited to Flash RAM and ferro-electric memory (FRAM)) or similar types of memory, and it may store one or more applications for execution by processor 306. Secondary storage device 304 may include a hard disk drive, floppy disk drive, CD-ROM drive, or other types of nonvolatile data storage. Processor 306 executes the application(s), such as subsystem components, which are stored in memory 302 or secondary storage 304 or received from the Internet or other network 322. The term "memory" as used herein can include both memories of the type used in memory 302 as well as secondary storage devices 304, and are non-transitory computer readable media. The processing by processor 306 may be implemented in software, such as software modules, for execution by computers or other machines. Such a computer system 300 may alternatively be connected to other computer system(s) N 300'. Underwriter computing device(s) 330 communicate with the computer system 300 through a network 322. Borrowers computing devices similarly communicate with the computer system 300 through a network 322.

As described above, monthly statements or other banking records are processed to provide information to the system, such as cashflows. A more detailed discussion of the automated processing of monthly statements or other banking records is provided below with respect to FIGS. 24A-24C. Once the monthly statements or other banking records have been converted to a text processible format, the system performs automatic conversion of the information according to an established set of rules. In one embodiment, a written set of rules, referred to as a "grammar," is utilized that informs the system of the order and type of transactions that should be detected during processing. For example, as shown in FIGS. 24A-24C, a grammar provides a series of strings (or regular expressions) that can be processed to identify bank codes (FIG. 24A), process transactions of an exemplary bank (FIG. 24B), and identify transfers and loans (FIG. 24C). Alternatively, the rules for processing may be established graphically by selecting areas on an image that correspond to each of the portions of the monthly statements or other banking records that are to be processed and how they are to be processed. For example, graphically identifying where header information appears on each of the pages (so that it can be skipped) versus where account information (e.g., account numbers) and transaction information (deposits and withdrawals) can be found so that they can be processed.

Alternatively, at least one machine learning process can be used to parse text or scanned documents for which no grammar exists, and in some embodiments to create a grammar based on the machine learning. In one such machine learning process, the system provides to an underwriter a proposed set of correlations between unclassified text and various transaction types (including where a number of the same transaction types appear). The underwriter then can provided feedback (i.e., corrections) to the proposed set of correlations from which the system can produce updated proposed correlations. The proposal and feedback loop continues until an underwriter determines that the system has correctly learned the structure of the document being analyzed.

In the exemplary portion of a grammar shown in FIG. 24A, the grammar provides rules for how to determine a bank code of a particular monthly statement so that subsequent portions of the grammar (corresponding to the determined bank code) can be selected to further process the records. FIG. 24A provides a dictionary of the rules for determining 11 different bank codes ("BAC", "BBT", "JPM", "COF", "WFC", "WFC2", "PNC", "TD", "STI", "NVF", and "HBAN") of ten different banks having 11 different statement formats. The dictionary is in the form of a comma separated list of key:value pairs where a search string is separated from the corresponding bank code by a colon (":"). For example, as shown in FIG. 24A, the bank code "BAC" for Bank of America is illustrated as being separated from and associated with the "key string" having the format "P.O. Box 15284.*" (which mean the string "P.O. Box 15284" followed by any additional/trailing characters (to which the wildcard '*' matches)). So, the system assigns the bank code "BAC" to bank statement in which the software finds at the beginning of a line the text string "P.O. Box 15284." Similarly, the bank code "BBT" corresponds to finding in the text of the statement a string having the format ".*\(800\)\s*BANK-BBT.*" which means "(800)" followed by as many spaces as exist (because of the "\s*"), followed by the string "BANK-BBT" which can be trailed by as many spaces as remain on the same line.

Once the bank code has been determined, a set of bank-specific format rules can be applied to the monthly statements or other banking records to provide more accurate processing of the information. Assuming that the bank code for Bank of America has been determine to be appropriate (because of finding the string "P.O. Box 15284" at the beginning of a line), the portion of the grammar corresponding to FIG. 24B can be used. That portion of the grammar identifies the various headers that are to be found in the statement ("Date", "Description", "Amount"), and ("Date", "Transaction description", and "Amount"). That portion of the grammar also provides text strings for identifying the beginning and end of the various sections (e.g., summary information, credit information, debit information, check information, balance information, and date information) so that those sections can be processed.

As shown in FIG. 24C, for bank statements and other records for which no grammar exists and/or for certain kinds of transactions within known bank records, another portion of the grammar can provide text string to help identify how to process certain information. For example, when determining cashflow, a system is better able to determine or estimate a potential borrower's cashflow if it removes loans and other transfers (e.g., intra-company transfers and overdraft transfers) that might otherwise look like revenue. To aid in this process, the grammar identifies a number of keywords that indicate a transfer as opposed to revenue. For example, transactions with a description that includes the word "transfer" of "xfer" as treated as transfers so that additional processing logic can be triggered. The system can similarly attempt to detect loans by identifying transactions with words related to known lenders, e.g., "kabbage", "on deck", and "blue vine" among others. The likelihood that the transfer is a loan increases when the transfer amount is for a multiple of round number (e.g., $500 or $1000). The system can also detect overdrafts for the purposes of determining whether a company is spending more than it has on its books.

Just as the system can perform automated processing of bank records, so too can the system provide automatic processing of other information using other grammars, such as the partial grammar shown with respect to FIGS. 27A-27D.

In addition, given that document formats can change (especially tax forms which often change yearly), the system may further include a periodic guided review of the automatically processed forms to ensure that the underwriter agrees with how the information is being parsed (and to which fields the parsed information is being assigned). In such an embodiment, the user can identify where the order of fields may have changed from where they were expected (e.g., in a text report from a bank), and/or where information locations have changed (e.g., where boxes have moved as they are scanned from an IRS form). In this way, the grammar for a report or form can be automatically updated to account for the change and use of the updated grammar will result in better automated processing. In one such an embodiment, the user may be presented with a set of boxes that overlay a scanned form showing where the form fields were expected on a previous version of the form and into which database fields each value was previously stored. The user can then move the boxes and/or update the field names to accommodate the changes without having to re-layout the entire form. Similarly, using the old grammar and a scanned version of the new form, the system can provide suggestions (e.g., using a yellow box overlaid on the new scanned form) for where it appears that a box moved.

As described above, as part of processing the transaction information of a potential borrower according to the rules of the system, various transactions (e.g., transfers) can be tagged for additional processing, e.g., by removing loans and other transfers (e.g., intra-company transfers and overdraft transfers) that might otherwise look like revenue. One technique for tracking intra-company transfers is to match incoming and outgoing transfers on the same day having identical amounts (by analyzing the date-/time-stamps of the transactions). Such transfers can be removed from any revenue calculations. Also, the system may attempt to detect (e.g., from QuickBooks), the existence of a loan for which there is no repayment information in any of the statements. Conversely, the system looks for and identifies recurring payments of the same amount that do not correspond to a known loan. Either of those conditions indicates that the borrower may have additional, undisclosed accounts that need to be identified. The system can identify the problem as part of the banner 1320.

As described above, the underwriting system is capable of calculating one or more offers based on the risks associated with a particular borrower (assuming that the borrower at least passes the hard cuts of the system). In an embodiment, the system utilizes an iterative process that increases stepwise (e.g., every $1000) starting at the minimum permissible loan for the involved parties (which varies by state). At each step, the system calculates an associated risk score (as modified by any risk modifiers that are active at the time of calculation), and determines what "twentile" a borrower would be assigned to for the loan amount of that step. (As was discussed with respect to FIG. 21A which shows Risk Modifiers Details, the LTI (Loan-to-Income) percentage affects the score (and twentile).)

Turning to FIG. 26, FIG. 26 illustrates a set of lookup tables that correlate twentiles to loan terms used in an exemplary loan optimization process when the loans are for loan terms of 2 or 3 years. Additional lookup tables (not shown) can be used for other terms. In a preferred embodiment, in addition to the other risk factors, each borrower may be assigned to one of a number of groups (illustrated as A, B, and C), each of which has a different maximum credit limit. Such a group assignment may be based on a number of factors, such as whether the borrower is a repeat borrower or whether the borrower has a known Affinity that distinguishes it from other borrowers (e.g., the borrower is a veteran, member of an organization, etc.). (Applicants that are veterans also may receive up to $5,000 more than non-veterans, and veterans further may be allowed a higher loan-to-income ratio than non-veterans.) In configurations where there are no separate groupings, a lookup table with a single set of maximum credit limits could be used without departing from the teachings herein.

For the purposes of discussing FIG. 26, it is assumed that the borrower has been assigned to group C (or that there is only one group corresponding to the maximum credit limits of Group C). In this first example, the system starts with a low initial loan amount such as $2,000. Using initial loan value (e.g., $2,000), the system calculates that the borrower is in the 6th twentile. By looking up the maximum amount ($60,000) that can be loaned at that twentile, the system determines that the borrower qualifies. After determining that the borrower would qualify and that the loan amount would not exceed the allowed maximum, the system remembers or stores that loan amount as an acceptable amount and continues on to the next higher loan amount step (e.g., $3,000). The system then repeats the process, again finding that the borrower would qualify and that the loan amount would not exceed the allowed maximum. Again, the system remembers that loan amount as an acceptable amount and continues on to the next higher step. This process is repeated until the current loan step exceeds the maximum loan amount for the twentile. The system then uses the last acceptable loan amount as a basis for the offers presented to the underwriter for consideration before sending the offers to the borrower.

During the iterative process, the borrower may stay assigned to a single twentile or may change twentiles depending on the loan-to-income level (as discussed with respect to FIG. 21A). For example, a potential borrower may be classified in twentile 6 (TT=6) during part of the analysis (e.g., at the $52,000 level), but by moving up to the next iteration step of $53,000, the borrower is reclassified into twentile 7 (TT=7). However, as can be seen in FIG. 26, the maximum loan amount in twentile 7 is $50,000, so the risk and loan parameters become incompatible, and the iterative process would stop (or drop down to some other value (e.g., $52,500) if less than full steps are allowable within the system). As would be appreciated based on the foregoing, the system could use coarse grain steps (e.g., $5,000) until a borrower no longer qualifies and then fine grain steps ($1,000) starting at the last acceptable coarse grain step until the borrower again does not qualify.

Alternatively, rather than starting at the minimum permissible loan for the involved parties (which varies by state), the system may be configured to use at least one of a starting value and a step/increment size associated with a credit parameter associated with the borrower (such as the borrower's FICO score (e.g., starting at $8000 and using steps of $2,500 for a FICO above 750, and using state minimum and $1,000 increments otherwise)). In such configurations, the system may have to stepwise reduce the loan amount if the borrower using the higher values does not qualify at the initially chosen amount. Similarly, the system may utilize larger step/increment sizes over the initial loan amount if the calculated score for a borrower is very good at low loan amounts.

In yet another embodiment, the system may utilize a method that is not stepwise but rather is more complex, such as a "halving" approach where the initial test value is half of the system maximum (e.g. $50,000) and then the amount is stepped down or up by half of the difference between the highest known acceptable amount (or the maximum amount) and the lowest known unacceptable amount but not in increments of less than a threshold (e.g., $1000). So, the testing levels might be $50,000, then $100,000, then $75,000, then Rounded((50,000+75,000)/2, 1000)=$62,000, then Rounded(50,000+62,000)/2, 1000)=$56,000, etc. A number of variations of the iterative optimization process may be used to arrive at loan offers.

As described with respect to FIG. 21A, risk assessment is preferably performed based on more than one set of credit parameters (e.g., using Equifax credit parameters and then again using TransUnion credit parameters). Each of those credit parameters can give a different score and potentially a different twentile as well. Accordingly, the above optimization process is performed once for each set of credit information. As can be seen in FIG. 21A, optimization processes resulted in different maximum credit lines and different scores.

Should the underwriter later alter one of the risk modifiers (e.g., enable a counter offer resulting in a 20% risk reduction or enable an adjustment, such as a 20% reduction (−20%) as discussed with respect to FIG. 19A), the system automatically re-runs the optimization based on the new scores and twentiles and all tiles with corresponding information are updated accordingly (both with the internal summary information and the tile borders) to reflect the new information. The update generally occurs in real time. That is, the relevant tiles are updated while the underwriter is viewing the dashboard with the loan application information.

Once the maximum loan amount is determined for each of the sets of credit information, the system automatically generates a series of offers based on the more conservative risk analysis (i.e., the higher twentile). Again referring to the lookup tables of FIG. 26, the system determines an interest rate for the maximum amount of loan that can be offered to the borrower (either generally at a preferred term length of the underwriter or at the term specified by the borrower). Assuming that the term length is to be 1.5 years, and that the system has determined that a borrower can be offered a maximum of $26,200 in twentile 6, the system performs a lookup of the corresponding interest rate. As shown in FIG. 26, the initial rate for twentile 6 is 16.241% (labeled rate) up to a threshold of $25,002 (labeled threshold), and the initial rate increases linearly between 0 and $25,002 at a rate of 3.8% (labeled modifier 1). After reaching the threshold (again assuming a category C borrower), the rate increases a maximum of 6.3% (modifier 2) up to the maximum (of $60,000). So the offer provided to a category C twentile 6 borrower for $52,000 loan over 3 years is 17.61%+3.3%+ (5.45%)*(26200−25002)/(60000−25002)=20.2%. If such an offer would be unsupported under the most restrictive state's usury laws, then either the loan would fail or the underwriter would have to accept a reduction in rate to the maximum allowable under the most restrictive state's laws. As would be appreciated, functions other than linear changes from the initial rate can be used up to the threshold amount and other than linear changes can be used above the threshold amount up to the maximum amount. In addition to interacting with the above underwriting system using a keyboard or mouse, additional input devices can be used, such as a motion sensing bar (e.g., a KINECT motion sensing bar as used with the MICROSOFT XBOX) and a microphone, headset or other voice input. When using the motion sensing bar, an "attention" motion may be required to first indicate to the motion sensing bar that it is to command the user's dashboard 1300. Similarly, when using voice input, the system preferably prefaces all commands with a code phrase that is infrequently used in common conversation (e.g., "Vesuvius"). In one such embodiment, the voice interactions are intended to be unidirectional in a command-only mode (i.e., the user talks to control the dashboard, but computer system generating and controlling the dashboard does not talk back, it simply performs the commands). In a bi-directional mode (also referred to as a command-response mode), the system may provide voice feedback to the user.

Exemplary voice interactions with the dashboard in command-only mode may include, but are not limited to, commands (where ellipses are used to indicate the pause waiting for the system to begin processing) such as:
  1. "Vesuvius . . . Turn on counter-offers for loan 12345"
  2. "Vesuvius . . . Assign loan 12345 to Madhur"
  3. "Vesuvius . . . open loan 12345 for processing"
  4. "Vesuvius . . . filter the visible loans by loans on which no action has been taken for more than 1 week"
  5. "Vesuvius . . . filter the visible loans by loans awaiting supervisor action"
  6. "Vesuvius . . . filter the loans by unassigned loans".

Additional voice commands can be used to control the opening, closing, and processing of the tiles in any manner that is possible using mouse or keyboard control. For example, tiles can be opened, flipped, closed, rearranged, changed to have the focus (so that the detailed information area 1370 shows the corresponding information for the tile that now has the focus), etc. Exemplary voice commands may include commands based on tile position (e.g., "move the top, left tile down two positions") or by the subject matter of the tile (e.g., "close the hard cuts tile", "flip the cashflows tile", or "add the repeat tile to the tile display area").

Exemplary question and answer sets of voice interactions with the dashboard in command-response mode may include, but are not limited to, questions (preceded by "Q" and a number) from a user and answers (preceded by "A" and a number associated with the question):

Q1. Vesuvius, . . . how many deals are in my queue today?
A1. Currently, there are 15 deals in your queue today. High priority deals are the following a) Veteran contractors with a revenue of $5 MM) and b) Grunt media with the revenue of $2 MM
Q2. Vesuvius, . . . What was the average loan amount approved by all the underwriters yesterday?
A2. The average amount approved was $45K compared to $40K average so far for this year
Q3. Vesuvius, . . . Assign Grunt Style to Bredon Ellis
A3. Grunt style has been assigned to Bredon Ellis. His queue looks busy and you should balance the queue. Should I balance the queue now?
Q4. Vesuvius, . . . Add Brent Smith as an underwriter and give him approval authority for $15K
A4. Brent has been added to the UW system. I wish him all the best. He has an impressive resume on Linkedin and thanks to him for his military service.
Q5. Vesuvius, . . . Show me all the deals that haven't been worked on in the last three business days
A5. The deals have been highlighted in the system.
Q6. Vesuvius, . . . Can you pull Lexis Nexis on Grunt Media
A6. I ran Lexis Nexis and I see 2 liens on the business. Do you want me to provide you with details on the liens?
Q7. Vesuvius, . . . Can you generate offers for Grunt Media?
A7. 3 Term offers have been generated. Do you want me to approve?
Q8. Vesuvius, . . . Yes please approve the loan term offers for Grunt Media
A8. Grunt Media has been approved. Peter is the salesperson assigned to the deal and he has been notified
Q9. Vesuvius, . . . can we get an exception on Veteran construction from the credit committee.
A9. An email has been sent to the credit committee to get the exception. Anything else I can do for you today?
Q10. Vesuvius, . . . Please run the cash flow analysis on Grover consultancy
A10. I have run the cash flow analysis on the business and based on my analysis the business is about $2 MM revenue business and cashflow tile is green. Do you want me to analyze the taxes?

In addition, some "questions" will be treated as requests for delayed commands to ensure that the system properly understood the command even though the command cannot be executed immediately. For example:

Q11. "Vesuvius . . . Can you please remind me at the end of the day to check on whether the supervisor has cleared loan 4444?"
A11. "Okay, I'll remind you when you select "log-out".

At that point, the system would add to the actions that are to occur when a user selects logout.

Both of those modes can be programmed as a series of "if-this-then-that" style commands where a grammar of commands can be established to identify rules, variables and commands. For example, in command-only mode, a partial grammar (using Python commands that can be interpreted at run-time) for processing the commands "Vesuvius . . . Turn on counter-offers for loan 12345" and "Vesuvius . . . Assign loan 12345 to Madhur" could include:

```
"Turn [on: $(status=True) | off: $(status = False)] counter offers for loan $(referenceID)":
    "loanObj = db.findLoanByReferenceID($referenceID)
    if loanObj is not None:
        loanObj.setStatus( $status )";
"Assign loan $(referenceID) to $(employee)":
    "loanObj = db.findLoanByReferenceID($referenceID)
    employeeObj = employees.findEmployeeByName( $employee)
    if ((loanObj is not None) and (employeeObj is not None)):
        loanObj.setUnderwriter( employeeObj )";
. . .
```

The computer-implemented method described herein is controlled by software comprising instructions that provides the computer system steps for locating, collecting, storing, displaying and receiving input relevant customer application data.

The invention claimed is:

1. An underwriter interactive user interface accepting underwriter input while underwriting electronic loan applications comprising:
   a computer screen;
   a computer input device;
   an electronic interface which receives an electronic loan application with loan application data, wherein the loan application data includes a loan applicant's personal and business data for processing;
   an electronic interface which imports financial information from a third party computer for the electronic loan application using an application program interface;
   a loan routine wherein loan offerings are determined using a risk assessment and a set of look-up tables;
   a first display area being a portion of the computer screen and including six or more tiles displayed simultaneously, each of the displayed six or more tiles representing a single application underwriting subject matter for examination by an underwriter, wherein at least two of the six or more tiles comprise:
      two or more views for the single application underwriting subject matter represented, wherein each of the two or more views is selectable by the underwriter using the computer input device;
      a tile border displayed in a color to signify the at least two tiles importance to underwriting process, wherein the tile border is colored one of two colors signifying to an underwriter acceptable or problem subject matter; and
      a close icon which when selected removes the tile from the first display area and causes a tile title icon to appear on the computer screen;
   and wherein the six or more tiles further comprise:
   at least one view which includes an information icon;
   at least one view which includes a bar chart;
   at least one view which includes data displayed in a tabular form; and
   wherein the tiles are moveable and arrangeable in real time by the underwriter within the first display area; and
      wherein one of the six or more tiles is a loan offerings tile, and wherein the determined loan offerings are displayed on the loan offerings tile based on the loan routine and through the computer input device an underwriter approval of the displayed loan offerings is accepted; and a second display area, located in a separate portion of the computer screen from the first display area, wherein documents or raw data related to the single application underwriting subject matter included on a most recently selected tile of the six or more tiles is displayed.

2. The underwriter interactive user interface of claim 1, wherein one tile of the six or more tiles has the single application underwriting subject matter of risk and a generated risk assessment is displayed on the risk tile for use by the underwriter.

3. The underwriter interactive user interface of claim 2, wherein the risk assessment accounts for business age and number of employees.

4. The underwriter interactive user interface of claim 3, wherein one of the six or more tiles displays the age of the business and the number of employees.

5. The underwriter interactive user interface of claim 1, wherein a credit analysis is performed and wherein the single application underwriting subject matter of one tile of the six or more tiles is credit and credit information is displayed on the credit tile for use by the underwriter.

6. The underwriter interactive user interface of claim 1, wherein the loan application data is displayed and wherein the underwriter interactive user interface accepts through the computer input device the underwriter input for approval of the electronic loan application.

7. The underwriter interactive user interface of claim 1, wherein a risk band is determined for the electronic loan application and at least one displayed loan offer is based on the risk band.

8. The underwriter interactive user interface of claim 1, wherein the single application underwriting subject matter of one tile of the of the six or more tiles is cashflow and includes a graphical display of a cashflow trend for the electronic loan application.

9. The underwriter interactive user interface of claim 1, wherein the loan routine optimizes for a maximum amount.

10. A system with underwriter interactions comprising:
a processor;
a memory communicatively coupled to the processor;
an electronic interface which receives an electronic loan application with loan application data, wherein the loan application data includes a loan applicant's personal and business data for processing;
an electronic interface which imports financial information from a third party computer for the electronic loan application using an application program interface;
a loan routine including:
a risk assessment; and
a set of look-up tables for determining loan offerings;
a data visualization application at least partially stored in the memory and executable on the processor to render a dashboard display from a data store, the data visualization application including:
a renderer to extract data from the data store and generate a dashboard with first and second display areas, the first display area comprising:
three or more tiles displayed simultaneously, each of the displayed three or more tiles representing a single application underwriting subject matter for examination by an underwriter, and each of the six or more tiles comprising:
two or more views for the single application underwriting subject matter represented, wherein each of the two or more views is selectable by the underwriter using a computer input device and wherein a single click on the corresponding tile changes the view;
at least one view which includes cash flow based on the imported financial information;
a tile edge displayed in a color to signify each of the three of more tiles importance to underwriting process, wherein the tile edge color is one of two colors signifying to an underwriter acceptable or problem subject matter; and
a close icon on each of the three or more tiles which when selected removes the corresponding tile from the first display area and causes a tile title icon to be rendered outside of the first display area;
and wherein one of the three or more tiles is a loan offerings tile which displays loan offerings determined based upon the loan routine; and
the second display area comprising, views of documents or raw data related to the single application underwriting subject matter included on one or more of the displayed three or more tiles; and
a tile select application wherein one of the three or more tiles in the first display area is selected to display the single application underwriting subject matter documents or raw data for the corresponding selected tile in the second display area; and
a tile movement and layout application wherein the three or more tiles are moved and arranged in real time by the underwriter within the first display area in order to personalize a display for the underwriter and a particular loan.

11. The system of claim 10, wherein the at least one view includes a cashflow and displays a cashflow trend shown in a graphical form.

12. The system of claim 10, wherein the loan routine optimizes for maximum amount.

13. The system of claim 10, wherein a credit worthiness analysis is automatically performed using the imported financial information data and wherein the single application underwriting subject matter of one tile of the three or more tiles is credit and credit information is displayed on the credit tile for use by the underwriter.

14. The system of claim 13, wherein the display on the credit tile includes a graphical display comprising a donut.

15. The system of claim 10, wherein the imported financial information is stored in the memory.

16. The system of claim 10, wherein the processor is programmed to apply hard cuts using the imported financial information, wherein the electronic loan application is recommended for denial if hard cuts are not met.

17. The system of claim 10, wherein the risk assessment accounts for age of a business and number of employees.

18. The system of claim 17, wherein the risk assessment adds risk for a business depending on its age.

19. The system of claim 10, wherein a credit analysis is performed and wherein the single application underwriting subject matter of one tile of the six or more tiles is credit and credit information is displayed on the credit tile for use by the underwriter and wherein the credit information displayed are two credit reports on the same tile.

20. The system of claim 19, wherein the at least one view includes a cashflow and displays a cashflow trend in a graphical form with a bar chart.

* * * * *